US011862424B2

(12) United States Patent
Sekiya et al.

(10) Patent No.: US 11,862,424 B2
(45) Date of Patent: Jan. 2, 2024

(54) ELECTRIC DEVICE WITH A MAIN BODY FRAME INCLUDING A SNAP-FIT MECHANISM

(71) Applicant: FUJI ELECTRIC FA COMPONENTS & SYSTEMS CO., LTD., Konosu (JP)

(72) Inventors: Masashi Sekiya, Kawagoe (JP); Kouetsu Takaya, Konosu (JP); Koumei Hazawa, Gyoda (JP); Shouta Kikuchi, Ageo (JP)

(73) Assignee: FUJI ELECTRIC FA COMPONENTS & SYSTEMS CO., LTD., Tokyo (JP)

( * ) Notice: Subject to any disclaimer, the term of this patent is extended or adjusted under 35 U.S.C. 154(b) by 43 days.

(21) Appl. No.: 17/533,872

(22) Filed: Nov. 23, 2021

(65) Prior Publication Data

US 2022/0084766 A1 Mar. 17, 2022

Related U.S. Application Data

(63) Continuation of application No. PCT/JP2020/043386, filed on Nov. 20, 2020.

(30) Foreign Application Priority Data

Dec. 2, 2019 (JP) ................................ 2019-218188

(51) Int. Cl.
*H01H 50/02* (2006.01)
*H01H 50/30* (2006.01)

(52) U.S. Cl.
CPC ........... *H01H 50/02* (2013.01); *H01H 50/30* (2013.01)

(58) Field of Classification Search
CPC ..................................................... H01H 50/02
(Continued)

(56) References Cited

U.S. PATENT DOCUMENTS 4,719,542 A * 1/1988 Lemmer ............ H01H 71/0264 248/222.12
5,677,655 A * 10/1997 Hinata .................. H01H 50/14 335/132

(Continued)

FOREIGN PATENT DOCUMENTS

CN 2561085 Y 7/2003
JP 5963618 A 4/1984

(Continued)

OTHER PUBLICATIONS

International Search Report dated Feb. 9, 2021 from International Application No. PCT/JP2020/043386.

(Continued)

*Primary Examiner* — Alexander Talpalatski

(57) ABSTRACT

The main body frame includes a first frame including a flexible protruding plate portion, a second frame facing the first frame in a first direction to form the housing section, and a snap-fit mechanism connecting the first frame to the second frame. The snap-fit mechanism includes a fitted portion provided on the flexible protruding plate portion and a fitting projection portion provided on a side wall of the second frame and fitting with the fitted portion. The fitting projection portion and the fitted portion are fitted by bringing the first and second frames into relative proximity in the first direction, and the fitting is released by relatively displacing the first and second frames in a second direction orthogonal to the first direction.

26 Claims, 44 Drawing Sheets

(58) Field of Classification Search
USPC .................................................. 335/202, 201
See application file for complete search history.

(56) References Cited

U.S. PATENT DOCUMENTS

| | | | | |
|---|---|---|---|---|
| 6,255,926 | B1 * | 7/2001 | Gundy | H01H 71/128 200/293 |
| 7,633,365 | B2 * | 12/2009 | Harmon | H01H 71/0257 335/8 |
| 8,274,346 | B2 | 9/2012 | Takaya et al. | |
| 8,410,877 | B1 * | 4/2013 | Takaya | H01H 50/045 335/131 |
| 8,487,725 | B2 * | 7/2013 | Takaya | H01H 50/02 335/201 |
| 9,223,350 | B2 | 12/2015 | Tani | |
| 9,887,054 | B2 * | 2/2018 | Tsutsumi | H01H 50/045 |
| 10,297,407 | B2 | 5/2019 | Tsutsumi et al. | |
| 10,764,998 | B2 * | 9/2020 | Naohara | H01H 45/04 |
| 2003/0184988 | A1 * | 10/2003 | Boyd | H01H 85/2045 361/833 |
| 2012/0056701 | A1 | 3/2012 | Takaya et al. | |
| 2012/0309465 | A1 | 12/2012 | Tani | |
| 2016/0260564 | A1 | 9/2016 | Tsutsumi et al. | |
| 2016/0293366 | A1 | 10/2016 | Tsutsumi et al. | |
| 2020/0221573 | A1 * | 7/2020 | Lee | H01R 12/727 |

FOREIGN PATENT DOCUMENTS

| | | | |
|---|---|---|---|
| JP | 7312159 | A | 11/1995 |
| JP | 8250002 | A | 9/1996 |
| JP | 9231894 | A | 9/1997 |
| JP | 1154008 | A | 2/1999 |
| JP | 201144276 | A | 3/2011 |
| JP | 2011-166563 | A | 8/2011 |
| JP | 2015220186 | A | 12/2015 |
| JP | 6172388 | B2 | 8/2017 |
| JP | 6202200 | B2 | 9/2017 |
| WO | 2015177961 | A1 | 11/2015 |

OTHER PUBLICATIONS

Written Opinion of the International Searching Authority dated Feb. 9, 2021 from International Application No. PCT/JP2020/043386.

Extended European Search Report dated Nov. 22, 2022 for European Application No. 20895746.4.

* cited by examiner

ELECTRIC DEVICE WITH A MAIN BODY FRAME INCLUDING A SNAP-FIT MECHANISM

CROSS-REFERENCE TO RELATED APPLICATION

This application is a continuation application filed under 35 U.S.C. § 111(a) of International Patent Application No. PCT/JP2020/043386, filed on Nov. 20, 2020, which claims foreign priority benefit under 35 U.S.C. § 119 of Japanese Patent Application No. 2019-218188, filed on Dec. 2, 2019, the contents of each of which are incorporated herein by reference.

TECHNICAL FIELD

The present invention relates to an electric device, and more particularly to a technology effective when applied to an electric device provided with a frame main body housing a contact unit and an electromagnet unit.

BACKGROUND ART

An electromagnetic contactor as an electric device includes a main body frame that houses a contact unit and an electromagnet unit. In addition, the main body frame includes a first frame and a second frame facing each other and a connection mechanism connecting the first frame to the second frame.

PTL 1 and 2 disclose electromagnetic contactors that include a snap-fit mechanism as a connection mechanism. The snap-fit mechanism described in PTL 1 connects the first frame to the second frame by fitting between a fitting portion provided in a hook portion of the first frame and a fitting projection portion provided in the second frame.

Additionally, the snap-fit mechanism described in PTL 2 connects an upper case to a lower case by fitting between an engaging projection provided in the upper case and a receiving port provided in an elastic plate portion of the lower case.

CITATION LIST

Patent Literature

PTL 1: WO 2015/177961
PTL 2: JP H07-312159 A

Summary of Invention

TECHNICAL PROBLEM

Incidentally, in electromagnetic contactors, an electromagnetic coil may be replaced according to the type of power supply used by a customer. The snap-fit mechanism described in PTL 1 is useful for replacing the electromagnetic coil since it allows for fitting and fitting release between the fitting portion of the first frame and the fitting projection portion of the second frame.

However, the snap-fit mechanism described in PTL 1 is configured to release the fitting between the fitting portion of a flexible protruding plate portion and the fitting projection portion of the second frame by bending the flexible protruding plate portion of the first frame outward using a tool with a flat (flat plate shaped) tip, such as a flat head screwdriver, so that it takes time and effort to bend the flexible protruding plate portion with the tool.

Additionally, there is no stopper that regulates the amount of bending of the flexible protruding plate portion when the flexible protruding plate portion is bent outward, due to which there is a concern that the flexible protruding plate portion may be broken depending on the amount of force applied. Furthermore, the snap-fit mechanism is provided at a plurality of places, and it is necessary to simultaneously release the plurality of snap-fit mechanisms with a tool, which is problematic in terms of workability.

Accordingly, the present invention has been made in view of the above technological problems. It is an object of the present invention to provide an electric device that can facilitate replacement of components in a main body frame.

Solution to Problem

In order to achieve the above-described object, according to an aspect of the present invention, there is provided an electric device including: a contact unit, an electromagnet unit configured to drive the contact unit, and a main body frame configured to house the contact unit and the electromagnet unit in a housing section, wherein the main body frame includes a first frame including a flexible protruding plate portion protruding from an open end side, a second frame facing the first frame in a first direction to form the housing section, and a snap-fit mechanism configured to connect the first frame to the second frame, the snap-fit mechanism including a fitted portion provided on the flexible protruding plate portion and a fitting projection portion provided on a side wall of the second frame and fitting with the fitted portion, in which the fitted portion and the fitting projection portion are fitted by bringing the first frame and the second frame into relative proximity in the first direction, and the fitting is released by relatively displacing the first frame and the second frame in a second direction orthogonal to the first direction.

According to another aspect of the present invention, there is provided an electric device including: a first frame and a second frame configured to house an electric component by connecting respective open end sides of the first and second frames facing each other in one direction; and a relative displacement suppression mechanism configured to suppress relative displacement between the connected first and second frames, wherein the relative displacement suppression mechanism includes a first fixing portion provided on a side wall of the first frame, a second fixing portion provided on a side wall of the second frame to overlap with the first fixing portion in the one direction, and a fixed member movable over the first fixing portion and the second fixing portion.

Advantageous Effects of Invention

According to an aspect of the present invention, it is possible to provide an electric device that can facilitate replacement of components in a main body frame.

DESCRIPTION OF EMBODIMENTS

Hereinafter, embodiments of the present invention will be described in detail with reference to the drawings.

Note that, in all the drawings for illustrating the embodiments of the present invention, components having the same function are denoted by the same reference signs, and repeated description thereof will be omitted.

Additionally, each drawing is schematic, and may be different from the real thing. In addition, the following embodiments exemplify devices and methods for embodying the technological idea of the present invention, and are not intended to limit the configuration to any one of those described below. In other words, the technological idea of the present invention can be modified in various ways within the technological scope described in the claims.

Furthermore, in the following embodiments, among three directions orthogonal to each other in a space, a second direction and a third direction orthogonal to each other in the same plane are defined as X direction and Y direction, respectively, and a first direction orthogonal to each of the second direction and the third direction is defined as Z direction.

Still furthermore, the following embodiments will describe cases where the present invention is applied to an electromagnetic contactor as an electric device. However, the present invention is not limited to electromagnetic contactors according to the following embodiments, and can also be applied to other electric devices.

First Embodiment

<<Configuration of Electromagnetic Contactor>>

Figure 1:
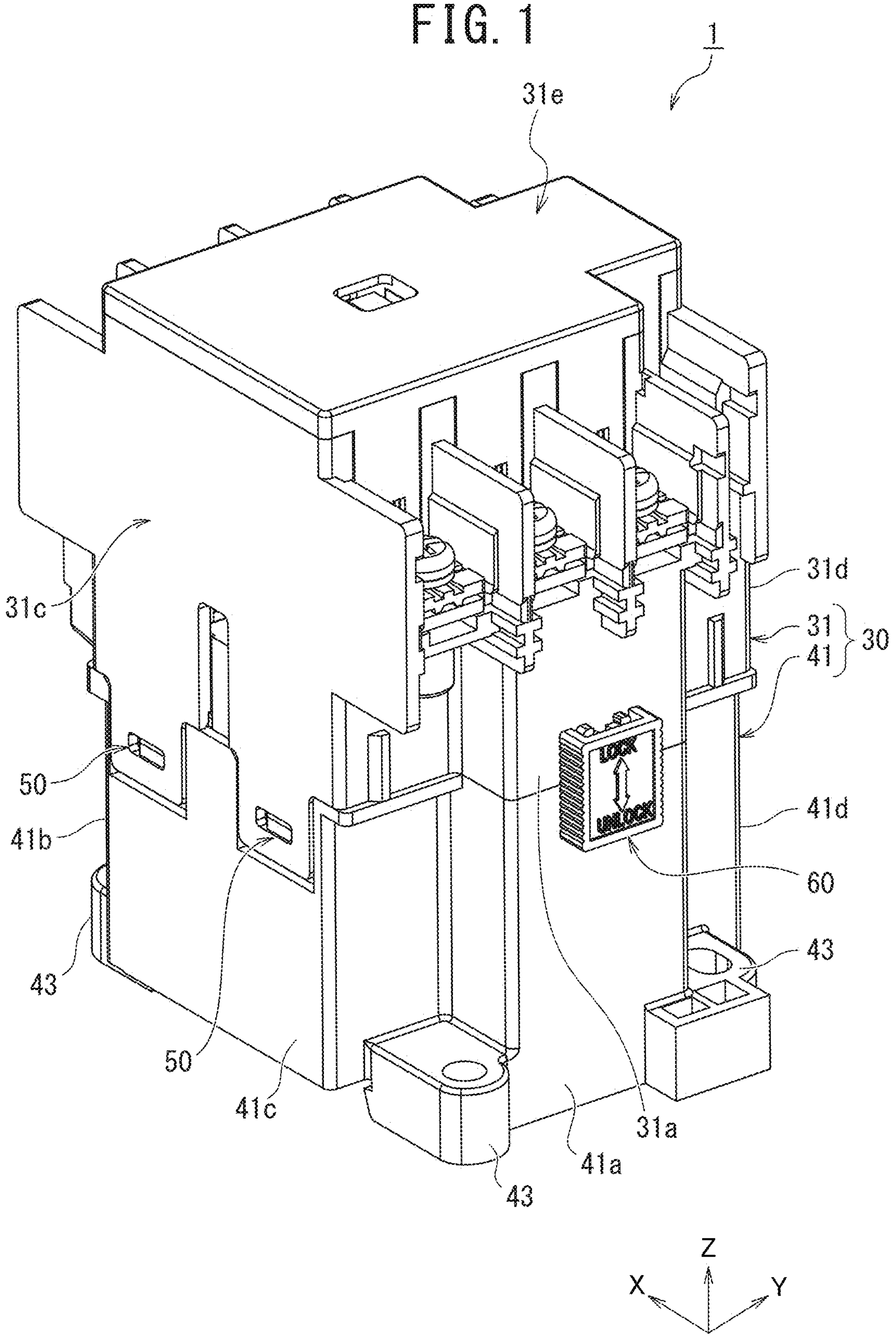
FIG. 1 is a perspective view illustrating an external configuration of an electromagnetic contactor according to a first embodiment of the present invention.
Figure 2:
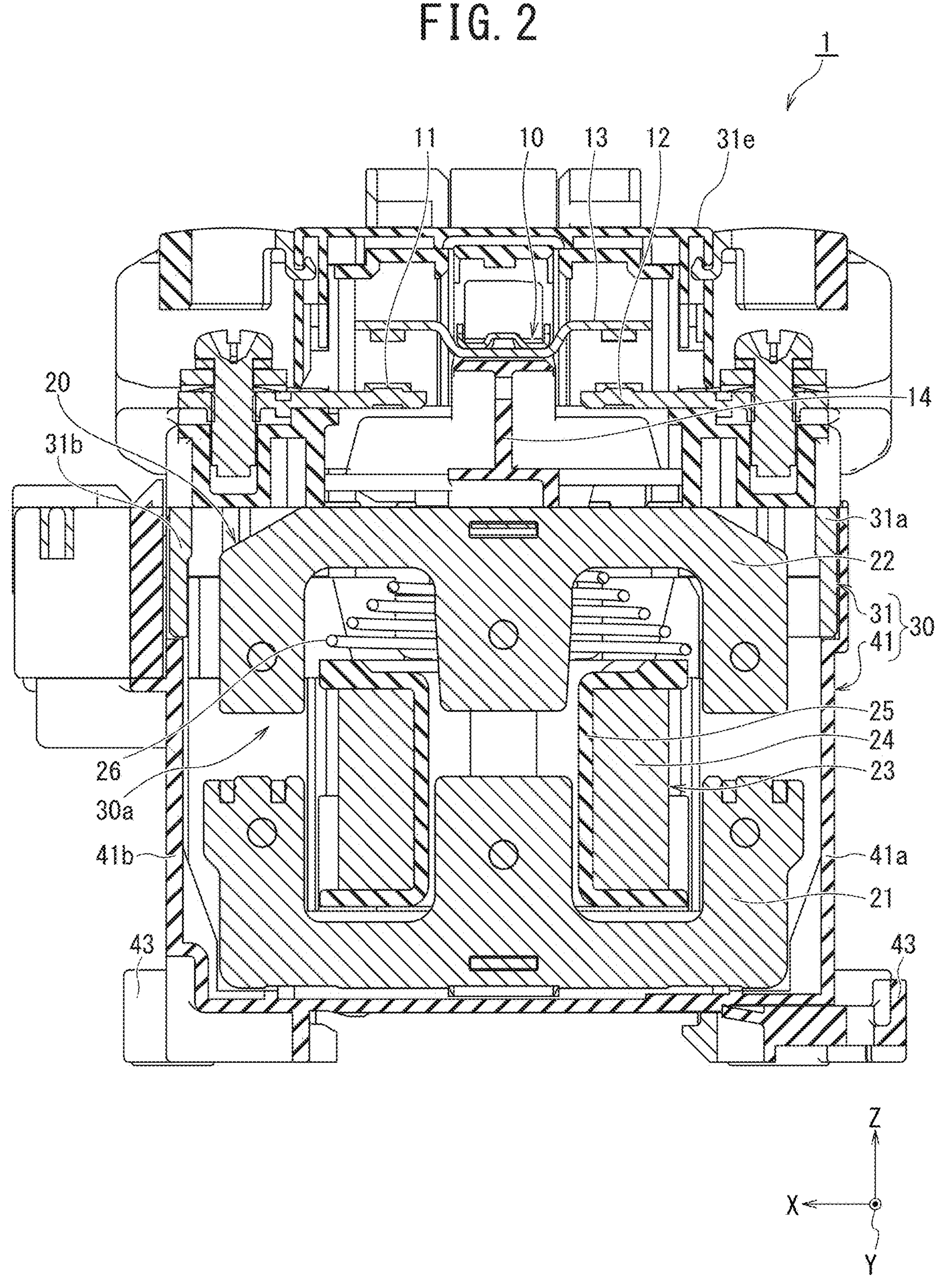
FIG. 2 is a sectional view illustrating an internal structure of the electromagnetic contactor.

As illustrated in FIGS. 1 and 2, an electromagnetic contactor 1 according to a first embodiment of the present invention includes a contact unit 10, an electromagnet unit 20 configured to drive the contact unit 10, and a main body frame 30 configured to house the contact unit 10 and the electromagnet unit 20 in a housing section 30*a*. The contact unit 10 and the electromagnet unit 20 are housed to be arranged in series in the Z direction (first direction) in the housing section 30*a* of the main body frame 30. The electromagnetic contactor 1 opens and closes a three-phase AC circuit.

<Contact Unit>

As illustrated in FIG. 2, the contact unit 10 includes a pair of fixed contact elements 11 and 12, a bridge type movable contact element 13 arranged to be capable of contacting with and separating from the pair of fixed contact elements 11 and 12, and a movable contact support 14 holding the movable contact element 13.

The pair of fixed contact elements 11 and 12 extend in the X direction (second direction), and have a fixed contact at one end side thereof and an external terminal portion at the other end side thereof. Then, the pair of fixed contact elements 11 and 12 are fixed to the main body frame 30 in a state where the respective one end sides thereof face each other and are separated from each other in the X direction.

The movable contact element 13 extends in the X direction, and is provided with a movable contact on one end side thereof and the other end side thereof, respectively. The movable contact on the one end side of the movable contact element 13 and the fixed contact of the one fixed contact element 11 are arranged to face each other. The movable contact at the other end side of the movable contact element 13 and the fixed contact of the other fixed contact element 12 are arranged to face each other. The movable contact element 13 is held by the movable contact support 14. The pair of fixed contact elements 11 and 12 and the movable contact element 13 form a contact section, and three contact sections are arranged side by side in the Y direction to correspond to the three-phase AC circuit.

<Electromagnet Unit>

As illustrated in FIG. 2, the electromagnet unit 20 includes a fixed iron core 21, a movable iron core 22, an electromagnetic coil 23, and a return spring 26. The fixed iron core 21 and the movable iron core 22 are arranged so that respective pole contact surfaces thereof face each other.

The electromagnetic coil 23 generates a magnetic field that attracts the fixed iron core 21 and the movable iron core 22 by electromagnetic force. The electromagnetic coil 23 includes a winding 24 and a bobbin 25. The winding 24 passes between a central leg portion and an outer leg portion of each of the fixed iron core 21 and the movable iron core 22, and circles around the central leg portion. The bobbin 25 has the winding 24 wound thereon. The bobbin 25 has a cylindrical portion in which the central leg portion of each of the fixed iron core 21 and the movable iron core 22 is inserted into an inner diameter side thereof, and the winding 24 is wound on an outer diameter side thereof. Additionally, the bobbin 25 is provided with flange portions protruding in a flange shape from both end portions of the cylindrical portion to the outer diameter side thereof. The electromagnetic coil 23 can be replaced according to the type of power supply used by the customer.

The return spring 26 is an urging means for urging the movable iron core 22 in a direction away from the fixed iron core 21. The return spring 26 is, for example, a coil spring provided between an upper surface of the bobbin 25 of the electromagnetic coil 23 and the movable iron core 22.

The pair of fixed contact elements 11 and 12 and the movable contact element 13 are electric contacts that switch circuit connection and disconnection by contacting with and separating from each other.

As illustrated in FIG. 2, the movable contact element 13 is fixed to one end side of the movable contact support 14 in the Z direction. Then, the other end side of the movable contact support 14 in the Z direction is fixed to a back surface portion on an opposite side to the leg portion side of the movable iron core 22. The movable contact element 13 moves in the Z direction in conjunction with movement of the movable iron core 22 in the Z direction. In other words, the pair of fixed contact elements 11 and 12 and the movable contact element 13 separate from each other in a released state where the fixed iron core 21 and the movable iron core 22 are separated from each other, and contact with each other in an energized state where the fixed iron core 21 and the movable iron core 22 are in contact with each other.

A contact spring is provided on a side of the movable contact element 13 opposite to the movable iron core 22 side, although it is not illustrated.

<Main Body Frame>

As illustrated in FIGS. 1 and 2, the main body frame 30 includes a first frame 31 and a second frame 41 facing each other in the Z direction to form the housing section 30*a* and a snap-fit mechanism 50 connecting the first frame 31 and the second frame 41 to each other.

The first frame 31 is formed by a bottomed cylindrical body in which one end side of a square cylindrical outer peripheral side wall having four side walls 31*a*, 31*b*, 31*c*, and 31*d* is opened and the other end side of the outer peripheral side wall opposite to the one end side thereof is closed by a bottom wall 31*e*. Similarly, the second frame 41 is also formed by a bottomed cylindrical body in which one end side of a square cylindrical outer peripheral side wall having four side walls 41*a*, 41*b*, 41*c*, and 41*d* is opened and the other end side of the outer peripheral side wall opposite to the one end side thereof is closed by a bottom wall. The side walls 31*a* and 41*a* and the side walls 31*b* and 41*b* are located on opposite sides of each other in the X direction. The side walls 31*c* and 41*c* and the side walls 31*d* and 41*d* are located on opposite sides of each other in the Y direction.

The first frame 31 is provided with a primary terminal portion electrically connected to the fixed contact element 11, which is one of the pair of fixed contact elements 11 and 12, and a secondary terminal portion electrically connected to the fixed contact element 12, which is the other one of the pair of fixed contact elements 11 and 12. A mounting plate portion 43 having amounting hole is provided at four corners on the bottom wall side of the second frame 41. The first frame 31 and the second frame 41 are made of, for example, a nylon-based thermoplastic insulating resin excellent in heat resistance and insulation properties.

Note that, in this first embodiment, a side housing the contact unit 10 is the first frame 31 including a flexible protruding plate portion 51, and a side housing the electromagnet unit 20 is the second frame 41 including a fitting projection portion 55, but on the contrary, the side housing the electromagnet unit 20 may be the first frame including the flexible protruding plate portion 51, and the side housing the contact unit 10 may be the second frame 41 including the fitting projection portion 55.

<Snap-Fit Mechanism>

Figure 3:
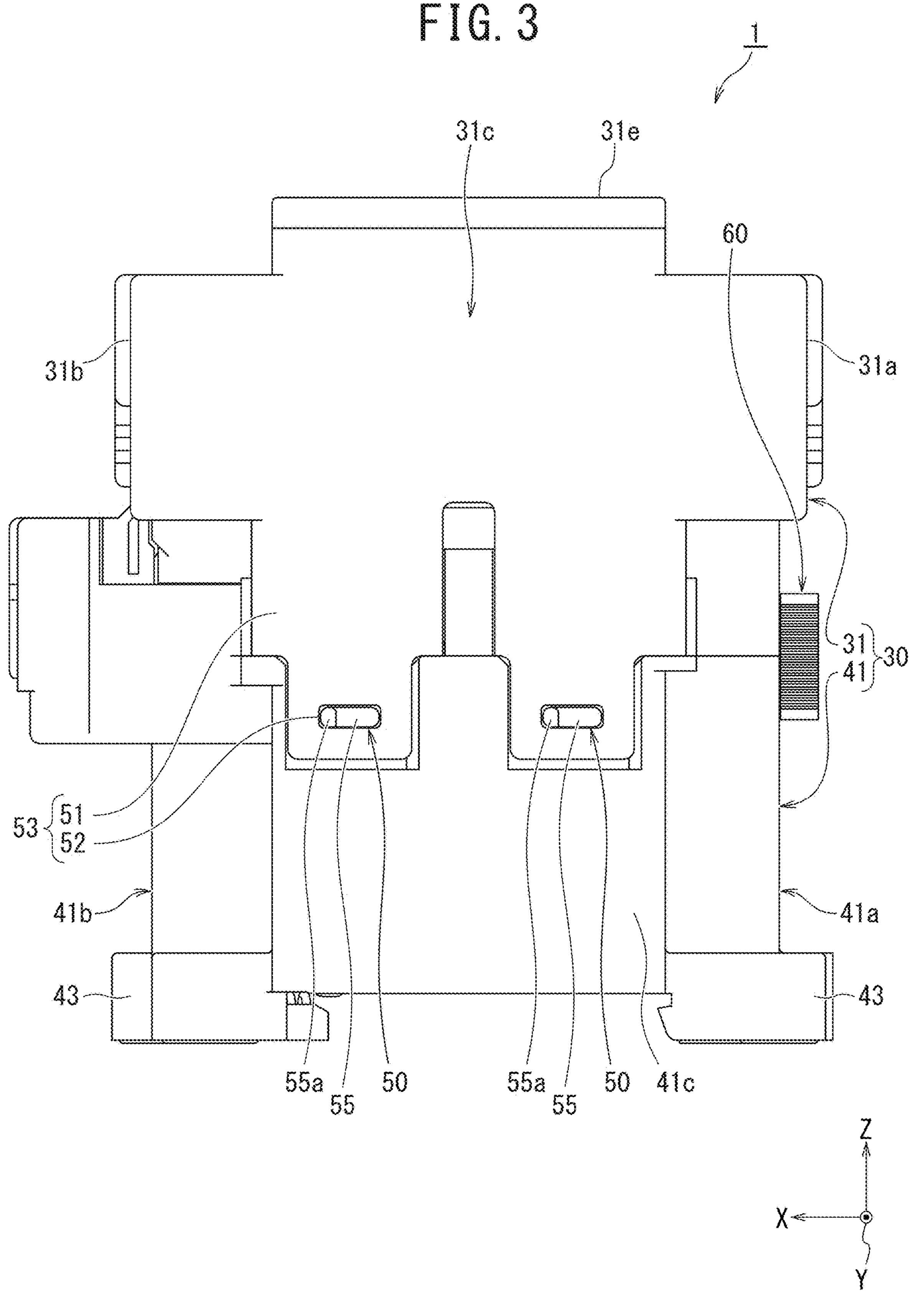
FIG. 3 is a front view of the electromagnetic contactor.
Figure 4A:
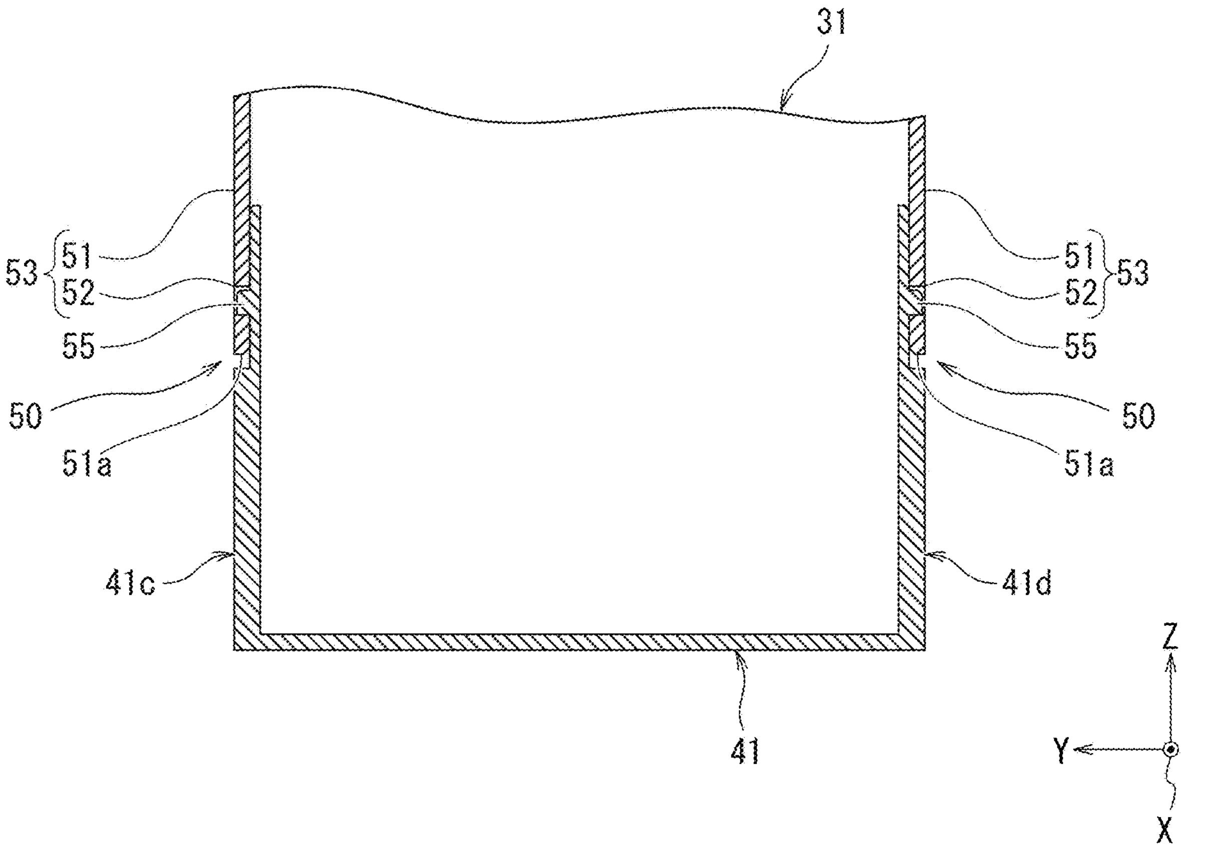
FIG. 4A is a sectional view illustrating a connected state of a first frame and a second frame.
Figure 4B:
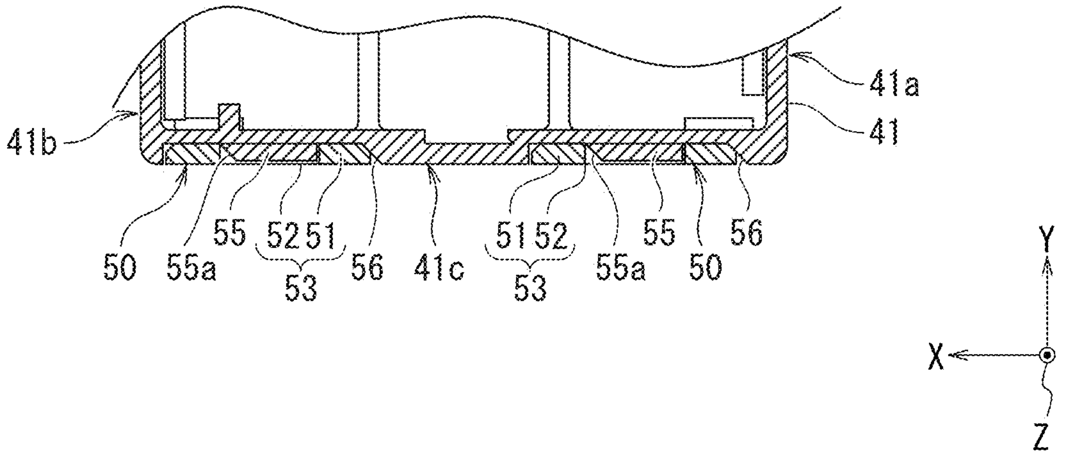
FIG. 4B is a sectional view illustrating the connected state of the first frame and the second frame.

As illustrated in FIGS. 3, 4A, and 4B, the snap-fit mechanism 50 includes a hook portion 53 provided with a fitting hole portion (opening portion) 52 as a fitted portion on a tip side of the flexible protruding plate portion 51 protruding from the open end of the first frame 31, which is the one of the first and second frames 31 and 41, and the fitting projection portion 55 provided in the second frame 41, which is the other one of the first and second frames 31 and 41, and fitted with the fitting hole portion 52 of the flexible protruding plate portion 51.

Figure 5:
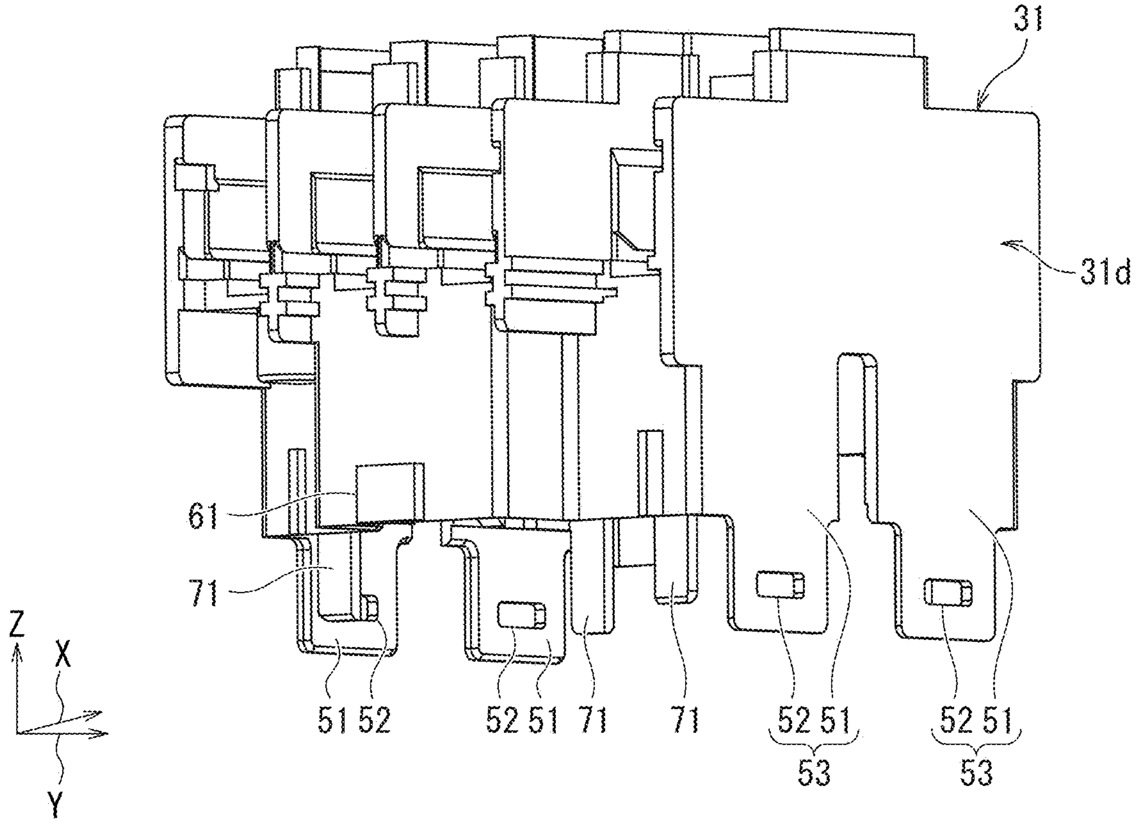
FIG. 5 is a perspective view of the first frame.
Figure 6:
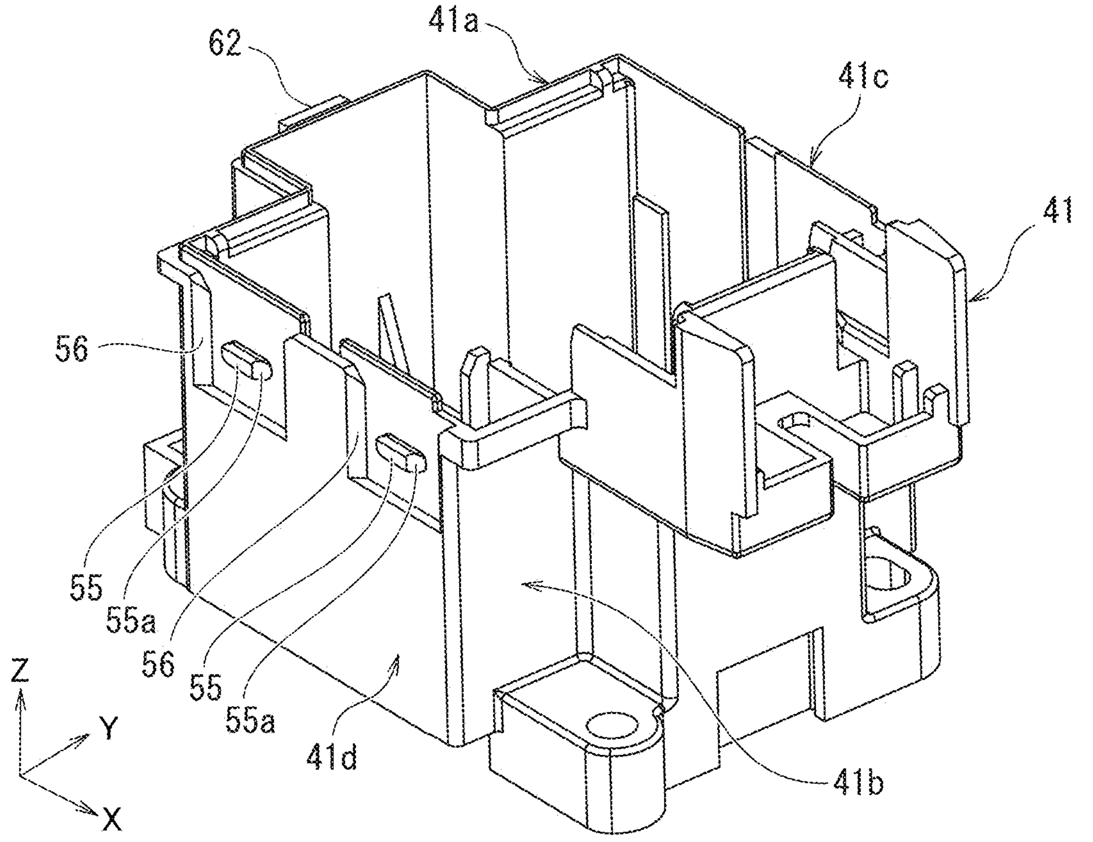
FIG. 6 is a perspective view of the second frame.

The flexible protruding plate portion 51 extends along the Z direction, and has a base portion integrated with the first frame 31, in which the tip side opposite to the base portion thereof protrudes from the open end side of the first frame 31 (see FIG. 5). Then, the tip of the flexible protruding plate portion 51 faces an outer surface of the outer peripheral side wall of the second frame 41.

The fitting hole portion 52 penetrates through a front surface and a back surface of the flexible protruding plate portion 51 facing each other on the tip side of the flexible protruding plate portion 51. The fitting projection portion 55 of the second frame 41 is fitted into the fitting hole portion 52 and fits therewith. Note that while this first embodiment uses the fitting hole portion 52 as the fitted portion, a fitting recessed portion may be used as the fitted portion.

The fitting hole portion 52 and the fitting projection portion 55 are fitted by bringing the first and second frames 31 and 41 into relative proximity in the Z direction (first direction), and the fitting is released by relatively displacing the first and second frames 31 and 41 in the X direction (second direction) orthogonal to the Z direction.

The flexible protruding plate portion 51 includes a first inclined surface 51*a* that contacts with the fitting projection portion 55 to bend the flexible protruding plate portion 51 outward at the time of the fitting where the fitting hole portion 52 and the fitting projection portion 55 are fitted by bringing the first frame 31 and the second frame 41 into relative proximity in the Z direction. In other words, the flexible protruding plate portion 51 includes the first inclined surface 51*a* in the Z direction in which the fitting hole portion 52 and the fitting projection portion 55 are fitted. The first inclined surface 51*a* is inclined with an inclination in a direction in which a thickness of the tip portion of the flexible protruding plate portion 51 gradually increases toward the base portion thereof. The fitting projection portion 55 includes a second inclined surface 55*a* that comes into contact with an inner surface of the fitting hole portion 52 to bend the flexible protruding plate portion 51 outward when releasing the fitting between the fitting hole portion 52 and the fitting projection portion 55 by relatively displacing the first frame 31 and the second frame 41 in the X direction orthogonal to the Z direction. In other words, the fitting projection portion 55 includes the second inclined surface 55*a* in the X direction in which the fitting between the fitting hole portion 52 and the fitting projection portion 55 is released. The second inclined surface 55*a* is inclined with an inclination in a direction in which a thickness of the fitting projection portion 55 gradually increases from a position where the flexible protruding plate portion 51 contacts the surface.

The second frame 41, which is the other one of the first and second frames 31 and 41 that is provided with the fitting projection portion 55, includes a third inclined surface 56 that contacts with the tip side of the flexible protruding plate portion 51 to bend the flexible protruding plate portion 51 outward when releasing the fitting between the fitting hole portion 52 and the fitting projection portion 55 by relatively displacing the first frame 31 and the second frame 41 in the X direction orthogonal to the Z direction. The third inclined surface 56 is provided on an outer surface side of the outer peripheral side wall of the second frame 41. In other words, the snap-fit mechanism 50 includes the third inclined surface 56 provided in the second frame 41. The third inclined surface 56 is inclined with an inclination in a direction in which the wall thickness gradually increases toward the side wall surface from a position where the flexible protruding plate portion 51 contacts the surface.

As illustrated in FIG. 3 to FIG. 6, there are provided a total of four snap-fit mechanisms 50, each two of which are arranged side by side in the X direction on each of portions of the outer peripheral side wall of the main body frame 30 located on opposite sides of each other in the Y direction. Specifically, hook portions 53 each including the flexible protruding plate portion 51, the first inclined surface 51*a*, and the fitting hole portion 52 are spaced apart from each other in the X direction on an outer surface of each of the two side walls 31*c* and 31*d* of the first frame 31 located on opposite sides of each other in the Y direction (third direction). Additionally, the fitting projection portion 55 including the second inclined surface 55*a* and the third inclined surface 56 are spaced apart from each other in the X direction on an outer surface of each of the two side walls 41*c* and 41*d* of the second frame 41 located on opposite sides of each other in the Y direction.

Note that the snap-fit mechanisms 50 may be provided on one of the two side walls of the main body frame 30 located on the opposite sides of each other, but preferably, one or more snap-fit mechanisms 50 are provided on each of the side walls of the main body frame 30 located on the opposite sides of each other.

<Positioning Mechanism>

Figure 7:
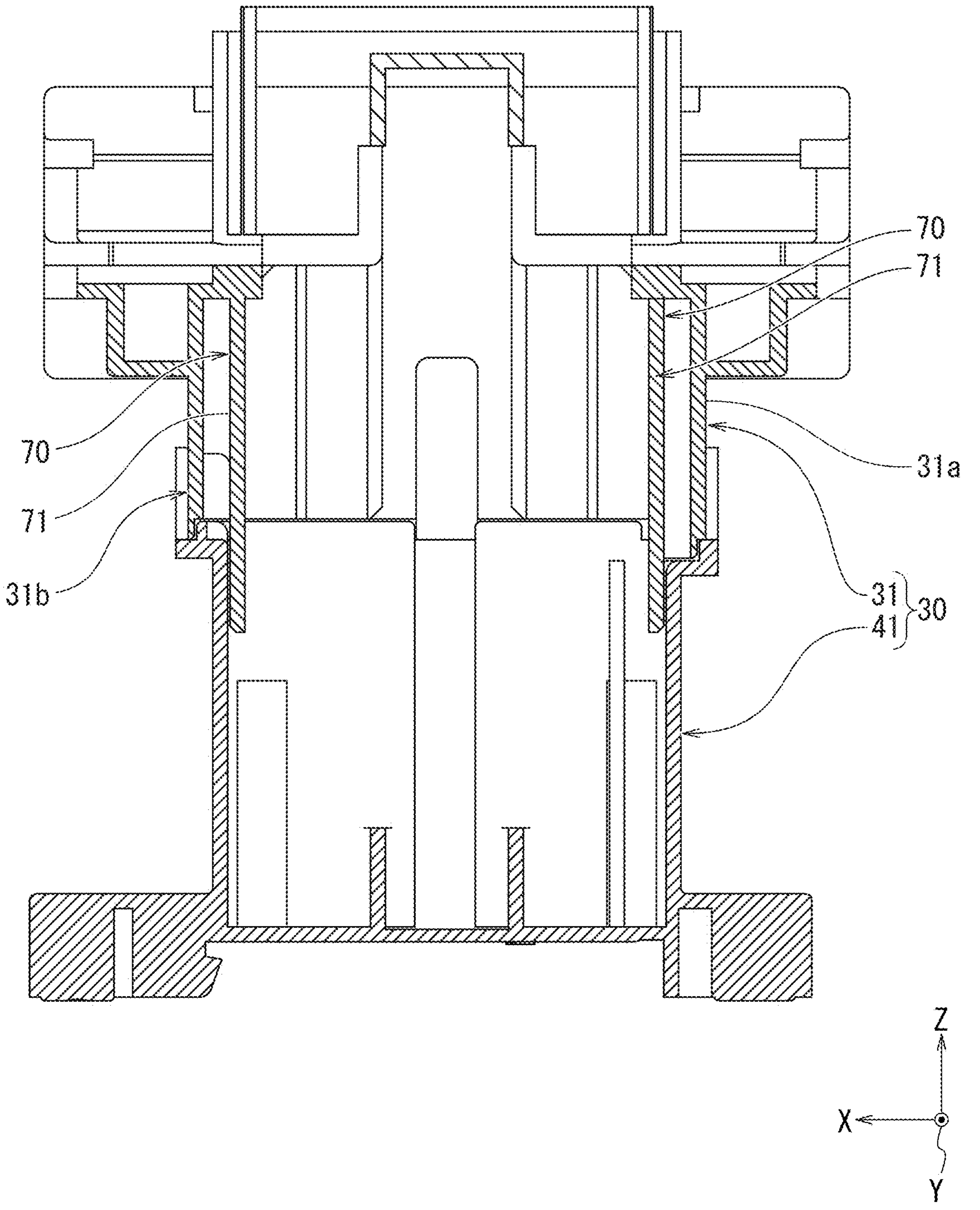
FIG. 7 is a sectional view illustrating a state where the first frame and the second frame are positioned by a positioning mechanism.

In addition, as illustrated in FIG. 7, the main body frame 30 further includes a positioning mechanism 70 that positions the first frame 31 and the second frame 41 in the X direction.

The positioning mechanism 70 includes a flexible positioning plate portion 71 that protrudes from the open end of the first frame 31 and that enters from the open end of the second frame 41 and faces an inner surface of the outer peripheral side wall of the second frame 41 when connecting the first frame 31 to the second frame 41. The flexible positioning plate portion 71 extends along the Z direction, in which a base portion thereof is integrated with the first frame 31, and a tip side opposite to the base portion thereof protrudes from the open end side of the first frame 31. Then, when connecting the first frame 31 to the second frame 41, the tip side of the flexible positioning plate portion 71 enters from the open end of the second frame 41 and faces the inner surface of the outer peripheral side wall of the second frame 41. In this first embodiment, there are provided a total of four flexible positioning plate portions 71, each two of which are spaced apart from each other in the Y direction on the two side walls 31*a* and 31*b* of the first frame 31 in the X direction. In other words, the flexible positioning plate portion 71 is provided at each of four corners of the first frame 31. Then, when connecting the first frame 31 to the second frame 41, the tip side of each of the two flexible positioning plate portions 71 provided on the side wall 31*a* side of the first frame 31 faces an inner surface of the side wall 41*a* of the second frame 41, and the tip side of each of the two flexible positioning plate portions 71 provided on the side wall 31*b* side of the first frame 31 faces the inner surface of the side wall 41*b* of the second frame 41. In the positioning mechanism 70, the tip side of each of the four flexible positioning plate portions 71 enters from the open end side of the second frame 41 and comes into contact with the inner surface of the outer peripheral side wall of the second frame 41 to allow for the positioning of the first frame 31 and the second frame 41. The two flexible positioning plate portions 71 provided on the side wall 31*a* side of the first frame 31 have an elastic force that urges the inner surface of the side wall 41*a* of the second frame 41, and the two flexible positioning plate portions 71 provided on the side wall 31*b* side of the first frame 31 have an elastic force that urges the inner surface of the side wall 41*b* of the second frame 41.

Note that while the flexible positioning plate portions 71 are provided on the side walls 31*a* and 31*b* sides, they may be provided on the side walls 31*c* and 31*d* sides.

<Connection of First and Second Frames>

Next, connection of the first frame 31 and the second frame 41 will be described with reference to FIGS. 8A, 8B, 9A, and 9B.

Figure 8A:
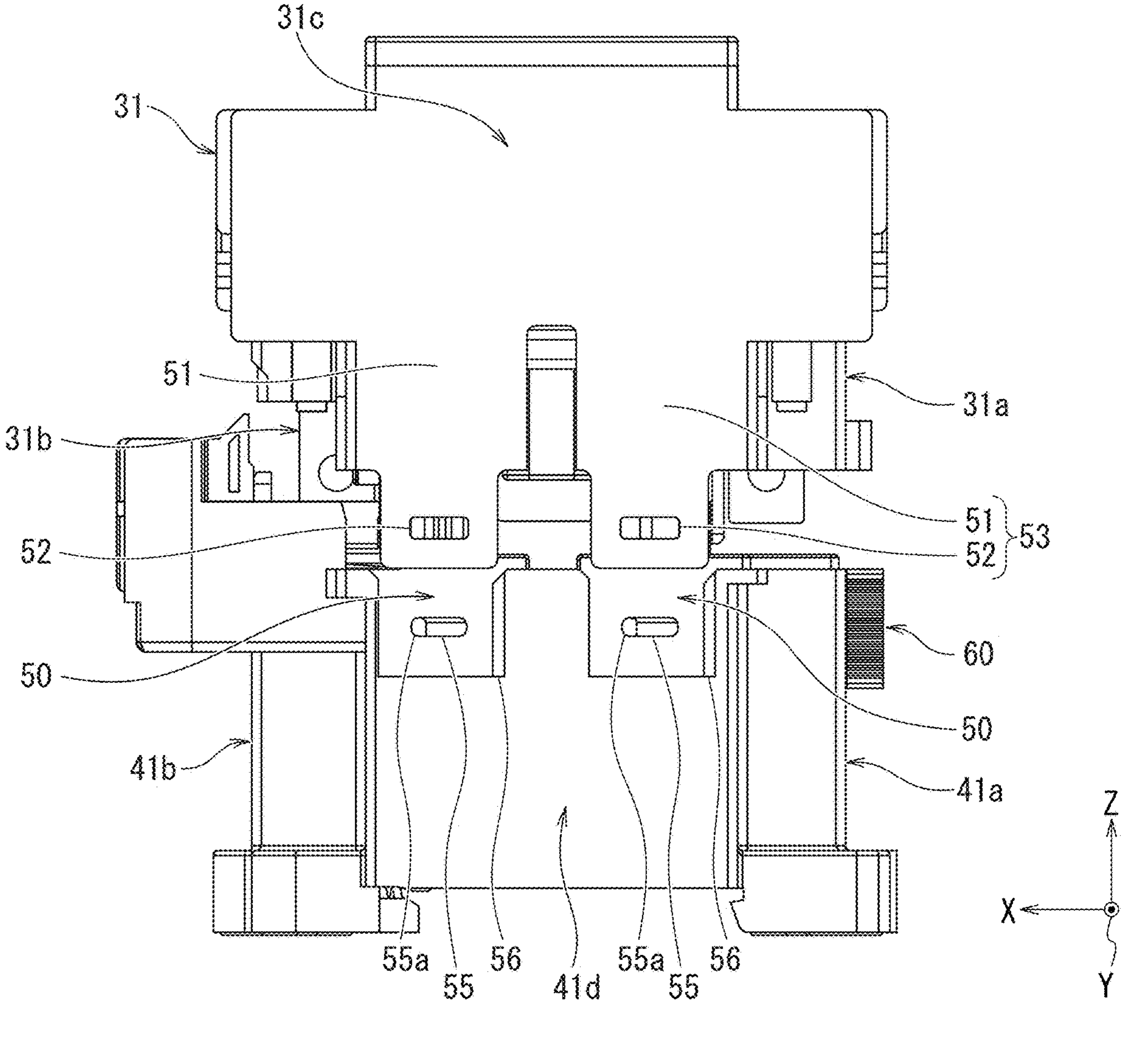
FIG. 8A is a front view for illustrating a connection of the first frame and the second frame.
Figure 8B:
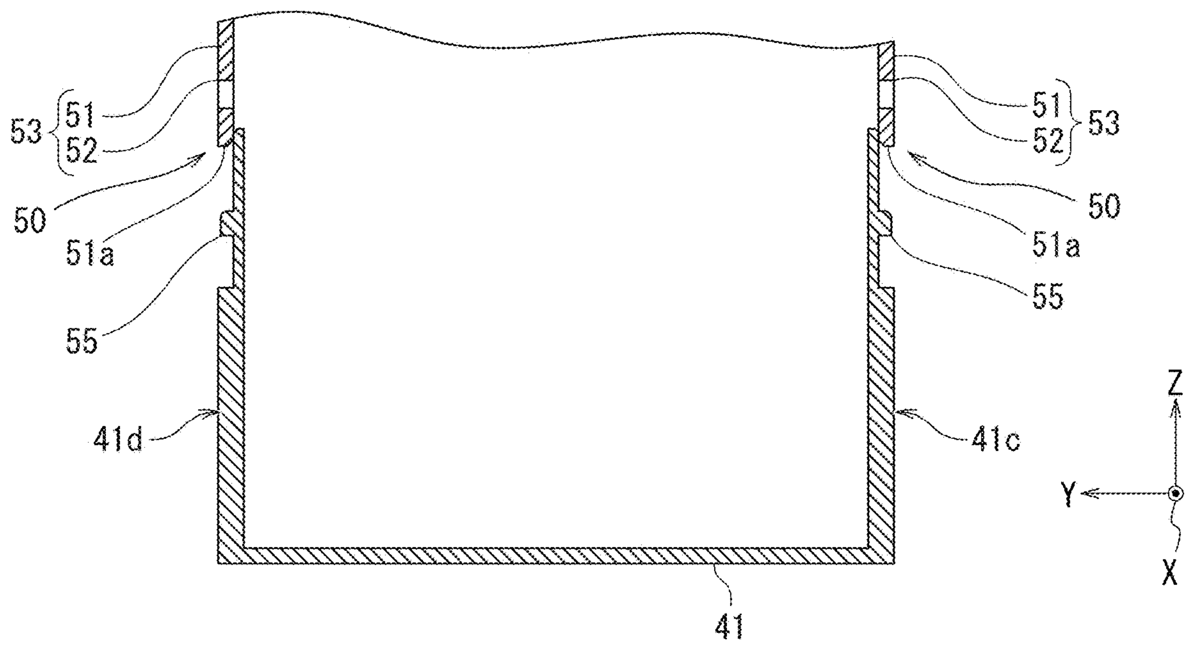
FIG. 8B is a sectional view for illustrating the connection of the first frame and the second frame.

First, as illustrated in FIGS. 8A and 8B, the first frame 31 and the second frame 41 are arranged along the Z direction so that the respective open end sides thereof face each other.

Figure 9A:
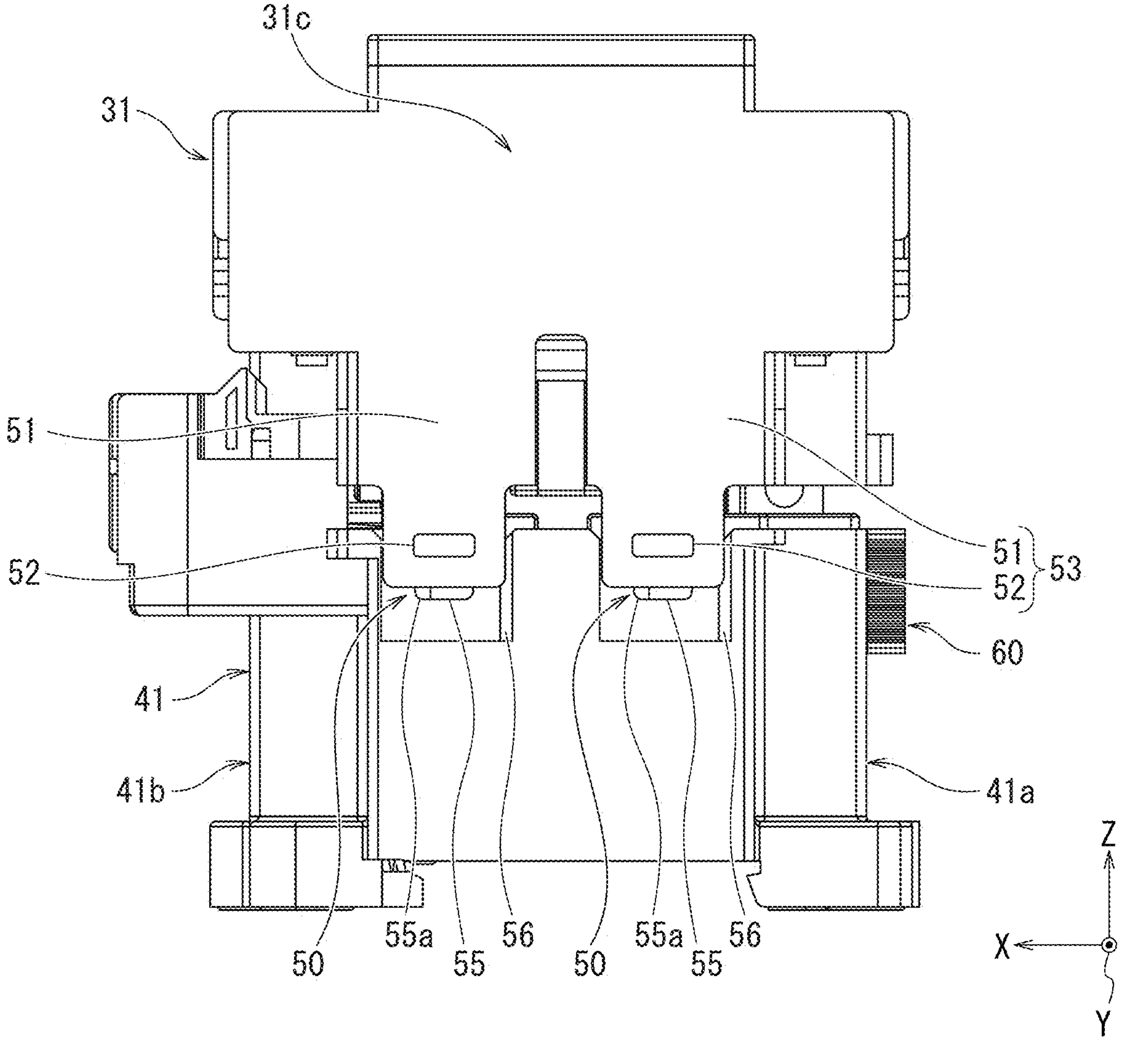
FIG. 9A is a front view for illustrating the connection of the first frame and the second frame.
Figure 9B:
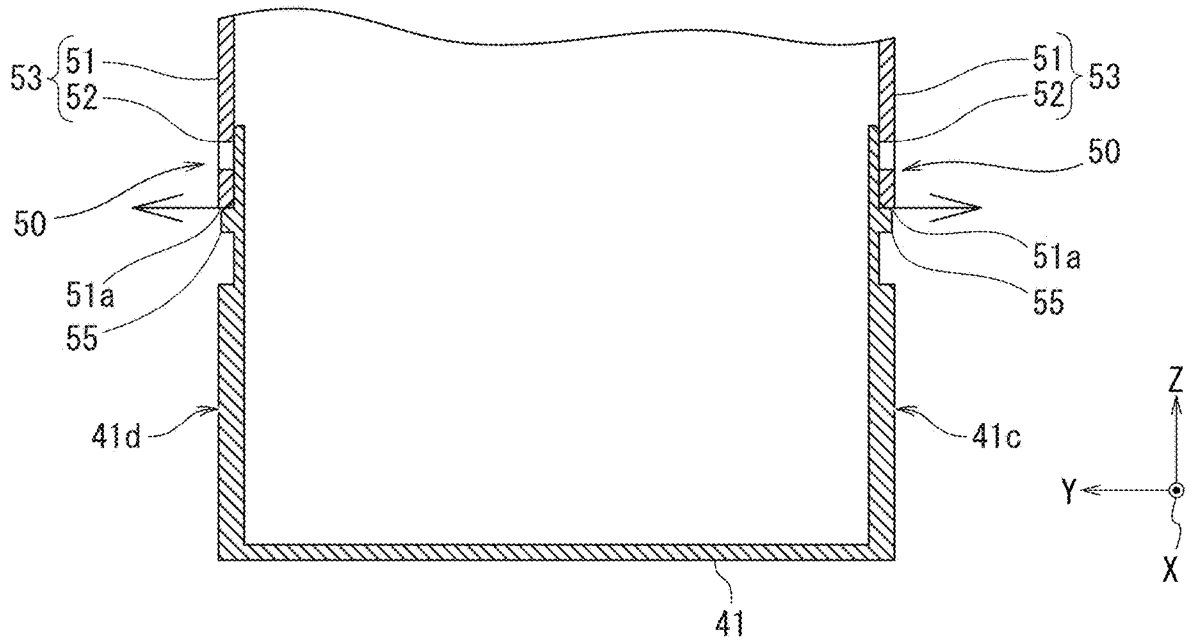
FIG. 9B is a sectional view for illustrating the connection of the first frame and the second frame.

Next, as illustrated in FIGS. 9A and 9B, the first frame 31 and the second frame 41 are brought relatively close to each other in the Z direction to bring the first inclined surface 51*a* at the tip of the flexible protruding plate portion 51 into contact with the fitting projection portion 55. Then, by bringing the first and second frames 31 and 41 closer relative to each other in the Z direction, the first inclined surface 51*a* at the tip side of the flexible protruding plate portion 51 moves in contact with the fitting projection portion 55, whereby the flexible protruding plate portion 51 bends outward. After that, as illustrated in FIGS. 3, 4A, and 4B, the fitting projection portion 55 is fitted into the fitting hole portion 52 of the flexible protruding plate portion 51 and fits therewith, and the fitting hole portion 52 and the fitting projection portion 55 are engaged by the elastic force of the flexible protruding plate portion 51. As a result, the first frame 31 and the second frame 41 are connected and fixed to each other by the snap-fit mechanisms 50.

In the middle of the connection of the first frame 31 and the second frame 41, the tip side of the flexible positioning plate portion 71 of the first frame 31 enters from the open end side of the second frame 41 and comes into contact with the inner surface of the outer peripheral side wall of the second frame 41 to position the first frame 31 and the second frame 41.

Additionally, when the connection of the first frame 31 and the second frame 41 is complete, the flexible positioning plate portion 71 urges the inner surface of the outer peripheral side wall of the second frame 41 by its own elastic force, which can thus suppress rattling (vibration) of the first and second frames 31 and 41 in the X direction.

<Release of Connection of First and Second Frames>

Figure 10A:
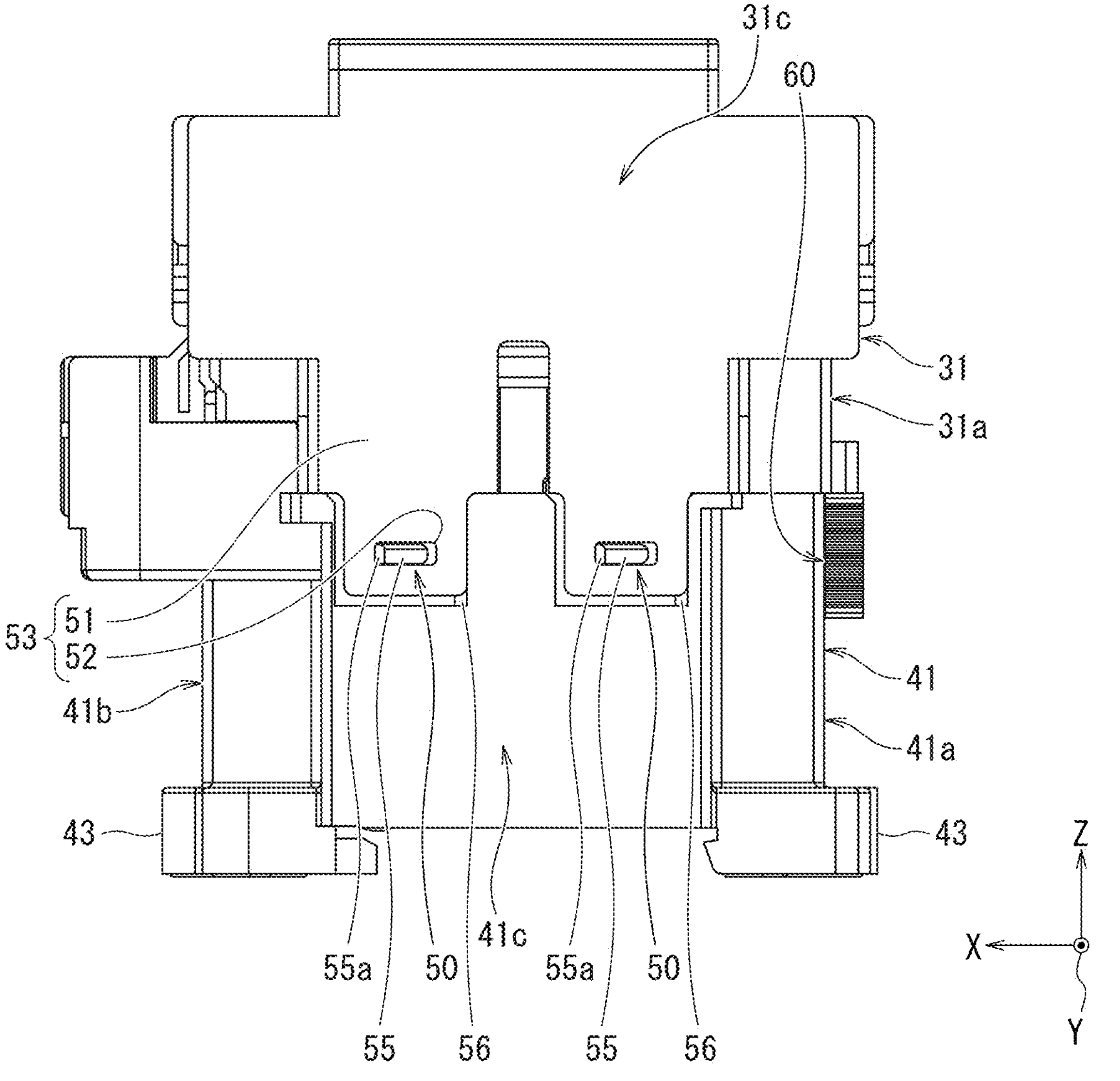
FIG. 10A is a front view for illustrating release of the connection of the first frame and the second frame.
Figure 10B:
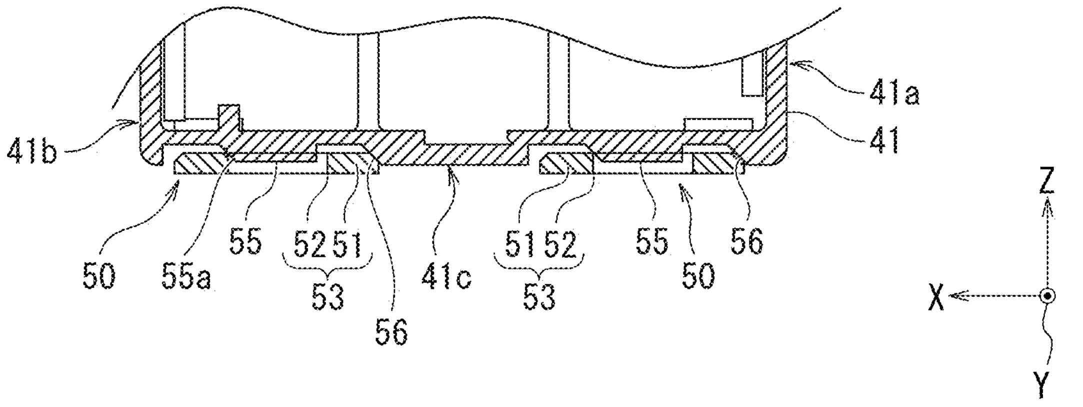
FIG. 10B is a sectional view for illustrating the release of the connection of the first frame and the second frame.
Figure 11A:
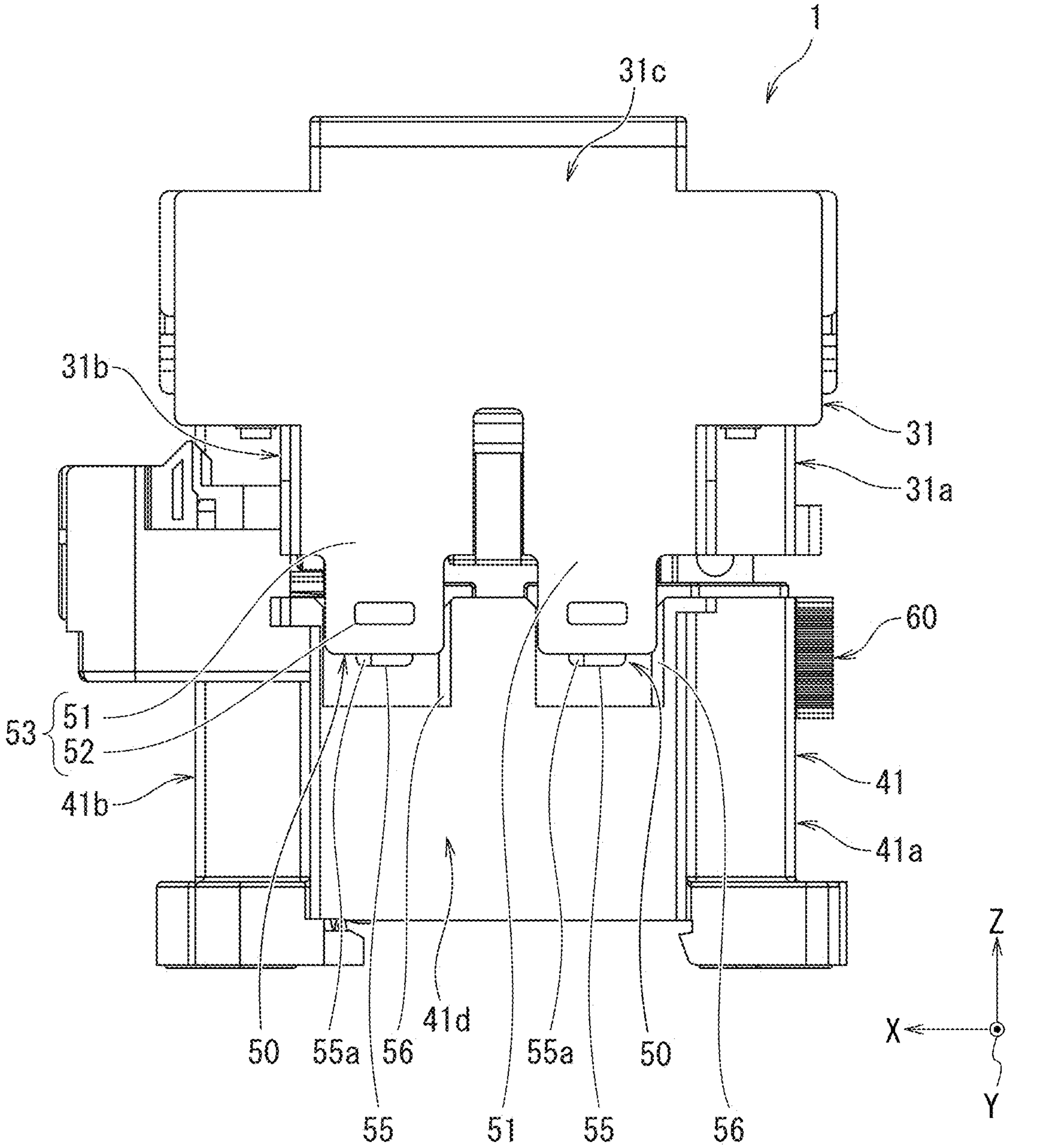
FIG. 11A is a front view for illustrating the release of the connection of the first frame and the second frame.

Next, release of the connection of the first frame 31 and the second frame 41 will be described with reference to FIGS. 10A, 10B, 11A, and 11B. Note that FIGS. 10A and 11A illustrate the side walls 31*c* and 41*c* sides of the first frame 31 and the second frame 41, respectively, as in FIG. 3.

Figure 11B:
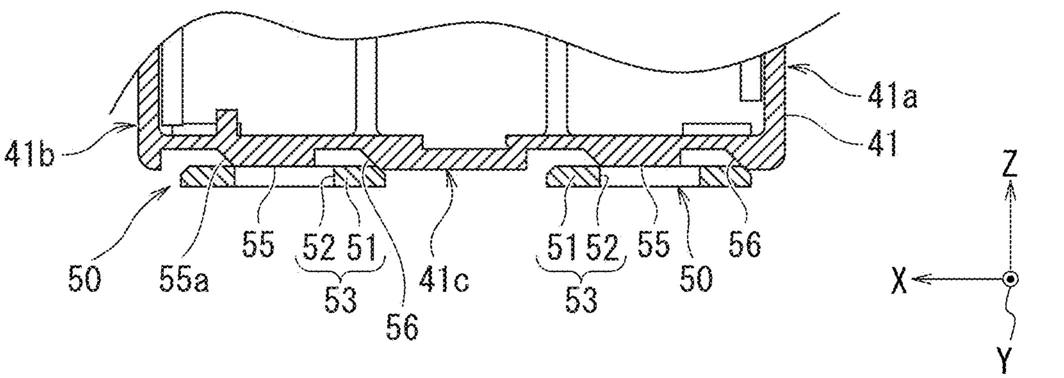
FIG. 11B is a sectional view for illustrating the release of the connection of the first frame and the second frame.

First, from the state where the first frame 31 and the second frame 41 are connected by the snap-fit mechanisms 50 (see FIGS. 3, 4A, and 4B), the first frame 31 and the second frame 41 are relatively displaced in the X direction to bring the inner wall surface of the flexible protruding plate portion 51 into contact with the second inclined surface 55*a* of the fitting projection portion 55 and bring the flexible protruding plate portion 51 into contact with the third inclined surface 56. Then, by further relatively displacing the first frame 31 and the second frame 41 in the X direction, the inner wall surface of the flexible protruding plate portion 51 moves in contact with the second inclined surface 55*a* of the fitting projection portion 55, and the flexible protruding plate portion 51 moves in contact with the third inclined surface 56, whereby the flexible protruding plate portion 51 bends outward, as illustrated in FIGS. 10A and 10B. After that, the fitting projection portions 55 move outward from insides of the fitting hole portions 52 of the flexible protruding plate portions 51. Then, by separating the first frame 31 and the second frame 41 relatively from each other in the Z direction, the fitting between the fitting hole portions 52 of the flexible protruding plate portions 51 and the fitting projection portions 55 is released, as illustrated in FIGS. 11A and 11B. This allows for release of the connection of the first frame 31 and the second frame 41 by the snap-fit mechanisms 50. In other words, the snap-fit mechanisms 50 can release the connection of the first frame 31 and the second frame 41 by relatively displacing the first and second frames 31 and 41 in the X direction, which can therefore eliminate the need to use a tool.

<Effects of First Embodiment>

Next, main effects of this first embodiment will be described.

The electromagnetic contactor 1 according to this first embodiment includes the snap-fit mechanism 50. Then, as described above, the snap-fit mechanism 50 can release the fitting between the fitting hole portion 52 and the fitting projection portion 55 by relatively displacing the first frame 31 and the second frame 41 in the X direction. Therefore, it is unnecessary to use a tool to release the fitting as in the conventional art, and there is no need to bend the flexible protruding plate portions 51 with the tool. Thus, the electromagnetic contactor 1 according to this first embodiment can facilitate replacement of components such as the electromagnetic coil 23 in the main body frame 30. Additionally, since the fitting between the fitting hole portions 52 of the flexible protruding plate portions 51 and the fitting projection portions 55 can be released without using tools, it is possible to eliminate a concern that the flexible protruding plate portions 51 may be broken depending on the amount of force applied when the flexible protruding plate portions 51 are bent with a tool. In addition, by relatively displacing the first frame 31 and the second frame 41 in the X direction, the fitting states of the four snap-fit mechanisms 50 can be released almost simultaneously, so that workability is excellent compared with the case where the plurality of snap-fit mechanisms are released with a tool.

The electromagnetic contactor 1 according to this first embodiment further includes the positioning mechanism 70 that positions the first frame 31 and the second frame 41 in the X direction. Thus, in the electromagnetic contactor 1 according to this first embodiment, when connecting the first frame 31 to the second frame 41, the positioning of the first and second frames 31 and 41 in the X direction can be quickly performed by the positioning mechanism 70, which can therefore improve workability when connecting the first frame 31 to the second frame 41 by the snap-fit mechanism 50.

Furthermore, the flexible positioning plate portion 71 of the positioning mechanism 70 has the elastic force that urges the inner surface of the outer peripheral side wall of the second frame 41 after connecting the first frame 31 to the second frame 41. Therefore, even though the first frame and the second frame can be relatively displaced in the X direction by the snap-fit mechanism 50, rattling (vibration) of the first and second frames in the X direction can be suppressed by the elastic force of the flexible positioning plate portion 71.

Note that while the above first embodiment has described the snap-fit mechanism 50 provided with the fitting hole portion 52 in the first frame 31 and the fitting projection portion 55 in the second frame 41, the present invention is not limited to the snap-fit mechanism 50 of the first embodiment described above. For example, the present invention can be applied to a snap-fit mechanism provided with the fitting projection portion 55 in the first frame 31 and the fitting hole portion 52 in the second frame 41. In other words, the present invention can be applied to an electromagnetic contactor including a snap-fit that includes a hook portion in which a fitted portion is provided on the tip side of the flexible protruding plate portion 51 protruding from the open end side of one frame of the first and second frames 31 and 41 and a fitting projection portion provided in the other frame thereof and fitting with the fitted portion.

Additionally, the above first embodiment has described the case where each two snap-fit mechanisms 50 are provided on each of the two side walls 31*c* and 31*d* of the first frame 31 located on the opposite sides of each other in the Y direction. However, the number of the snap-fit mechanisms 50 to be provided is not limited to that of the first embodiment described above. For example, each one snap-fit mechanism 50 may be provided on each of the two side walls 31*c* and 31*d*, or three or more snap-fit mechanisms 50 may be provided on each thereof.

In addition, while the above first embodiment has described the case where the fitting hole portion 52 is used as the fitted portion of each snap-fit mechanism 50, the present invention is not limited to the fitting hole portion 52. For example, a fitting recessed portion may be used as the fitted portion.

Second Embodiment

This second embodiment will describe an example in which the present invention is applied to a case main body of an electromagnetic contactor as a case for an electric device.

<<Overall Configuration of Electromagnetic Contactor>>

Figure 12:
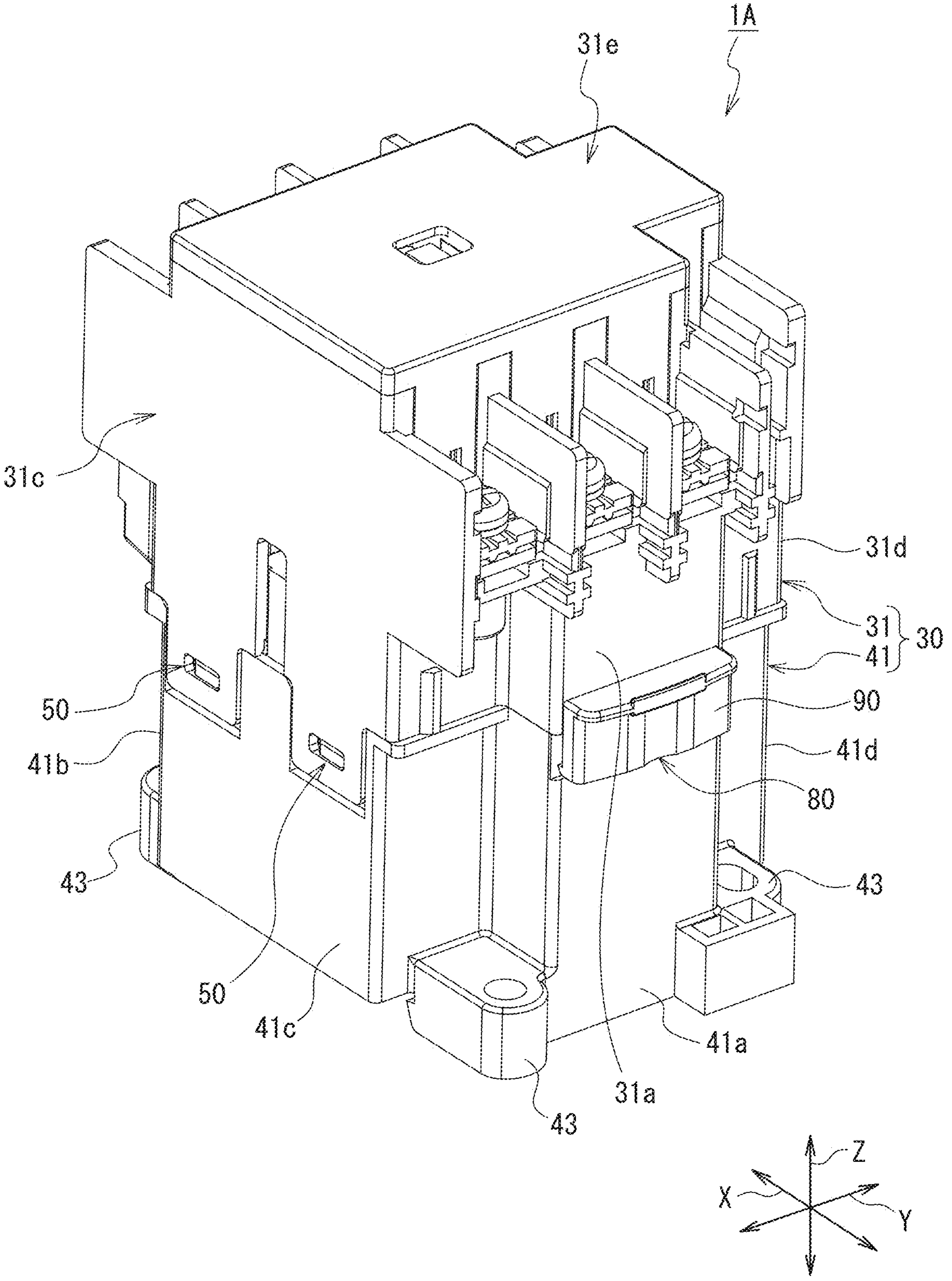
FIG. 12 is a perspective view illustrating an external configuration of an electromagnetic contactor provided with a case for an electric device according to a second embodiment of the present invention.
Figure 13:
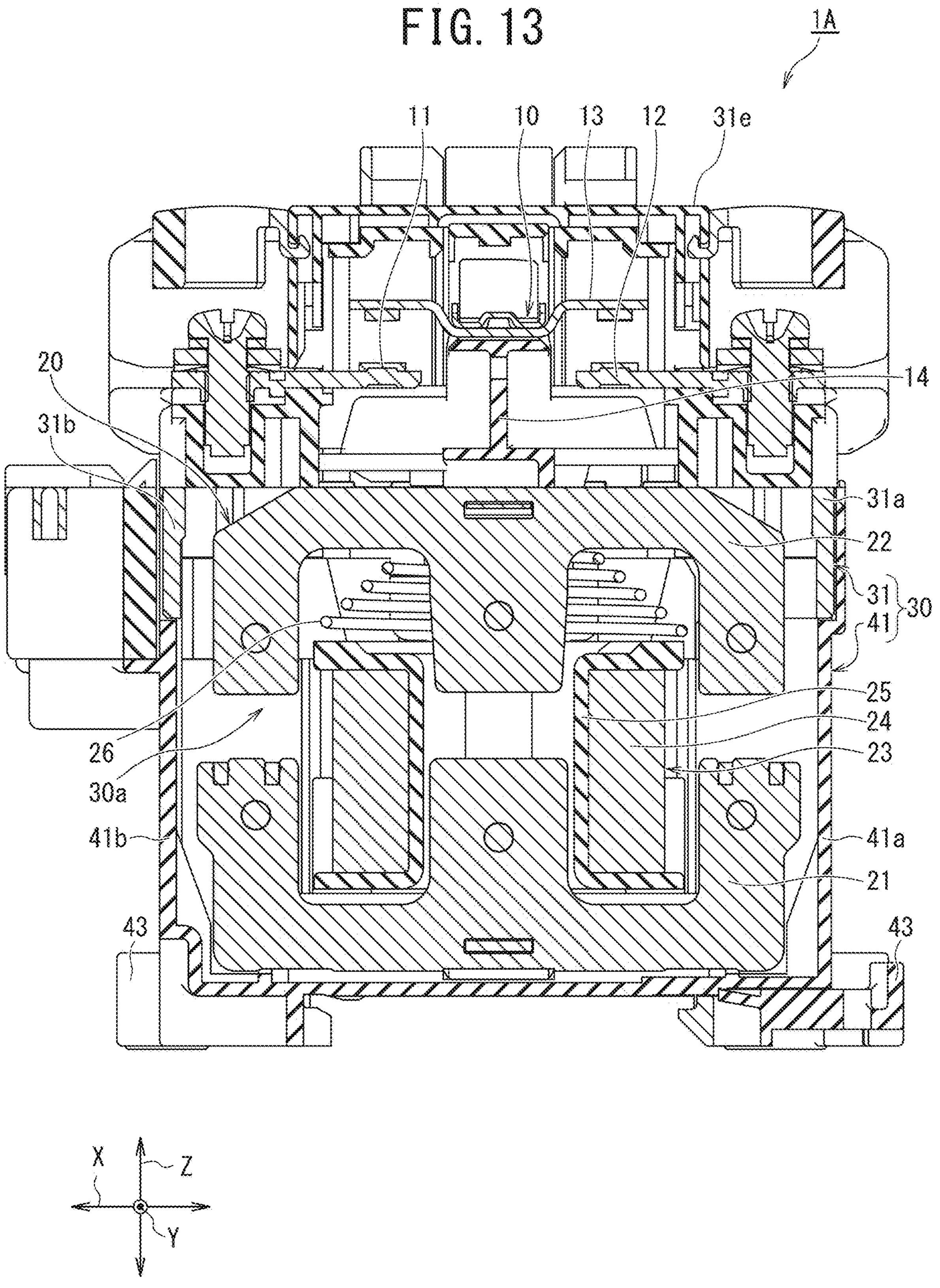
FIG. 13 is a sectional view illustrating an internal structure of the electromagnetic contactor.

As illustrated in FIGS. 12 and 13, an electromagnetic contactor 1A according to the second embodiment of the present invention as an electric device includes the contact unit 10 and the electromagnet unit 20 that drives the contact unit 10. Additionally, the electromagnetic contactor 1A according to the second embodiment of the present invention further includes the main body frame 30 that houses the contact unit 10 and the electromagnet unit 20 in the housing section 30*a*, as a case for an electric device. The contact unit 10 and the electromagnet unit 20 are arranged in series in the Z direction (first direction) and housed in the housing section 30*a* of the main body frame 30. The electromagnetic contactor 1A opens and closes a three-phase AC circuit.

<Contact Unit>

As illustrated in FIG. 13, the contact unit 10 includes the pair of fixed contact elements 11 and 12, the bridge type movable contact element 13 arranged to be capable of contacting with and separating from the pair of fixed contact elements 11 and 12, and the movable contact support 14 holding the movable contact element 13.

The pair of fixed contact elements 11 and 12 extend in the X direction (second direction), and have a fixed contact at one end side thereof and an external terminal portion at the other end side thereof. Then, the pair of fixed contact elements 11 and 12 are fixed to the main body frame 30 in the state where the respective one end sides thereof face each other and are separated from each other in the X direction.

The movable contact element 13 extends in the X direction, and is provided with a movable contact on one end side thereof and the other end side thereof, respectively. The movable contact on the one end side of the movable contact element 13 and the fixed contact of the one fixed contact element 11 are arranged to face each other. The movable contact at the other end side of the movable contact element 13 and the fixed contact of the other fixed contact element 12 are arranged to face each other. The movable contact element 13 is held by the movable contact support 14. The pair of fixed contact elements 11 and 12 and the movable contact element 13 form a contact section, and three contact sections are arranged side by side in the Y direction to correspond to the three-phase AC circuit.

<Electromagnet Unit>

As illustrated in FIG. 13, the electromagnet unit 20 includes the fixed iron core 21, the movable iron core 22, the electromagnetic coil 23, and the return spring 26. The fixed iron core 21 and the movable iron core 22 are arranged so that respective pole contact surfaces thereof face each other.

The electromagnetic coil 23 generates the magnetic field that attracts the fixed iron core 21 and the movable iron core 22 by electromagnetic force. The electromagnetic coil 23 includes the winding 24 and the bobbin 25. The winding 24 passes between the central leg portion and the outer leg portion of each of the fixed iron core 21 and the movable iron core 22, and circles around the central leg portion. The bobbin 25 has the winding 24 wound thereon. The bobbin 25 has the cylindrical portion in which the central leg portion of each of the fixed iron core 21 and the movable iron core 22 is inserted into the inner diameter side thereof, and the winding 24 is wound on the outer diameter side thereof. Additionally, the bobbin 25 is provided with the flange portions protruding in the flange shape from both end portions of the cylindrical portion to the outer diameter side thereof. The electromagnetic coil 23 can be replaced according to the type of power supply used by the customer.

The return spring 26 is an urging means for urging the movable iron core 22 in a direction away from the fixed iron core 21. The return spring 26 is, for example, a coil spring provided between the upper surface of the bobbin 25 of the electromagnetic coil 23 and the movable iron core 22.

The pair of fixed contact elements 11 and 12 and the movable contact element 13 are electric contacts that switch circuit connection and disconnection by contacting with and separating from each other.

As illustrated in FIG. 13, the movable contact element 13 is fixed to one end side of the movable contact support 14 in the Z direction. Then, the other end side of the movable contact support 14 in the Z direction is fixed to the back surface portion opposite to the leg portion side of the movable iron core 22. The movable contact element 13 moves in the Z direction in conjunction with movement of the movable iron core 22 in the Z direction. In other words, the pair of fixed contact elements 11 and 12 and the movable contact element 13 separate from each other in the released state where the fixed iron core 21 and the movable iron core 22 are separated from each other, and contact with each other in the energized state where the fixed iron core 21 and the movable iron core 22 are in contact with each other.

A contact spring is provided on the side of the movable contact element 13 opposite to the movable iron core 22 side, although it is not illustrated.

<Main Body Frame>

As illustrated in FIGS. 12 and 13, the main body frame 30 includes the first frame 31 and the second frame 41 facing each other in the Z direction to form the housing section 30*a* and the snap-fit mechanism 50 that connects the first frame 31 to the second frame 41.

The first frame 31 is formed by the bottomed cylindrical body in which one end side of the square cylindrical outer peripheral side wall having the four side walls 31*a*, 31*b*, 31*c*, and 31*d* is opened and the other end side opposite to the one end side of the outer peripheral side wall is closed by the bottom wall 31*e*. Similarly, the second frame 41 is also formed by the bottomed cylindrical body in which one end side of the square cylindrical outer peripheral side wall having the four side walls 41*a*, 41*b*, 41*c*, and 41*d* is opened and the other end side opposite to the one end side of the outer peripheral side wall is closed by a bottom wall. The side walls 31*a* and 41*a* and the side walls 31*b* and 41*b* are located on the opposite sides of each other in the X direction. The side walls 31*c* and 41*c* and the side walls 31*d* and 41*d* are located on the opposite sides of each other in the Y direction.

The first frame 31 is provided with a primary terminal portion electrically connected to the fixed contact element 11, which is one of the pair of fixed contact elements 11 and 12, and a secondary terminal portion electrically connected to the fixed contact element 12, which is the other one of the pair of fixed contact elements 11 and 12. The mounting plate portion 43 having a mounting hole is provided at the four corners of the second frame 41 on the bottom wall side. The first frame 31 and the second frame 41 are made of, for example, a nylon-based thermoplastic insulating resin excellent in heat resistance and insulation properties.

Note that, in this second embodiment, the side housing the contact unit 10 is the first frame 31 including the flexible protruding plate portion 51, and the side housing the electromagnet unit 20 is the second frame 41 including the fitting projection portion 55, but on the contrary, the side housing the electromagnet unit 20 may be the first frame including the flexible protruding plate portion 51, and the side housing the contact unit 10 may be the second frame including the fitting projection portion 55.

<Snap-Fit Mechanism>

Figure 14:
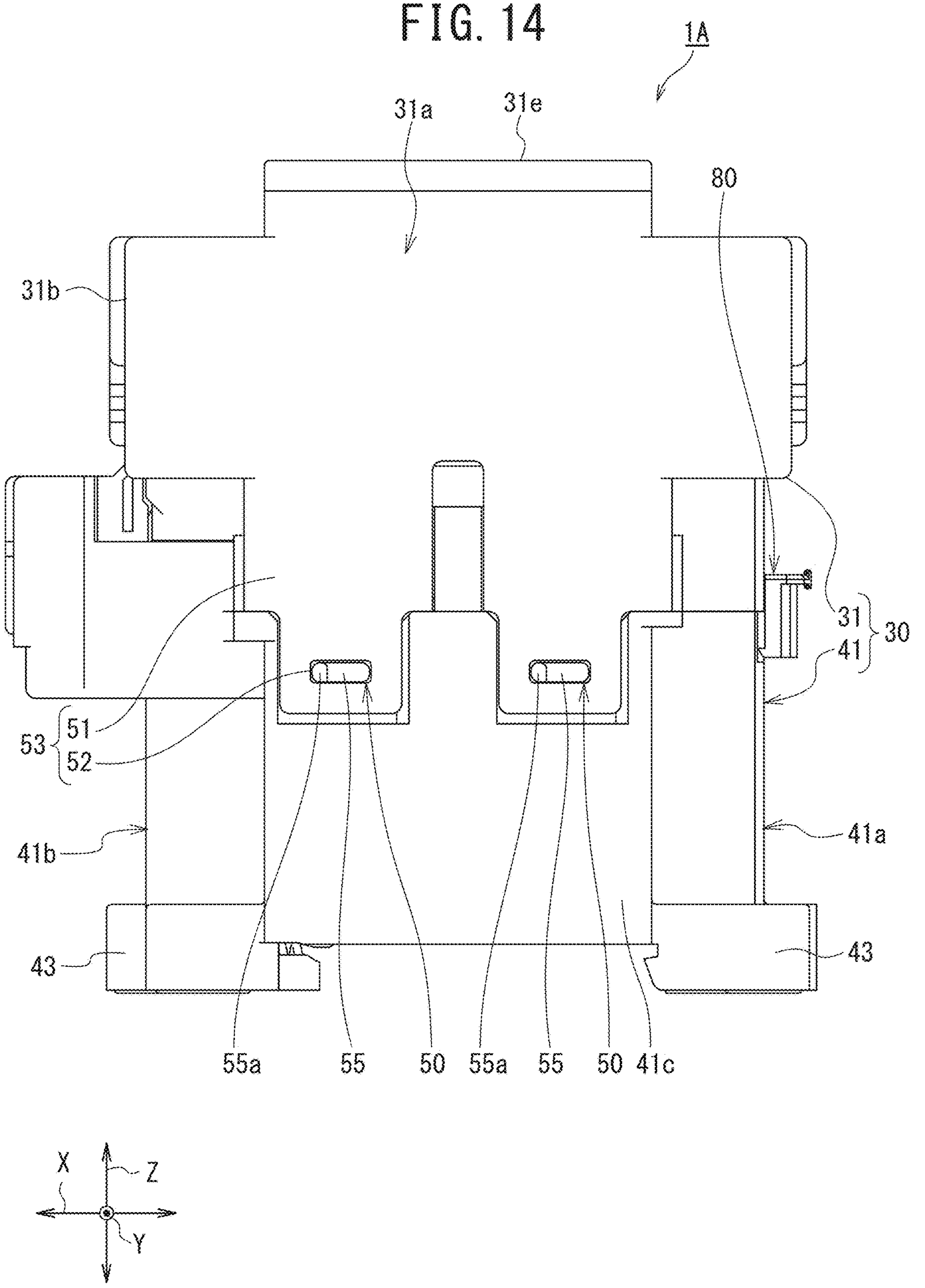
FIG. 14 is a front view of the electromagnetic contactor.
Figure 15A:
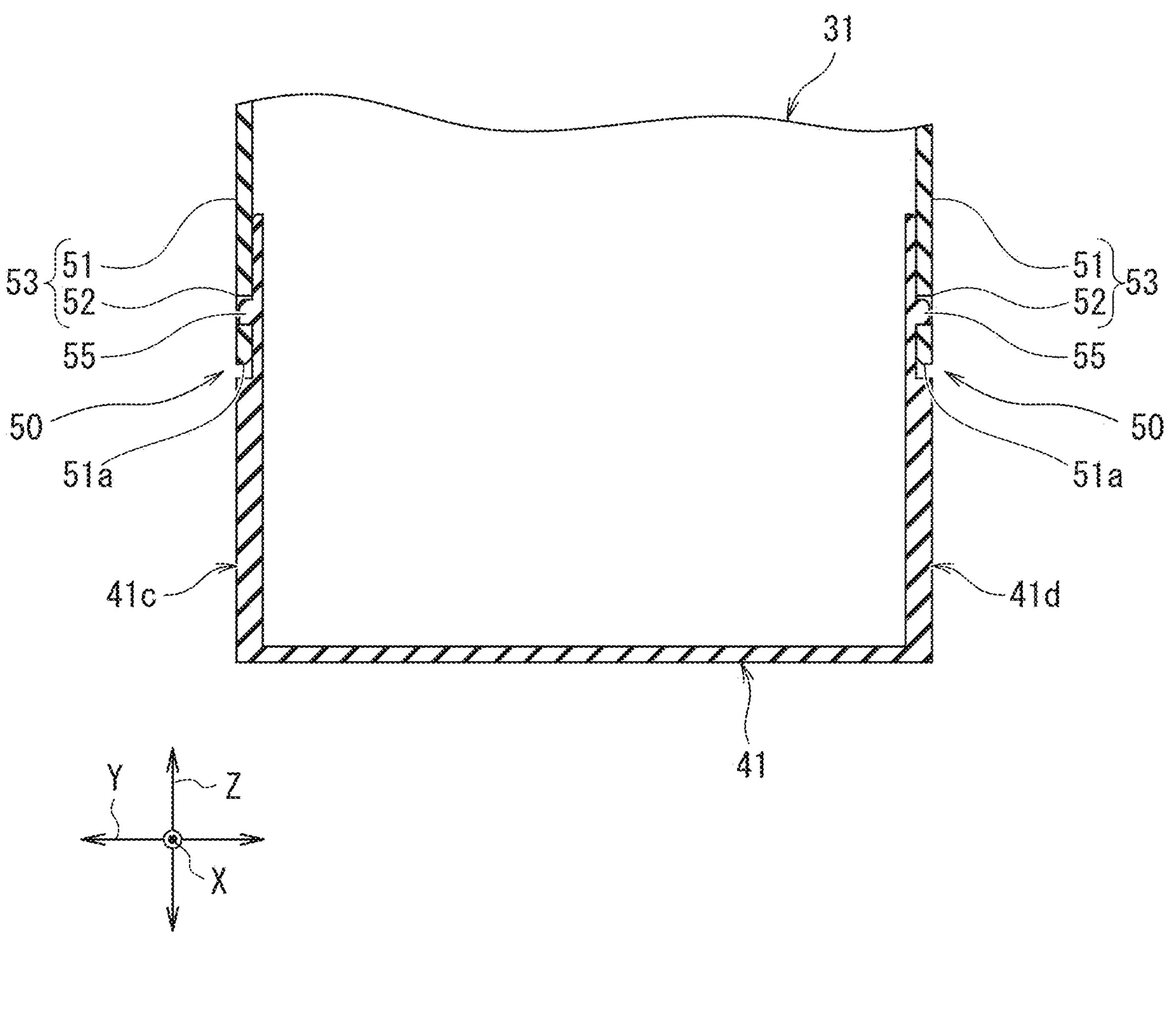
FIG. 15A is a sectional view illustrating a connected state of the first frame and the second frame in a Y direction.
Figure 15B:
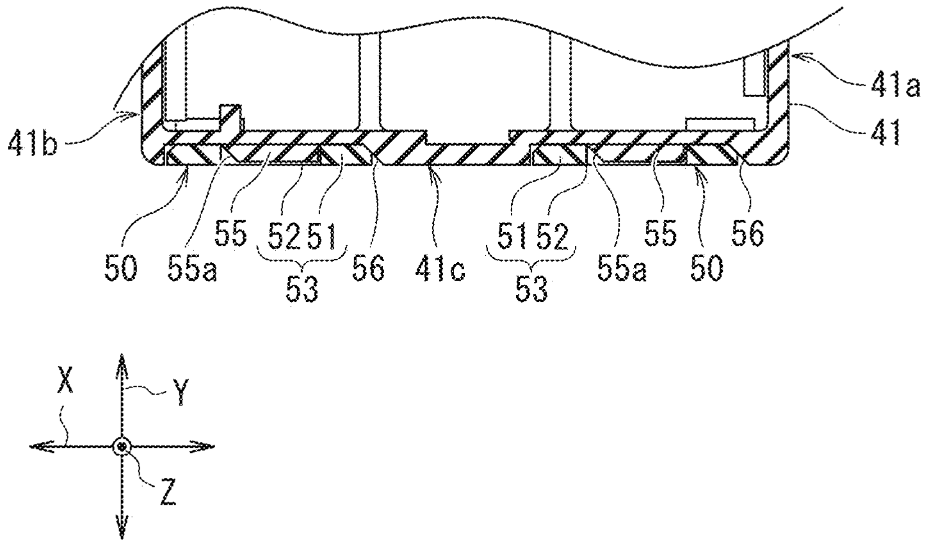
FIG. 15B is a sectional view illustrating a connected state of the first frame and the second frame in an X direction.

As illustrated in FIGS. 14, 15A, and 15B, the snap-fit mechanism 50 includes the hook portion 53 provided with the fitting hole portion (opening portion) 52 as a fitted portion on the tip side of the flexible protruding plate portion 51 protruding from the open end of the first frame 31, which is one of the first and second frames 31 and 41, and the fitting projection portion 55 provided in the second frame 41, which is the other one of the first and second frames 31 and 41, and fitted with the fitting hole portion 52 of the flexible protruding plate portion 51.

Figure 16:
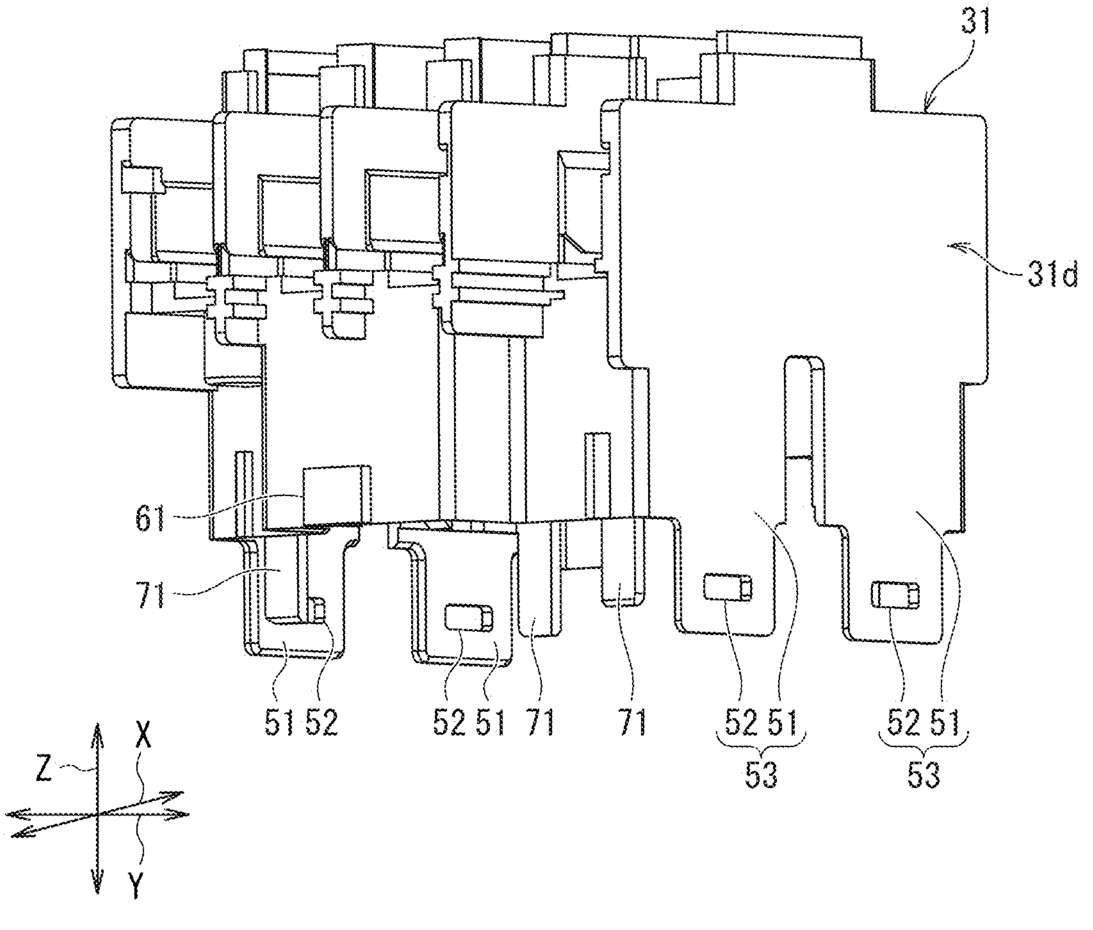
FIG. 16 is a perspective view of the first frame.
Figure 17:
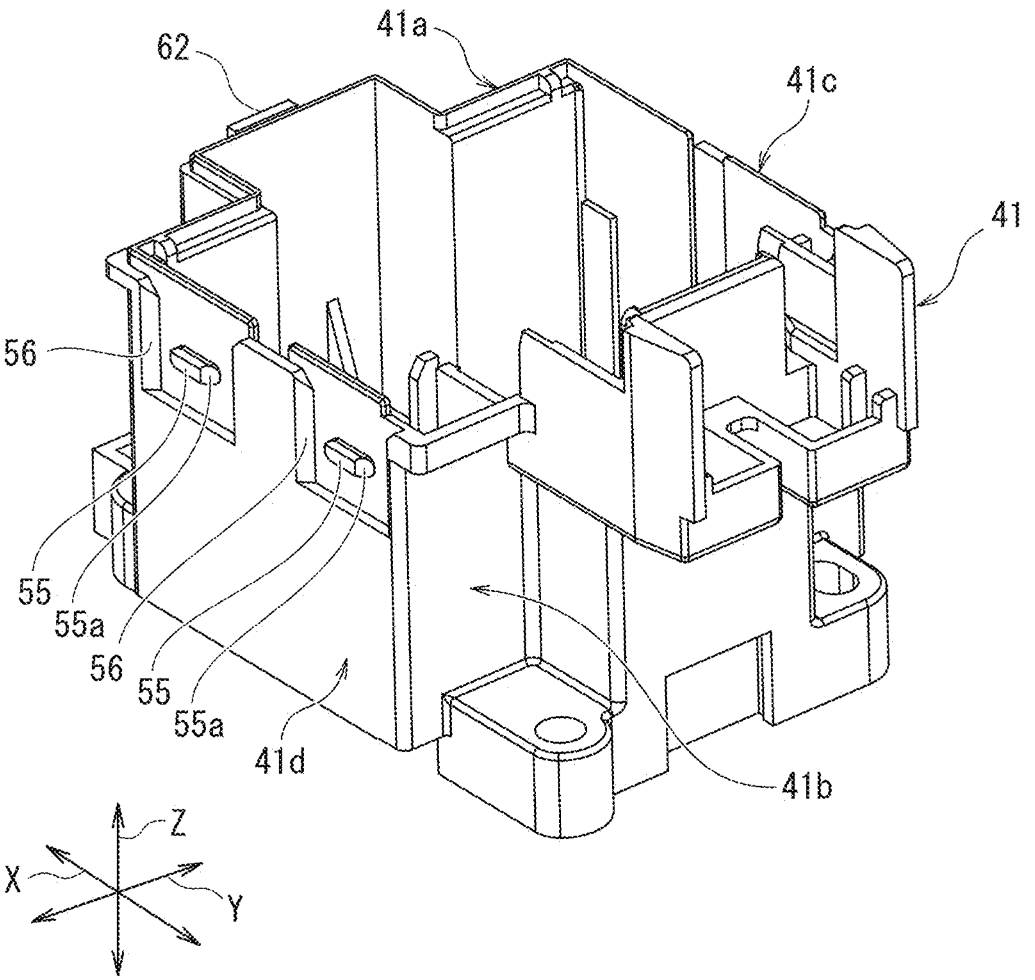
FIG. 17 is a perspective view of the second frame.

The flexible protruding plate portion 51 extends along the Z direction, and has a base portion integrated with the first frame 31, in which the tip side opposite to the base portion thereof protrudes from the open end side of the first frame 31 (see FIG. 16). Then, the tip of the flexible protruding plate portion 51 faces the outer surface of the outer peripheral side wall of the second frame 41.

The fitting hole portion 52 penetrates through the front and back surfaces of the flexible protruding plate portion 51 facing each other on the tip side of the flexible protruding plate portion 51. The fitting projection portion 55 of the second frame 41 is fitted into the fitting hole portion 52 and fits therewith. Note that while this second embodiment uses the fitting hole portion 52 as the fitted portion, a fitting recessed portion may be used as the fitted portion.

The fitting hole portion 52 and the fitting projection portion 55 are fitted by bringing the first and second frames 31 and 41 into relative proximity in the Z direction (first direction), and the fitting is released by relatively displacing the first and second frames 31 and 41 in the X direction (second direction) orthogonal to the Z direction.

The flexible protruding plate portion 51 includes the first inclined surface 51*a* that contacts with the fitting projection portion 55 to bend the flexible protruding plate portion 51 outward at the time of the fitting where the fitting hole portion 52 and the fitting projection portion 55 are fitted by bringing the first and second frames 31 and 41 into relative proximity in the Z direction. In other words, the flexible protruding plate portion 51 includes the first inclined surface 51*a* in the Z direction in which the fitting hole portion 52 and the fitting projection portion 55 are fitted. The first inclined surface 51*a* is inclined with an inclination in the direction in which the thickness of the tip portion of the flexible protruding plate portion 51 gradually increases toward the base portion thereof. The fitting projection portion 55 includes the second inclined surface 55*a* that contacts with the inner surface of the fitting hole portion 52 to bend the flexible protruding plate portion 51 outward when releasing the fitting between the fitting hole portion 52 and the fitting projection portion 55 by relatively displacing the first and second frames 31 and 41 in the X direction orthogonal to the Z direction. In other words, the fitting projection portion 55 includes the second inclined surface 55*a* in the X direction in which the fitting between the fitting hole portion 52 and the fitting projection portion 55 is released. The second inclined surface 55*a* is inclined with an inclination in the direction in which the thickness of the fitting projection portion 55 gradually increases from a position where flexible protruding plate portion 51 contacts the surface.

The second frame 41, which is the other one of the first and second frames 31 and 41 that is provided with the fitting projection portion 55, includes the third inclined surface 56 that contacts with the tip side of the flexible protruding plate portion 51 to bend the flexible protruding plate portion 51 outward when releasing the fitting between the fitting hole portion 52 and the fitting projection portion 55 by relatively displacing the first frame 31 and the second frame 41 in the X direction orthogonal to the Z direction. The third inclined surface 56 is provided on the outer surface side of the outer peripheral side wall of the second frame 41. In other words, the snap-fit mechanism 50 includes the third inclined surface 56 provided in the second frame 41. The third inclined surface 56 is inclined with an inclination in the direction in which the wall thickness gradually increases toward the side wall surface from the position where the flexible protruding plate portion 51 contacts the surface.

As illustrated in FIG. 14 to FIG. 17, there are provided a total of four snap-fit mechanisms 50, each two of which are arranged side by side in the X direction on each of the portions of the outer peripheral side wall of the main body frame 30 located on the opposite sides of each other in the Y direction. In other words, the hook portions 53 each including the flexible protruding plate portion 51, the first inclined surface 51*a*, and the fitting hole portion 52 are provided away from each other in the X direction on the outer surface of each of the two side walls 31*c* and 31*d* located on the opposite sides of each other in the Y direction (third direction) of the first frame 31. Additionally, the fitting projection portion 55 including the second inclined surface 55*a* and the third inclined surface 56 are provided away from each other in the X direction on the outer surface of each of the two side walls 41*c* and 41*d* of the second frame 41 located on the opposite sides of each other in the Y direction.

Note that the snap-fit mechanism 50 may be provided on one of the two side walls of the main body frame 30 located on the opposite sides of each other, but preferably, one or more snap-fit mechanisms 50 are provided on each of the side walls of the main body frame 30 located on the opposite sides of each other.

<Relative Displacement Suppression Mechanism>

As illustrated in FIGS. 12 and 14, the main body frame 30 further includes a relative displacement suppression mechanism 80 that suppresses a relative displacement between the connected first and second frames 31 and 41. The relative displacement suppression mechanism 80 of this second embodiment can suppress, as the relative displacement, a relative displacement in each of the X direction and the Y direction (horizontal misalignment) in a two-dimensional plane orthogonal to the direction (Z direction) of the connection of the first frame 31 and the second frame 41. Additionally, relative displacement in the Z direction (vertical misalignment) can also be suppressed.

Figure 18A:
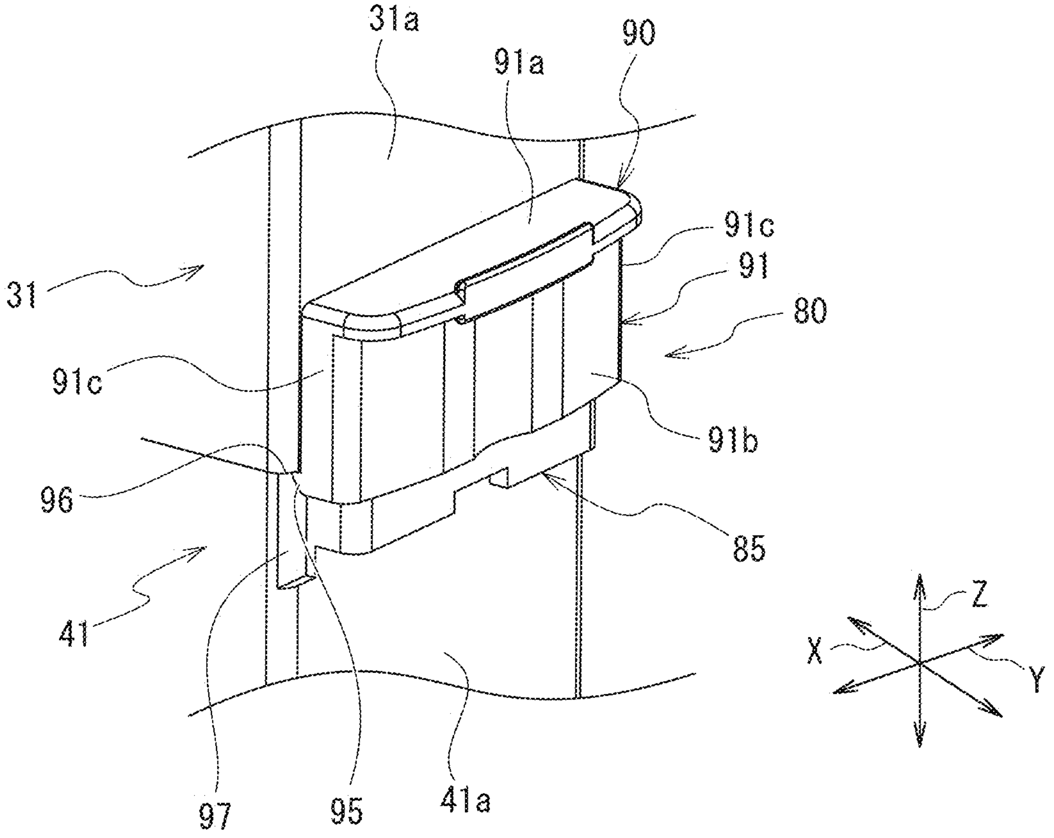
FIG. 18A is a perspective view illustrating a state where a fixed member of a relative displacement suppression mechanism is attached to a first fixing portion on the first frame.
Figure 18B:
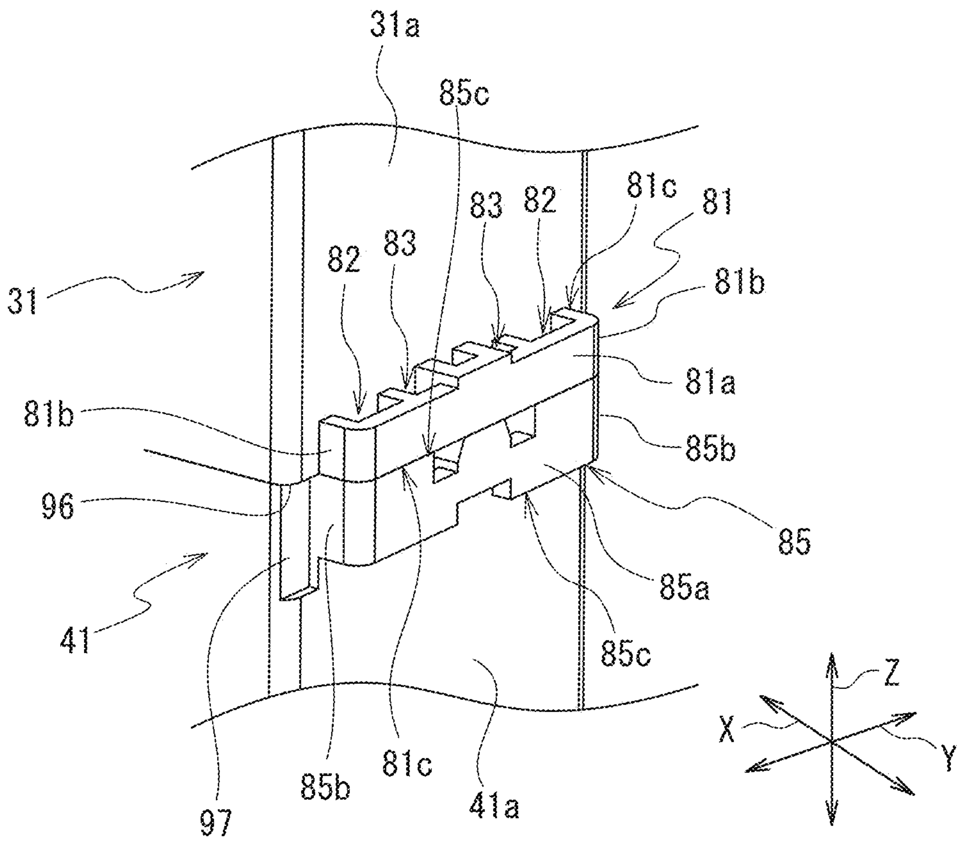
FIG. 18B is a perspective view illustrating the first fixing portion and a second fixing portion of the relative displacement suppression mechanism.
Figure 19A:
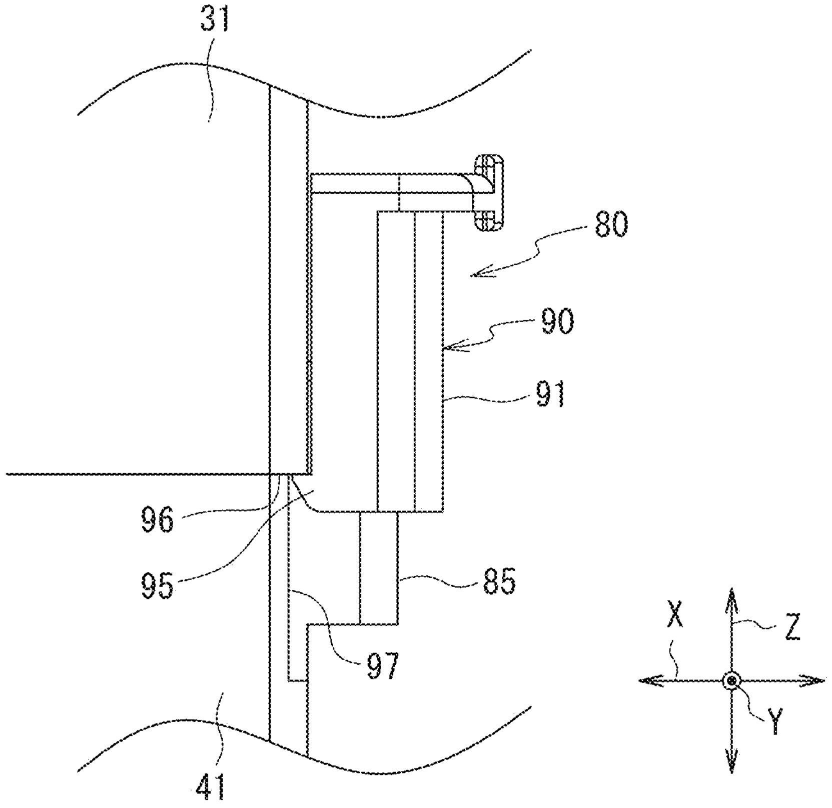
FIG. 19A is a side view illustrating a state where relative displacement suppression of the relative displacement suppression mechanism is released.

As illustrated in FIGS. 18A and 18B, the relative displacement suppression mechanism 80 includes a first fixing portion 81 provided on the side wall 31*a* of the first frame 31, a second fixing portion 85 provided on the side wall 41*a* of the second frame 41, and a fixed member 90 that can be detachably attached to the first and second fixing portions 81 and 85. Then, the relative displacement suppression mechanism 80 has a first state where the fixed member 90 is fixed to both the first fixing portion 81 and the second fixing portion 85, as illustrated in FIGS. 20A and 20B, and, as a second state where the fixed member 90 is fixed to either the first fixing portion 81 or the second fixing portion 85, a second state where the fixed member 90 is fixed to the first fixing portion 81, as illustrated in FIGS. 19A and 19B.

The first fixing portion 81 and the second fixing portion 85 are provided to overlap each other in the Z direction when connecting the first frame 31 to the second frame 41. The fixed member 90 moves from the first fixing portion 81 side toward the second fixing portion 85 side and is connected and fixed to each of the first fixing portion 81 and the second fixing portion 85 (the first state), which will be described in detail later. In this second embodiment, as illustrated in FIGS. 18A, 19A, and 19B, the fixed member 90 is detachably held on the first fixing portion 81 side (the second state). Then, by moving the fixed member 90 in the held state (the second state) from the first fixing portion 81 side toward the second fixing portion 85 side (moving it from the state (the second state) illustrated in FIGS. 19A and 19B to the state (the first state) illustrated in FIGS. 20A and 20B), the relative displacement between the connected first and second frames 31 and 41 can be suppressed. Additionally, by moving the fixed member 90 in this relative displacement suppression state from the second fixing portion 85 side toward the first fixing portion 81 side (moving it from the state (the first state) illustrated in FIGS. 20A and 20B to the state (the second state) illustrated in FIGS. 19A and 19B), the relative displacement suppression of the connected first and second frames 31 and 41 can be released. The fixed member 90 slides over the first fixing portion 81 and the second fixing portion 85. In other words, the relative displacement suppression mechanism 80 can suppress and release the relative displacement between the connected first and second frames 31 and 41 without using tools (in a tool-less manner).

The first fixing portion 81 is formed on the side wall 31*a* of the first frame 31 by integral molding. The second fixing portion 85 is formed on the side wall 41*a* of the second frame 41 by integral molding.

Figure 19B:
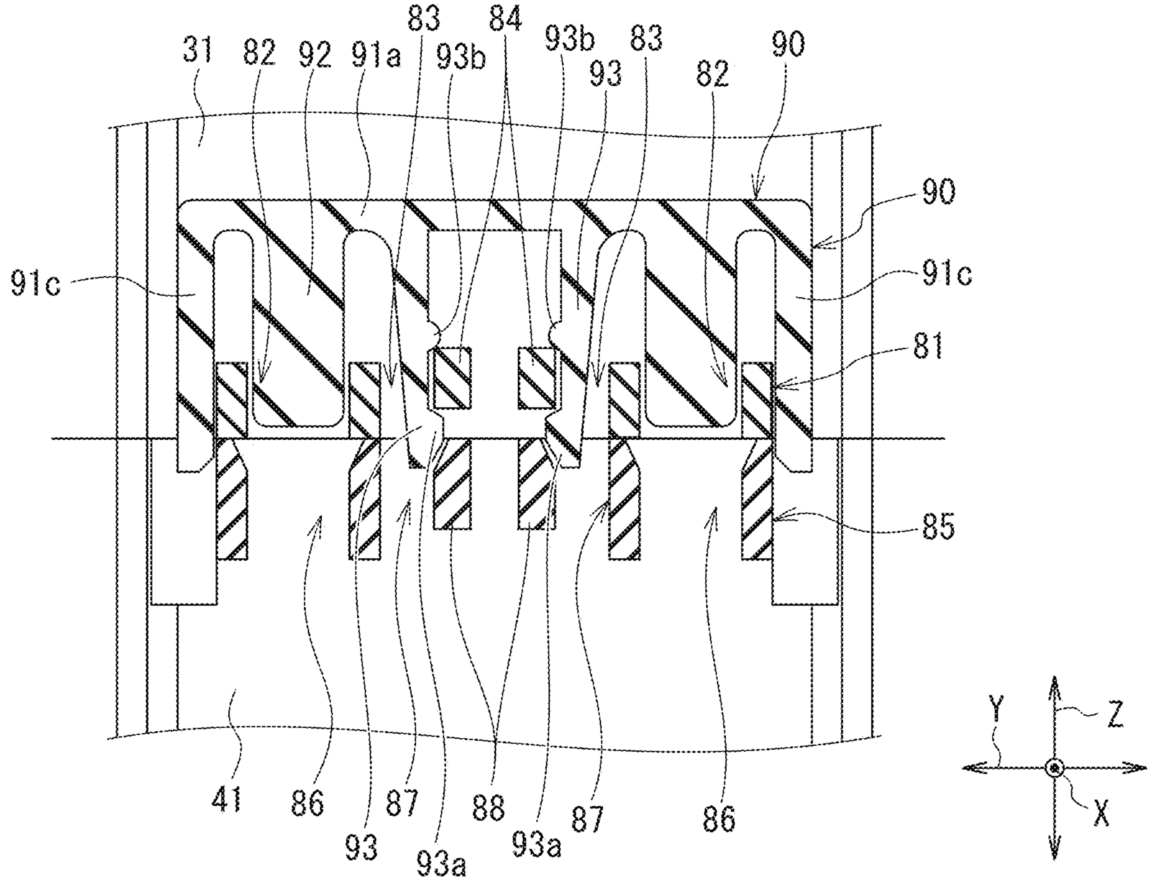
FIG. 19B is a sectional view illustrating the state where the relative displacement suppression of the relative displacement suppression mechanism is released.
Figure 20A:
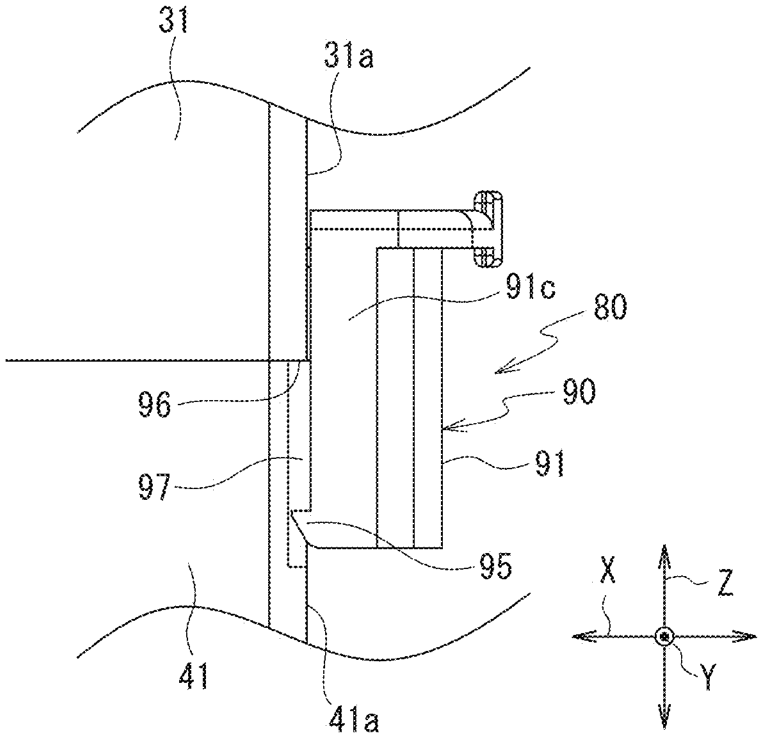
FIG. 20A is a side view illustrating a state where relative displacement is suppressed by the relative displacement suppression mechanism.
Figure 20B:
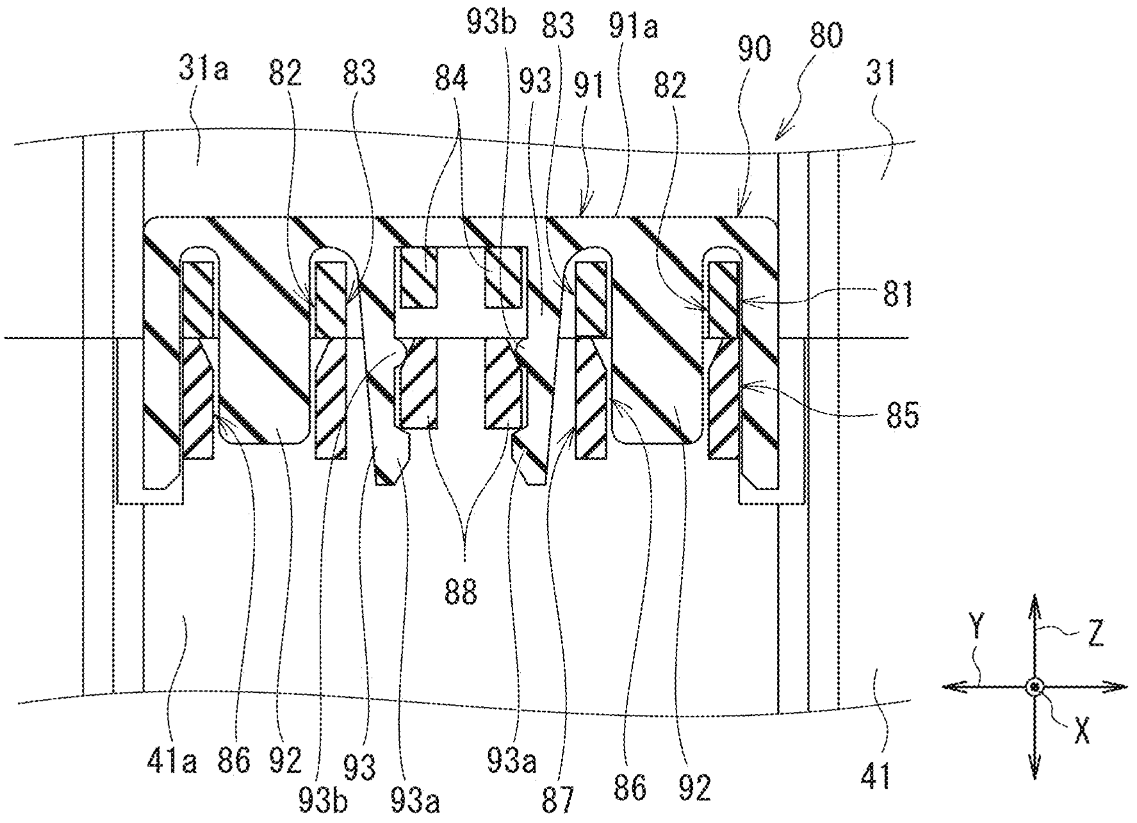
FIG. 20B is a sectional view illustrating the state where the relative displacement is suppressed by the relative displacement suppression mechanism.

As illustrated in FIGS. 18B and 19B, the first fixing portion 81 is formed by a rectangular parallelepiped three-dimensional structure including a front portion 81*a*, two side face portions 81*b* located on opposite sides of each other in the Y direction, and two end face portions 81*c* located on opposite sides of each other in the Z direction. Additionally, the first fixing portion 81 includes a first piece insertion portion 82 into which an insertion piece 92, which will be described later, is inserted and a first arm insertion portion 83 into which a flexible arm 93, which will be described later, is inserted. Each of the first piece insertion portion 82 and the first arm insertion portion 83 is formed by a through hole extending from one end face portion 81*c* side of the first fixing portion 81 to the other end face portion 81*c* side thereof.

Two first piece insertion portions 82 are provided to be spaced apart from each other in the Y direction. In addition, two first arm insertion portions 83 are provided to be spaced apart from each other in the Y direction between the two first piece insertion portions 82.

As illustrated in FIGS. 18B and 19B, the second fixing portion 85 is formed by a rectangular parallelepiped three-dimensional structure including a front portion 85*a*, two side face portions 85*b* located on opposite sides of each other in the Y direction, and two end face portions 85*c* located on opposite sides of each other in the Z direction. Additionally, the second fixing portion 85 includes a second piece insertion portion 86 into which the insertion piece 92 is inserted and a second arm insertion portion 87 into which the flexible arm 93 is inserted. Each of the second piece insertion portion 86 and the second arm insertion portion 87 is formed by a through hole extending from one end face portion 85*c* side of the second fixing portion 85 to the other end face portion 85*c* side thereof.

Two second piece insertion portions 86 are provided to be spaced apart from each other in the Y direction. In addition, two second arm insertion portions 87 are provided to be spaced apart from each other in the Y direction between the two second piece insertion portions 86.

Note that, in this second embodiment, each insertion piece 92 is inserted from the first piece insertion portion 82 side toward the second piece insertion portion 86 side. In such a case, the second piece insertion portions 86 may be formed by recessed portions with bottoms.

As illustrated in FIGS. 18B and 19B, the first fixing portion 81 and the second fixing portion 85 have the same exterior shape dimensions so that when the first and second frames 31 and 41 are connected to each other, the respective front portions 81*a* and 85*a* are flush with each other and the respective side face portions 81*b* and 85*b* are flush with each other in the Z direction.

As illustrated in FIG. 19B, the first piece insertion portions 82 and the second piece insertion portions 86 are configured to be located in straight lines in the Z direction when the first and second frames 31 and 41 are connected to each other. In other words, the first piece insertion portions 82 and the second piece insertion portions 86 are configured to overlap each other in the Z direction. Additionally, the first arm insertion portions 83 and the second arm insertion portions 87 are also configured to be located in straight lines in the Z direction when the first and second frames 31 and 41 are connected to each other. In other words, the first arm insertion portions 83 and the second arm insertion portions 87 are configured to overlap each other in the Z direction.

As illustrated in FIG. 20B, the second fixing portion 85 includes a first engaged portion 88 onto which a first engaging projection portion 93*a* provided on a tip side of the flexible arm 93 is hooked by using flexibility of the flexible arm 93. The first engaged portion 88 is provided on an inner wall of each of the two second arm insertion portions 87, and the first engaged portions 88 are arranged next to each other in the Y direction.

As illustrated in FIG. 19B, the first fixing portion 81 includes a second engaged portion 84 onto which a second engaging projection portion 93*b* provided on the flexible arm 93 so as to be spaced apart from the first engaging projection portion 93*a* is hooked by using the flexibility of the flexible arm 93. The second engaged portion 84 is provided on an inner wall of each of the two first arm insertion portions 83, and the second engaged portions 84 are arranged next to each other in the Y direction.

As illustrated in FIGS. 19B and 20B, the first engaged portions 88 and the second engaged portions 84 are configured to be positioned in a straight line in the Z direction when the first frame 31 and the second frame 41 are connected to each other. In other words, the first engaged portions 88 and the second engaged portions 84 are configured to overlap each other in the Z direction.

Figure 18C:
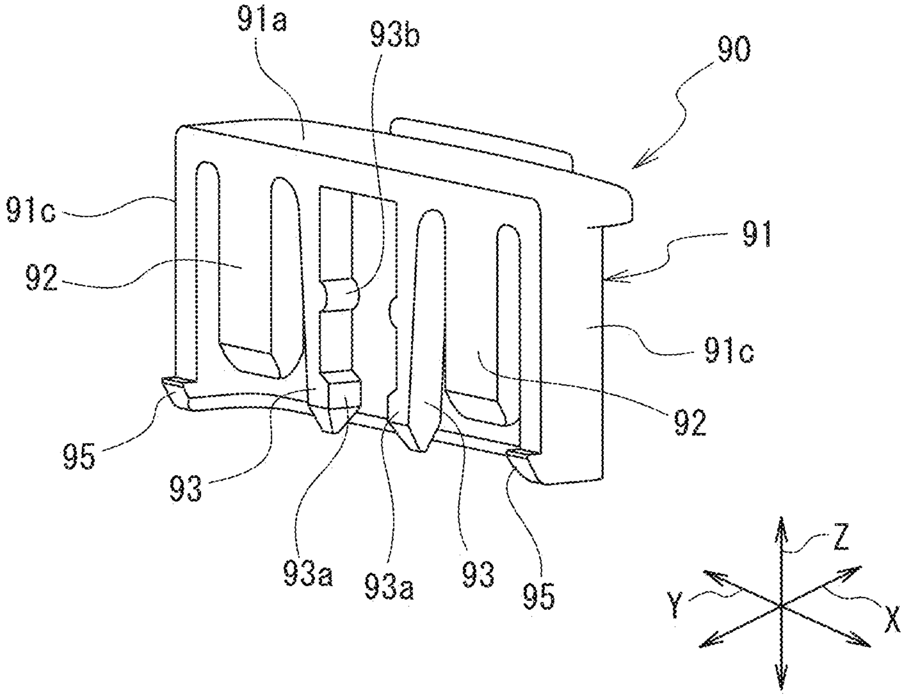
FIG. 18C is a perspective view illustrating the fixed member of the relative displacement suppression mechanism.

As illustrated in FIGS. 18A and 18C, the fixed member 90 includes a member main body 91 and the insertion piece 92 and the flexible arm 93 whose base portions are fixed to the member main body 91.

The member main body 91 includes an upper wall 91*a* having a two-dimensional planar shape (rectangular shape) whose plane includes a longitudinal direction (for example, the Y direction) and a transverse direction (for example, the X direction), a back wall 91*b* extending from one of two long sides of the upper wall 91*a* located on opposite sides of each other in the transverse direction in a direction (for example, the Z direction) orthogonal to the upper wall 91*a*, and two side walls 91*c* each extending along the back wall 91*b* from two short sides of the upper wall 91*a* located on opposite sides of each other in the longitudinal direction thereof. Then, a side of the member main body 91 opposite to the upper wall 91*a* is opened, and the open end side is the entrance and exit of the first and second fixing portions 81 and 85. In other words, the fixed member 90 slides on the front portions 81*a* and 85*a* and the side face portions 81*b* and 85*b* of the first and second fixing portions 81 and 85, respectively, when moving from the first fixing portion 81 side toward the second fixing portion 85 side.

Note that, as illustrated in FIGS. 18A and 19B, when the fixed member 90 is attached to the first fixing portion 81, the longitudinal direction of the fixed member 90 is the Y direction, and the transverse direction of the fixed member 90 is the X direction.

As illustrated in FIGS. 18C and 19B, the base portion (root) of each insertion piece 92 is connected to the upper wall 91*a* by integral molding, and the insertion piece 92 extends from the base portion toward the open end side of the member main body 91. Then, the insertion piece 92 is inserted into each of the first piece insertion portions 82 of the first fixing portion 81 and the second piece insertion portions 86 of the second fixing portion 85 by moving the fixed member 90 from the first fixing portion 81 side toward the second fixing portion 85 side (moving it from the state (second state) illustrated in FIGS. 19A and 19B to the state (first state) illustrated in FIGS. 20A and 20B). Additionally, the relative displacement between the first frame 31 and the second frame 41 in each of the X and Y directions can be suppressed by the insertion piece 92 inserted into each of the first and second piece insertion portions 82 and 86. The insertion piece 92 moves while sliding on an inner wall of each of the first and second piece insertion portions 82 and 86. The insertion pieces 92 have, for example, a wide plate shape in the longitudinal direction of the upper wall 91*a*.

As illustrated in FIGS. 18C and 19B, the base portion of each flexible arm 93 is connected to the upper wall 91*a* by integral molding, and the flexible arm 93 extends from the base portion toward the open end side of the member main body 91. Additionally, each flexible arm 93 includes the first engaging projection portion 93*a* provided on the tip side thereof opposite to the base portion thereof and the second engaging projection portion 93*b* spaced apart from the first engaging projection portion 93*a* and provided closer to the base portion side than the first engaging projection portion 93*a* in the direction of extension of the flexible arm 93.

By moving the fixed member 90 from the first fixing portion 81 side to the second fixing portion 85 side (moving it from the state (second state) illustrated in FIGS. 19A and 19B to the state (first state) as illustrated in FIGS. 20A and 20B), the first engaging projection portions 93*a* of the flexible arms 93 are hooked onto the first engaged portions 88 of the second fixing portion 85 by the elastic force of the flexible arms 93 to maintain the state of engagement thereof with the first engaged portions 88, as illustrated in FIGS. 20A and 20B. Then, maintaining the above engagement state allows for maintaining of the state of the insertion piece 92 inserted into each of the first piece insertion portions 82 of the first fixing portion 81 and the second piece insertion portions 86 of the second fixing portion 85. That is, the relative displacement suppression mechanism 80 moves the fixed member 90 from the first fixing portion 81 side toward the second fixing portion 85 side, and hooks the first engaging projection portions 93*a* of the flexible arms 93 onto the first engaged portions 88 of the second fixing portion 85 by means of the elastic force of the flexible arms 93 to put them into the engagement state, thereby maintaining the state where the insertion piece 92 is inserted in each of the first piece insertion portions 82 of the first fixing portion 81 and the second piece insertion portions 86 of the second fixing portion 85 and also maintaining the first state where the fixed member 90 is fixed to both the first and second fixing portions 81 and 85. In other words, the suppression state of the relative displacement between the first and second frames 31 and 41 in each of the X and Y directions is maintained.

By moving the fixed member 90 from the second fixing portion 85 side toward the first fixing portion 81 side (moving it from the state (first state) illustrated in FIGS. 20A and 20B to the state (second state) illustrated in FIGS. 19A and 19B), the second engaging projection portions 93*b* of the flexible arms 93 are hooked onto the second engaged portions 84 of the first fixing portion 81 by the elastic force of the flexible arms 93 to maintain the state of engagement thereof with the second engaged portions 84, as illustrated in FIGS. 19A and 19B. Then, maintaining the engagement state allows for maintaining of the state of the insertion pieces 92 pulled out (removed) from the second piece insertion portions 86 of the second fixing portion 85. That is, the relative displacement suppression mechanism 80 moves the fixed member 90 from the second fixing portion 85 side toward the first fixing portion 81 side, and hooks the second engaging projection portions 93*b* of the flexible arms 93 onto the second engaged portions 84 of the first fixing portion 81 by the elastic force of the flexible arms 93 to bring them into the engagement state, thereby maintaining the state where the insertion pieces 92 are pulled out (removed) from the second piece insertion portions 86 of the second fixing portion 85 and also maintaining the second state where the fixed member 90 is fixed to the first fixing portion 81. In other words, the released state of the relative displacement suppression of the first and second frames 31 and 41 in each of the X and Y directions is maintained.

The flexible arms 93 have the elastic force that urges the first engaging projection portions 93*a* to the first engaged portions 88 and urges the second engaging projection portions 93*b* to the second engaged portions 84. Then, the first engaging projection portions 93*a* are urged to the first engaged portions 88 by the elastic force of the flexible arms 93 to maintain the state of engagement thereof with the first engaged portions 88. Additionally, the second engaging projection portions 93*b* are urged to the second engaged portions 84 by the elastic force of the flexible arms 93 to maintain the state of engagement thereof with the second engaged portions 84.

As illustrated in FIGS. 18C and 19B, two insertion pieces 92, two first piece insertion portions 82 of the first fixing portion 81, and two second piece insertion portions 86 of the second fixing portion 85, respectively, are provided side by side in the longitudinal direction (Y direction) of the upper wall 91*a*. Additionally, two flexible arms 93, two first arm insertion portions 83 of the first fixing portion 81, and two second arm insertion portions 87 of the second fixing portion 85, respectively, are provided side by side in the longitudinal direction (Y direction) of the upper wall 91*a*.

In other words, the relative displacement suppression mechanism 80 of this first embodiment includes two sets each including the insertion piece 92, the first piece insertion portion 82, and the second piece insertion portion 86 and two sets each including the flexible arm 93, the first arm insertion portion 83, and the second arm insertion portion 87.

Note that the number of the sets including the insertion piece 92, the first piece insertion portion 82, and the second piece insertion portion 86 and the number of the sets including the flexible arm 93, the first arm insertion portion 83, and the second arm insertion portion 87 are not limited to the number of the sets of this first embodiment, and, for example, may be one set or three or more sets for each. Furthermore, the number of the sets including the insertion piece 92, the first piece insertion portion 82, and the second piece insertion portion 86 may be different from the number of the sets including the flexible arm 93, the first arm insertion portion 83, and the second arm insertion portion 87.

As illustrated in FIG. 18A to FIG. 20B, the relative displacement suppression mechanism 80 further includes a positioning projection portion 95 provided on the side walls of the fixed member 90 and a stopper portion 96 provided on the side wall of the first frame 31 and configured to, when the fixed member 90 moves from the second fixing portion 85 side toward the first fixing portion 81 side, stop the movement of the first fixing portion 81 by coming into contact with the positioning projection portion 95 in the state where the insertion pieces 92 are pulled out from the second piece insertion portions 86 and the fixed member 90 is held in the first fixing portion 81. In addition, the relative displacement suppression mechanism 80 further includes a guide recessed portion 97 provided on the side wall 41*a* of the second frame 41 to extend in the Z direction and moving the positioning projection portion 95 along the Z direction. Additionally, the stopper portion 96 is provided at an end of the guide recessed portion 97, and is formed by a step between the first frame 31 and the guide recessed portion 97. When the fixed member 90 is attached to the first fixing portion 81, the positioning projection portion 95 projects from the side walls 91*c* of the fixed member 90 toward the second frame 41, faces the guide recessed portion 97, and moves in the direction of extension of the guide recessed portion 97.

<Relative Displacement Suppression>

Next, relative displacement suppression by the relative displacement suppression mechanism 80 will be described.

First, as illustrated in FIGS. 19A and 19B, in the state where the first and second frames 31 and 41 are connected to each other, the fixed member 90 is slidably attached to the first fixing portion 81 side of the first frame 31 (second state). At this time, the second engaging projection portions 93*b* of the flexible arms 93 are hooked onto the second engaged portions 84 of the first fixing portion 81 by the elastic force of the flexible arms 93 to maintain the state of engagement of the second engaging projection portions 93*b* of the flexible arms 93 with the second engaged portions 84 of the first fixing portion 81. Then, by maintaining the engagement state, the fixed member 90 is held in the first fixing portion 81 in the state where the insertion pieces 92 are inserted only into the first piece insertion portions 82 of the first fixing portion 81 and pulled out from the second piece insertion portions 86 of the second fixing portion 85, i.e., in a state where the suppression of relative displacement in the X and Y directions (horizontal misalignment) is released. The flexible arms 93 are inserted into the first arm insertion portions 83 of the first fixing portion 81 and the second arm insertion portions 87 of the second fixing portion 85. However, the first engaging projection portions 93*a* of the flexible arms 93 are located between the first engaged portions 88 and the second engaged portions 84, and not engaged with the first engaged portions, so that the suppression of relative displacement in the Z direction (vertical misalignment) is released.

Next, the fixed member 90 is inserted toward the second fixing portion 85 side from the state where the relative displacement suppression is released, and is moved from the first fixing portion 81 side toward the second fixing portion 85 side, as illustrated in FIGS. 20A and 20B. By the movement of the fixed member 90 (from the first fixing portion 81 side to the second fixing portion 85 side), the insertion pieces 92 are moved to the second piece insertion portions 86 of the second fixing portion 85, so that the insertion pieces 92 are inserted into both the first piece insertion portions 82 of the first fixing portion 81 and the second piece insertion portions 86 of the second fixing portion 85.

Additionally, by the movement of the fixed member 90 (from the first fixing portion 81 side to the second fixing portion 85 side), the first engaging projection portions 93*a* of the flexible arms 93 move in contact with the first engaged portions 88 of the second fixing portion 85, and the flexible arms 93 bend outward opposite to the first engaged portions 88. Then, due to the outward bending of the flexible arms 93, the first engaging projection portions 93*a* goes over the first engaged portions 88. Then, the first engaging projection portions 93*a* of the flexible arms 93 are hooked onto the first engaged portions 88 by the elastic force of the flexible arms 93 to maintain the state of engagement of the first engaging projection portions 93*a* of the flexible arms 93 with the first engaged portions 88 of the second fixing portion 85. At this time, the upper wall 91*a* of the fixed member 90 comes into contact with the second engaged portions 84 of the first fixing portion 81 to stop the movement of the fixed member 90 and also position the first engaging projection portions 93*a* and the first engaged portions 88.

In addition, by the movement of the fixed member 90 (from the first fixing portion 81 side to the second fixing portion 85 side), the second engaging projection portions 93*b* of the flexible arms 93 move in contact with the second engaged portions 84 of the first fixing portion 81, and the flexible arms 93 bend outward opposite to the second engaged portions 84. Then, due to the outward bending of the flexible arms 93, the second engaging projection portions 93*b* go over the second engaged portions 84. Additionally, the second engaging projection portions 93*b* of the flexible arms 93 move between the second engaged portions 84 of the first fixing portion 81 and the first engaged portions 88 of the second fixing portion 85, and the engagement state between the second engaging projection portions 93*b* of the flexible arms 93 and the second engaged portions 84 of the first fixing portion 81 is released.

As a result, the insertion pieces 92 inserted into both the first piece insertion portions 82 and the second piece insertion portions 86 can suppress the relative displacement between the first frame 31 and the second frame 41 in each of the X and Y directions (horizontal misalignment). In addition, maintaining the engagement of the first engaging projection portions 93*a* of the flexible arms 93 with the first engaged portions 88 of the second fixing portion 85 can also suppress the relative displacement between the first frame 31 and the second frame 41 in the Z direction (vertical misalignment). It is also possible to maintain the first state where the fixed member 90 is fixed to both the first fixing portion 81 and the second fixing portion 85.

<Release of Relative Displacement Suppression>

Next, release of the relative displacement suppression by the relative displacement suppression mechanism 80 will be described.

First, in the state where the relative displacement is suppressed (see FIGS. 20A and 20B), the fixed member 90 is moved from the second fixing portion 85 side toward the first fixing portion 81 side (see FIGS. 19A and 19B). By the movement of the fixed member 90, the insertion pieces 92 move from the second piece insertion portion 86 side of the second fixing portion 85 to the first piece insertion portion 82 side of the first fixing portion 81, whereby the insertion pieces 92 are pulled out from the second piece insertion portions 86 of the second fixing portion 85.

Additionally, by the movement of the fixed member 90 (from the second fixing portion 85 side to the first fixing portion 81 side), the second engaging projection portions 93*a* of the flexible arms 93 move in contact with the first engaged portions 88 of the second fixing portion 85, and the flexible arms 93 bend outward opposite to the first engaged portions 88. Then, due to the outward bending of the flexible arms 93, the first engaging projection portions 93*a* go over the first engaged portions 88. Additionally, the first engaging projection portions 93*a* of the flexible arms 93 move between the first engaged portions 88 of the second fixing portion 85 and the second engaged portions 84 of the first fixing portion 81, and the engagement state between the first engaging projection portions 93*a* of the flexible arms 93 and the first engaged portions 88 of the second fixing portion 85 is released.

Additionally, by the movement of the fixed member 90 (from the second fixing portion 85 side to the first fixing portion 81 side), the second engaging projection portions 93*b* of the flexible arms 93 move in contact with the second engaged portions 84 of the first fixing portion 81, and the flexible arms 93 bend outward opposite to the second engaged portions 84. Then, due to the outward bending of the flexible arms 93, the second engaging projection portions 93*b* go over the second engaged portions 84. Additionally, the second engaging projection portions 93*b* of the flexible arms 93 are hooked onto the second engaged portions 84 by the elastic force of the flexible arms 93 to maintain the engagement state between the second engaging projection portions 93*b* of the flexible arms 93 and the second engaged portions 84 of the first fixing portion 81.

In addition, by the movement of the fixed member 90 (from the second fixing portion 85 side to the first fixing portion 81 side), the positioning projection portion 95 of the fixed member 90 moves through the guide recessed portion 97 of the second fixing portion 85, and comes into contact with the stopper portion 96 of the first frame 31 to stop the movement of the fixed member 90 and also position the second engaging projection portions 93*b* and the second engaged portions 84.

This allows the insertion pieces 92 to be pulled out from the second piece insertion portions 86, which can thereby release the suppression of the relative displacement between the first frame 31 and the second frame 41 in each of the X and Y directions (horizontal misalignment). Additionally, the engagement of the first engaging projection portions 93*a* of the flexible arm 93 with the first engaged portions 88 of the second fixing portion 85 is released, so that the suppression of the relative displacement between the first and second fames 31 and 41 in the Z direction (vertical misalignment) can be released. It is also possible to maintain the second state where the fixed member 90 is fixed to the first fixing portion 81.

Note that, in the second engaging projection portions 93*b* of the flexible arms 93, surfaces that come in contact with the second engaged portions 84 are R-shaped in order to make it easier to go over the second engaged portions 84.

Additionally, in the first engaging projection portions 93*a* of the flexible arms 93, tip surfaces that come in contact with the first engaged portions 88 are inclined in order to make it easier to go over the first engaged portions 88.

Furthermore, the fixed member 90 is made of, for example, polyamide resin (PA) excellent in flexibility.

<Positioning Mechanism>

Figure 21:
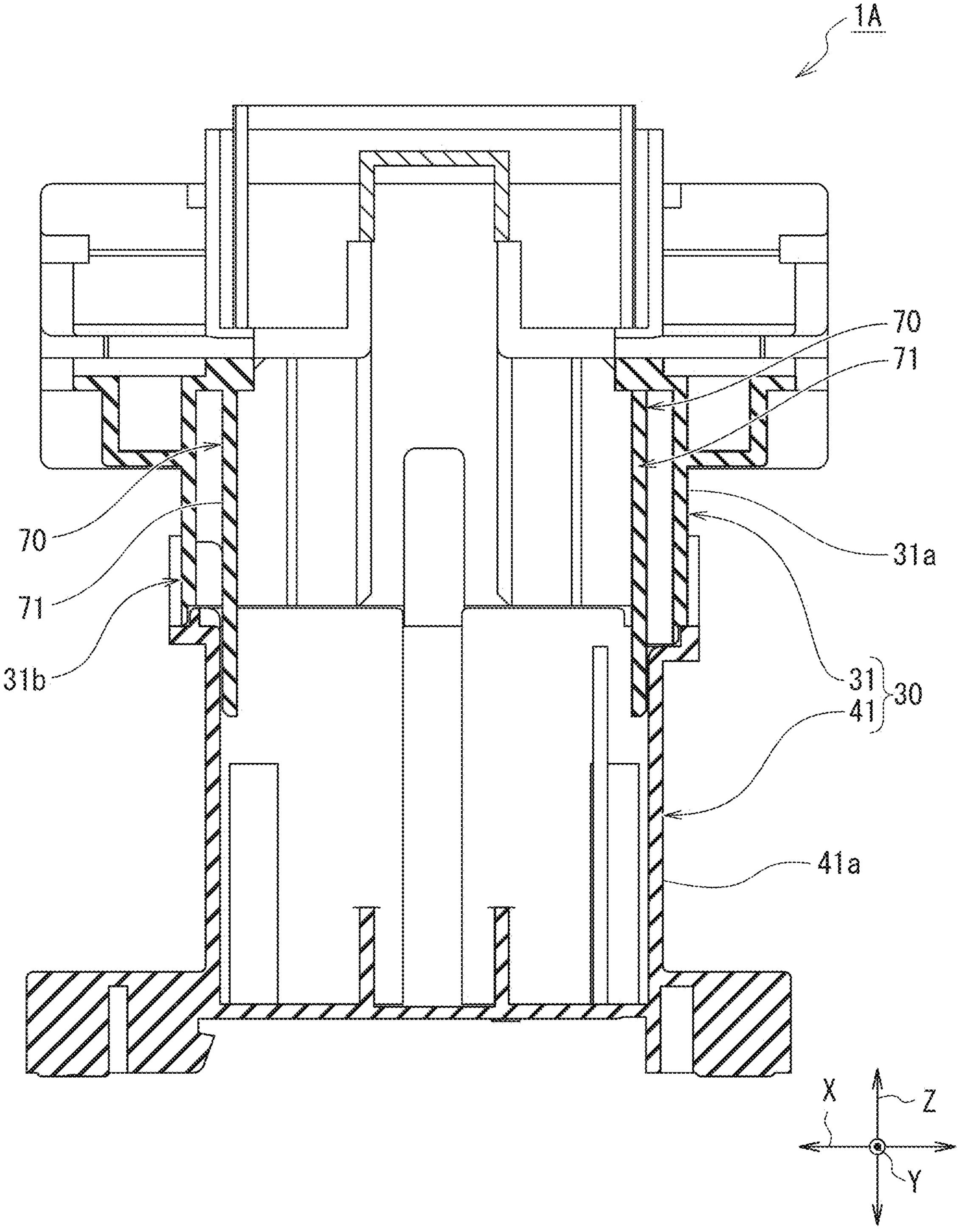
FIG. 21 is a sectional view illustrating the state where the first frame and the second frame are positioned by the positioning mechanism.

In addition, as illustrated in FIG. 21, the main body frame 30 further includes the positioning mechanism 70 that positions the first frame 31 and the second frame 41 in the X direction.

The positioning mechanism 70 includes the flexible positioning plate portion 71 that protrudes from the open end of the first frame 31 and that enters from the open end side of the second frame 41 and faces the inner surface of the outer peripheral side wall of the second frame 41 when connecting the first frame 31 to the second frame 41. The flexible positioning plate portion 71 extends along the Z direction, in which a base portion thereof is integrated with the first frame 31, and a tip side opposite to the base portion thereof protrudes from the open end side of the first frame 31. Then, when connecting the first and second frames 31 and 41 to each other, the tip side of the flexible positioning plate portion 71 enters from the open end side of the second frame 41 and faces the inner surface of the outer peripheral side wall of the second frame 41. In this second embodiment, there are provided a total of four flexible positioning plate portions 71, each two of which are spaced apart from each other in the Y direction on the two side walls 31*a* and 31*b* of the first frame 31 in the X direction. In other words, the flexible positioning plate portion 71 is provided at each of four corners of the first frame 31. Then, when connecting the first frame 31 to the second frame 41, the tip side of each of the two flexible positioning plate portions 71 provided on the side wall 31*a* side of the first frame 31 faces the inner surface of the side wall 41*a* of the second frame 41, and the tip side of each of the two flexible positioning plate portions 71 provided on the side wall 31*b* side of the first frame 31 faces the inner surface of the side wall 41*b* of the second frame 41. In this positioning mechanism 70, the tip side of each of the four flexible positioning plate portions 71 enters from the open end side of the second frame 41 and comes into contact with the inner surface of the outer peripheral side wall of the second frame 41 to allow for the positioning of the first frame 31 and the second frame 41. The two flexible positioning plate portions 71 provided on the side wall 31*a* side of the first frame 31 have the elastic force that urges the inner surface of the side wall 41*a* of the second frame 41, and the two flexible positioning plate portions 71 provided on the side wall 31*b* side of the first frame 31 have the elastic force that urges the inner surface of the side wall 41*b* of the second frame 41.

Note that while the flexible positioning plate portions 71 are provided on the side walls 31*a* and 31*b* sides, they may be provided on the side walls 31*c* and 31*d* sides.

<Connection of First and Second Frames>

Next, connection of the first frame 31 and the second frame 41 will be described with reference to FIGS. 22A, 22B, 23A, and 23B. Note that FIGS. 22A and 23A illustrate the side walls 31*c* and 41*c* sides of the first frame 31 and the second frame 41, respectively, similarly to FIG. 14.

Figure 22A:
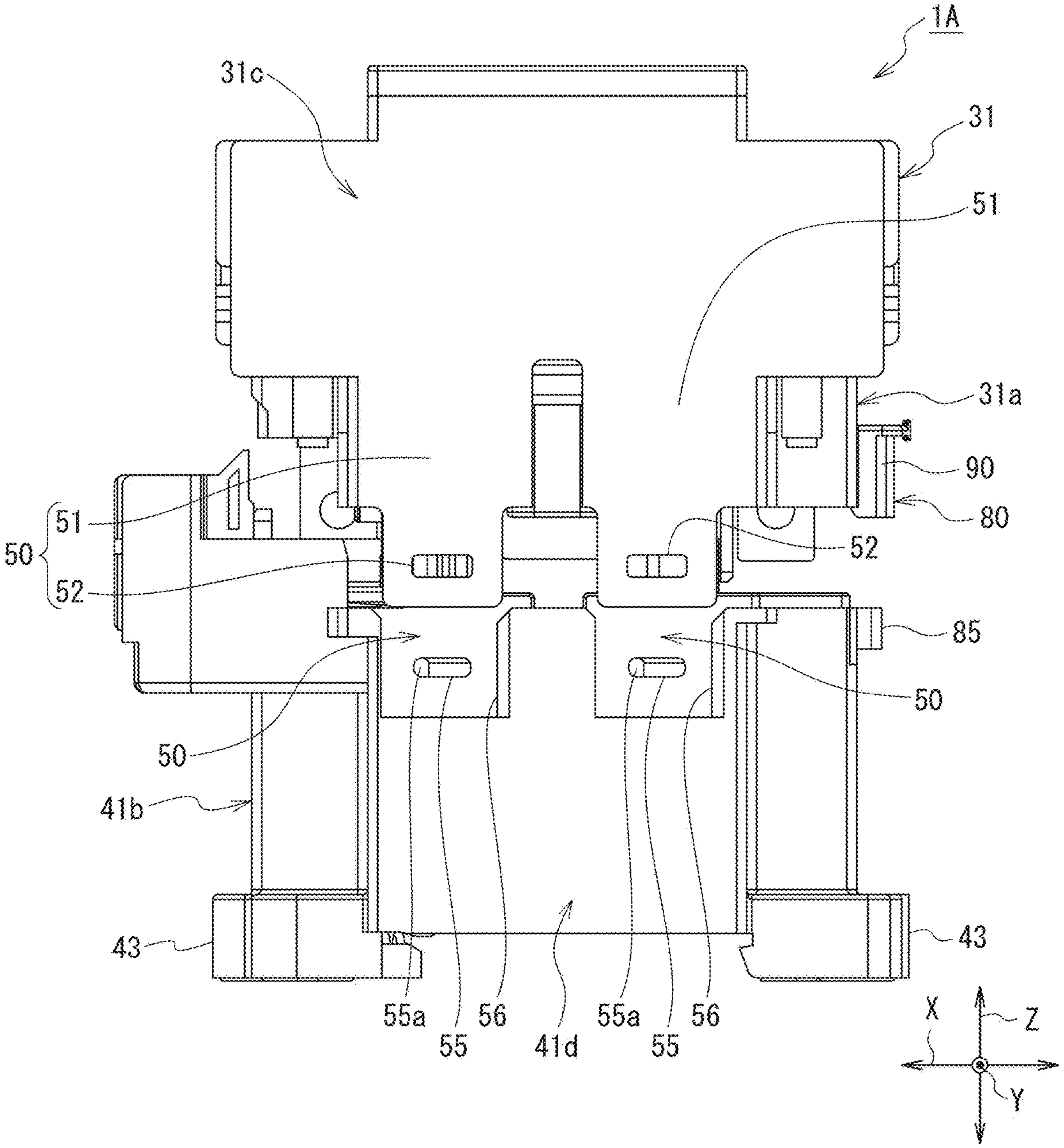
FIG. 22A is a front view along the X direction for illustrating the connection of the first frame and the second frame.
Figure 22B:
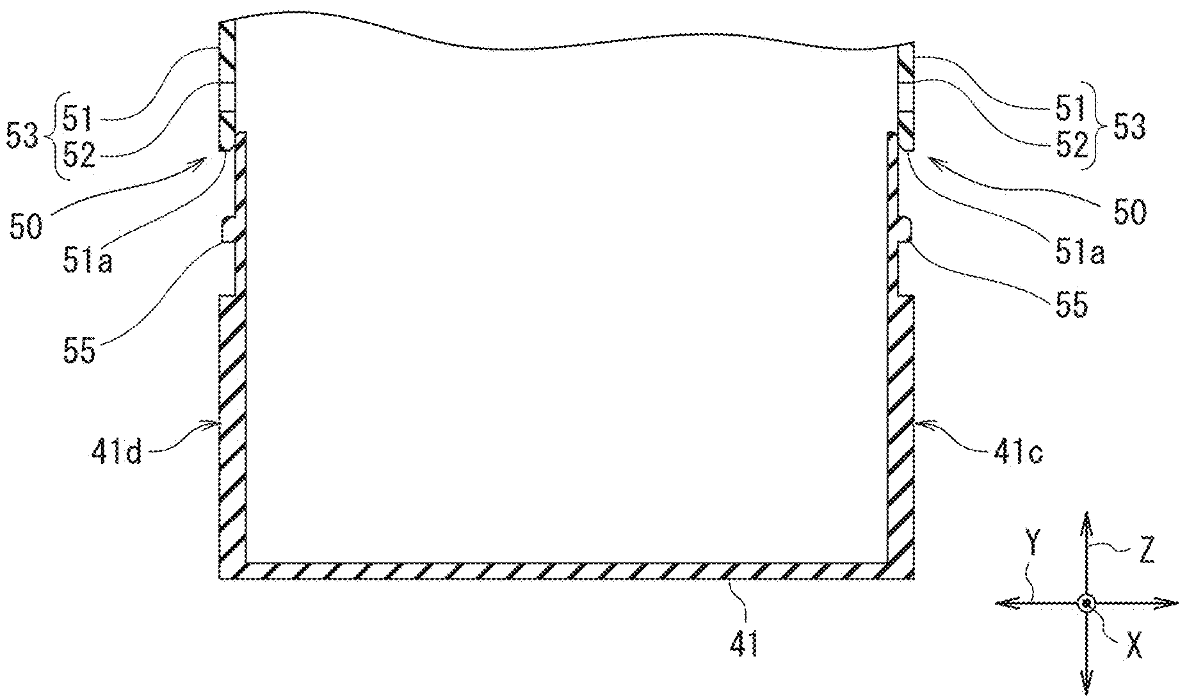
FIG. 22B is a sectional view along the Y direction for illustrating the connection of the first frame and the second frame.

First, as illustrated in FIGS. 22A and 22B, the first frame 31 and the second frame 41 are arranged along the Z direction so that the respective open end sides thereof face each other.

Figure 23A:
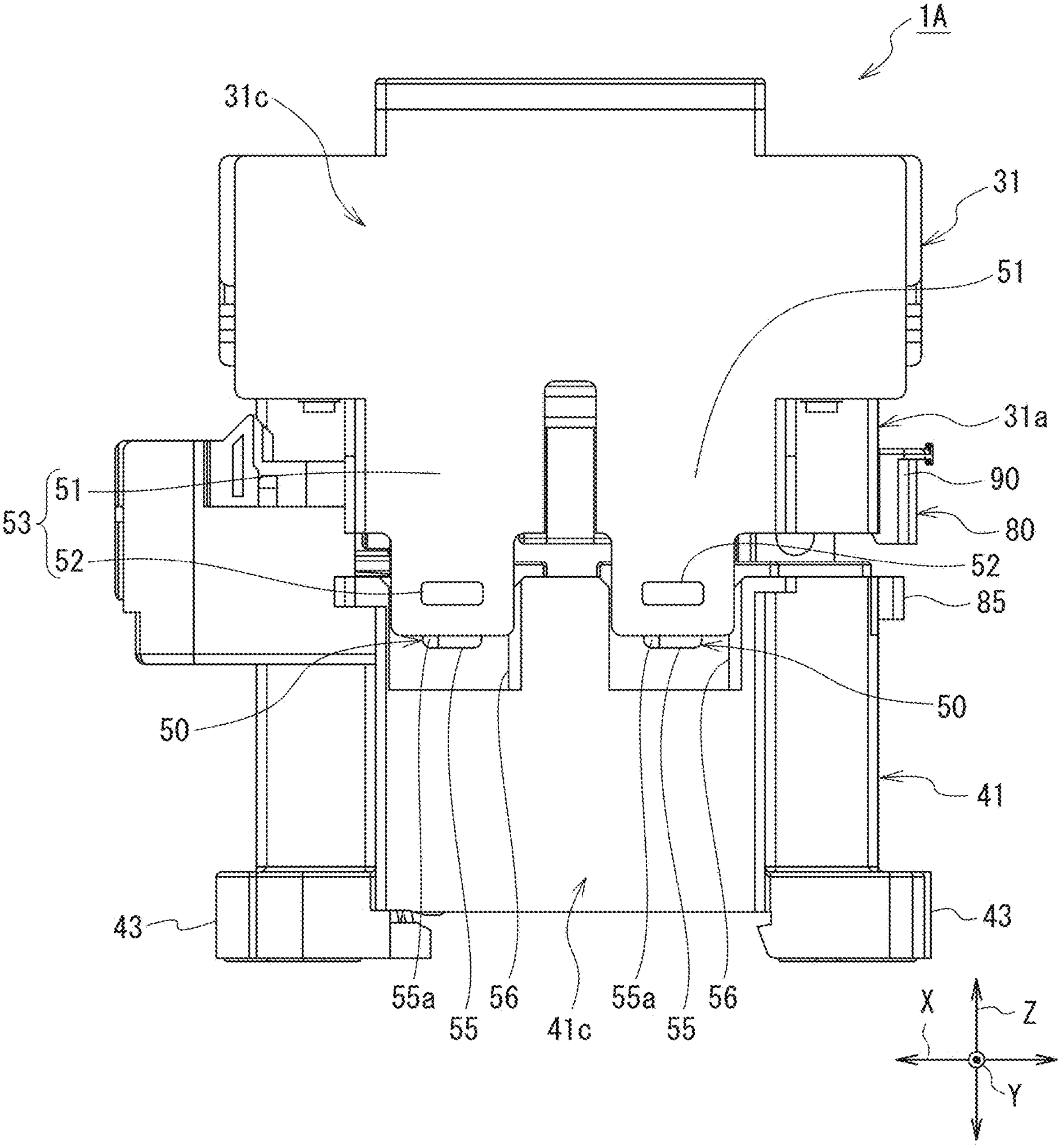
FIG. 23A is a front view along the X direction for illustrating the connection of the first frame and the second frame.
Figure 23B:
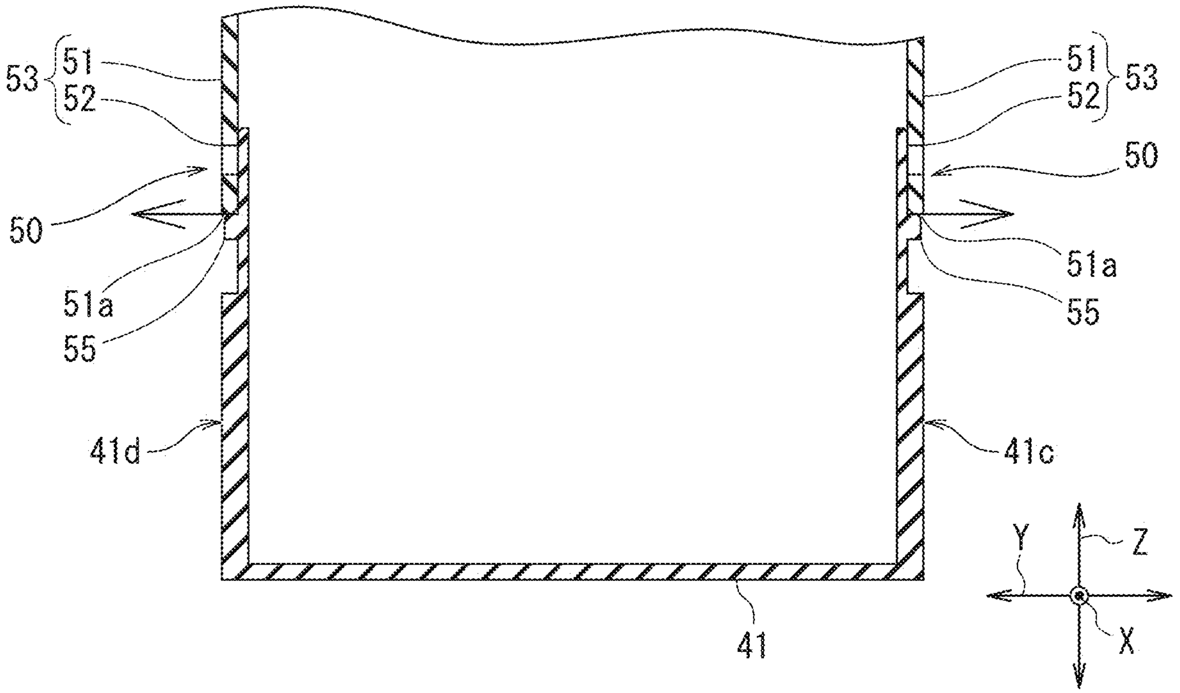
FIG. 23B is a sectional view along the Y direction for illustrating the connection of the first frame and the second frame.

Next, as illustrated in FIGS. 23A and 23B, the first frame 31 and the second frame 41 are brought into relative proximity in the Z direction to bring the first inclined surfaces 51*a* at the tips of the flexible protruding plate portions 51 into contact with the fitting projection portions 55. Then, by bringing the first and second frames 31 and 41 closer relative to each other in the Z direction, the first inclined surfaces 51*a* at the tip sides of the flexible protruding plate portions 51 move in contact with the fitting projection portions 55, and the flexible protruding plate portions 51 bend outward. After that, as illustrated in FIGS. 14, 15A, and 15B, the fitting projection portions 55 are fitted into the fitting hole portions 52 of the flexible protruding plate portions 51 and fits therewith. Then, the fitting hole portions 52 and the fitting projection portions 55 are engaged by elastic force of the flexible protruding plate portions 51. As a result, the first frame 31 and the second frame 41 are connected and fixed to each other by the snap-fit mechanisms 50.

In the middle of the connection of the first frame 31 and the second frame 41, the tip sides of the flexible positioning plate portions 71 of the first frame 31 enter from the open end side of the second frame 41 and come into contact with the inner surface of the outer peripheral side wall of the second frame 41, thereby positioning the first frame 31 and the second frame 41.

Additionally, when the connection of the first frame 31 and the second frame 41 is complete, the flexible positioning plate portions 71 urge the inner surface of the outer peripheral side wall of the second frame 41 by means of their own elastic force, so that rattling (vibration) of the first frame 31 and the second frame 41 in the X direction can be suppressed.

<Release of Connection of First and Second Frames>

Figure 24A:
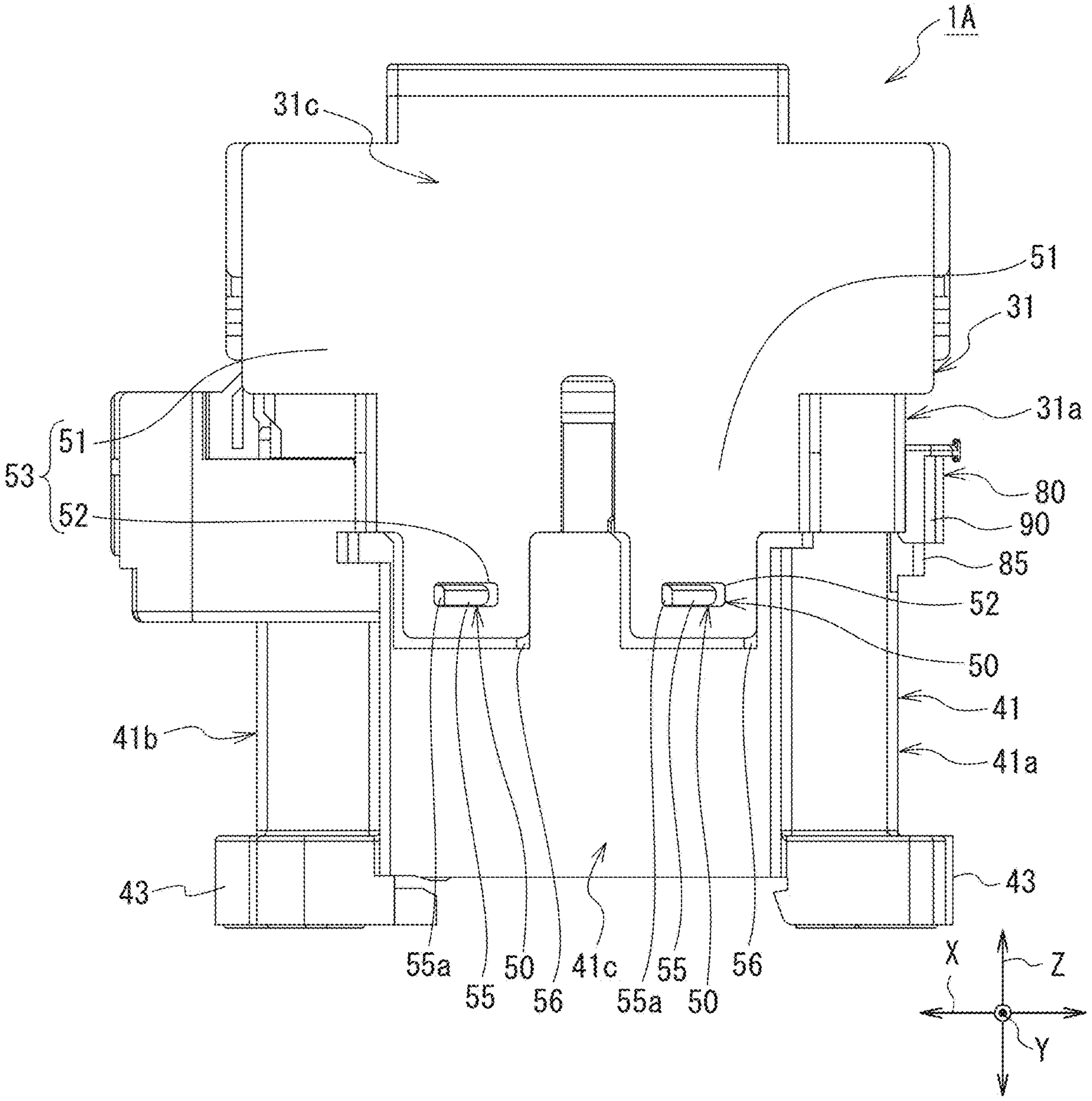
FIG. 24A is a front view along the X direction for illustrating release of the connection of the first frame and the second frame.
Figure 24B:
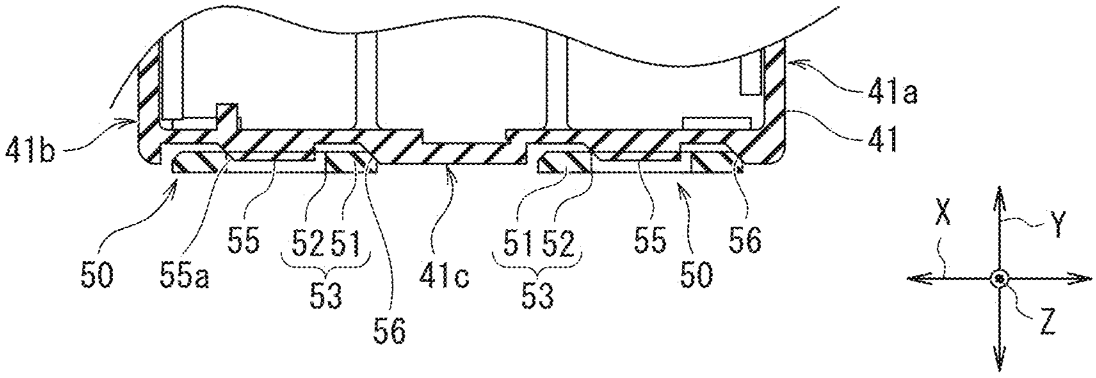
FIG. 24B is a sectional view along the X direction for illustrating the release of the connection of the first frame and the second frame.
Figure 25A:
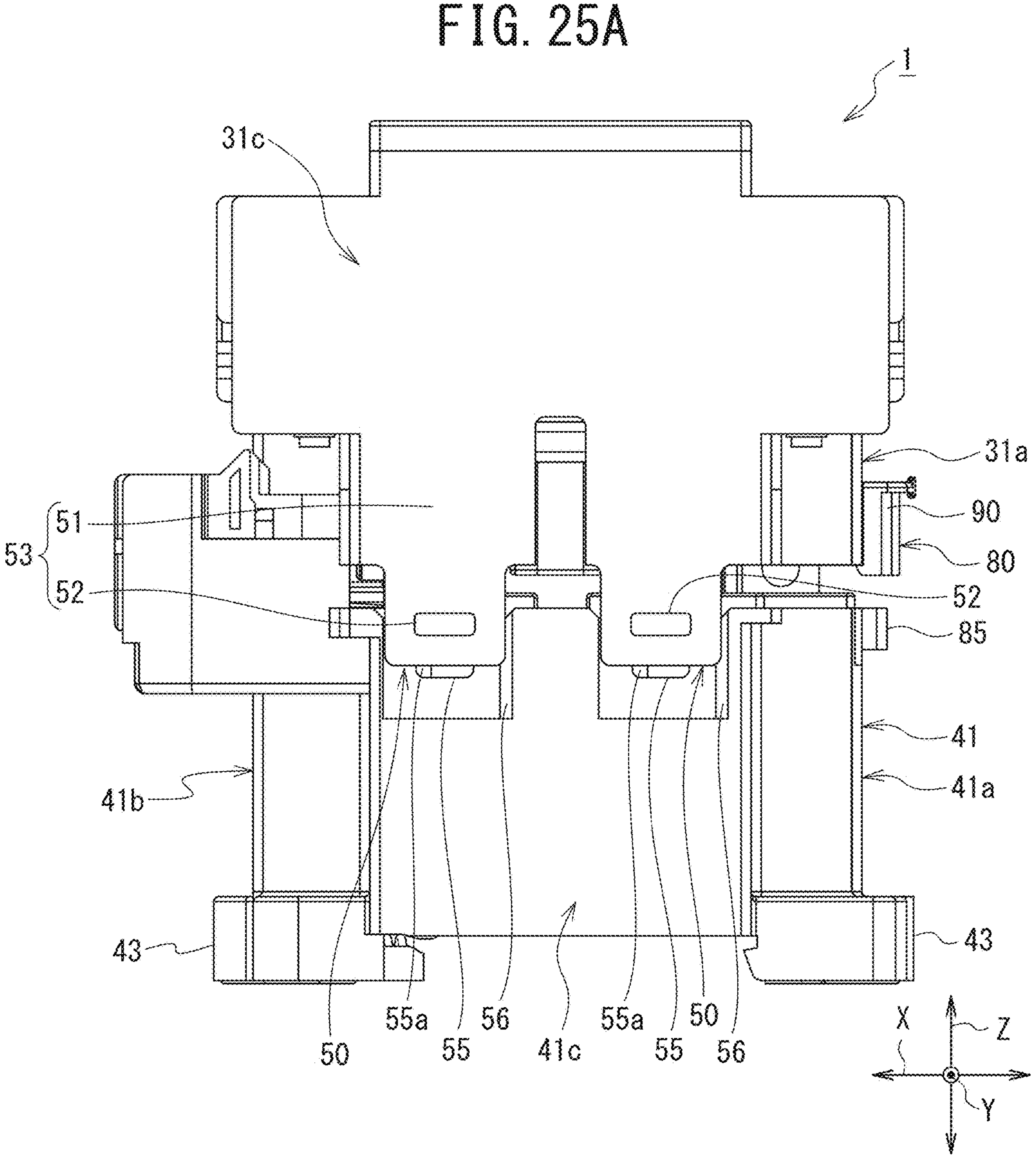
FIG. 25A is a front view along the X direction for illustrating the release of the connection of the first frame and the second frame.

Next, release of the connection of the first frame 31 and the second frame 41 will be described with reference to FIGS. 24A, 24B, 25A, and 25B. Note that FIGS. 24A and 25A illustrate the side walls 31*c* and 41*c* sides of the first frame 31 and the second frame 41, respectively, similarly to FIG. 14.

Figure 25B:
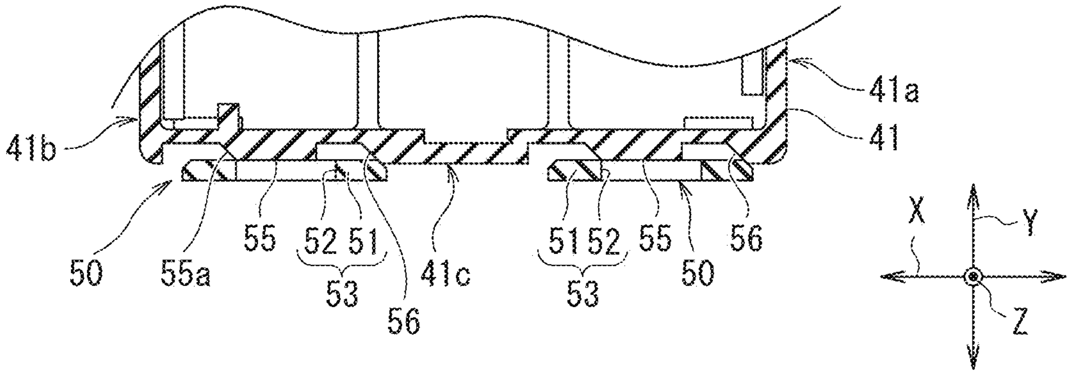
FIG. 25B is a sectional view along the X direction for illustrating the release of the connection of the first frame and the second frame.

First, from the state where the first frame 31 and the second frame 41 are connected to each other by the snap-fit mechanisms 50 (see FIGS. 14, 15A, and 15B), the first frame 31 and the second frame 41 are relatively displaced in the X direction to bring the inner wall surfaces of the flexible protruding plate portions 51 into contact with the second inclined surfaces 55*a* of the fitting projection portions 55 and bring the flexible protruding plate portions 51 into contact with the third inclined surfaces 56. Then, by further relatively displacing the first and second frames 31 and 41 in the X direction, the inner wall surfaces of the flexible protruding plate portions 51 move in contact with the second inclined surfaces 55*a* of the fitting projection portions 55, and the flexible protruding plate portions 51 move in contact with the third inclined surfaces 56, whereby the flexible protruding plate portions 51 bend outward, as illustrated in FIGS. 24A and 24B. After that, the fitting projection portions 55 move outward from the insides of the fitting hole portions 52 of the flexible protruding plate portions 51. Then, by separating the first frame 31 and the second frame 41 relatively from each other in the Z direction, the fitting between the fitting hole portions 52 of the flexible protruding plate portions 51 and the fitting projection portions 55 is released, as illustrated in FIGS. 25A and 25B. This allows for release of the connection of the first frame 31 and the second frame 41 by the snap-fit mechanisms 50. In other words, the snap-fit mechanisms 50 can release the connection of the first frame 31 and the second frame 41 by relatively displacing the first and second frames 31 and 41 in the X direction, which can therefore eliminate the need to use a tool.

[Effects of Second Embodiment]

Next, main effects of this second embodiment will be described.

The electromagnetic contactor 1A according to this second embodiment includes the snap-fit mechanism 50. Then, as described above, the snap-fit mechanism 50 can release the fitting between the fitting hole portions 52 and the fitting projection portions 55 by relatively displacing the first frame 31 and the second frame 41 in the X direction. It is therefore unnecessary to use a tool to release the fitting as in the conventional art, and there is no need to bend the flexible protruding plate portions 51 with the tool. Thus, the electromagnetic contactor 1A according to this second embodiment can facilitate replacement of components such as the electromagnetic coil 23 in the main body frame 30. Additionally, since the fitting between the fitting hole portions 52 of the flexible protruding plate portions 51 and the fitting projection portions 55 can be released without using tools, it is possible to eliminate the concern that the flexible protruding plate portions 51 may be broken depending on the amount of force applied when the flexible protruding plate portions 51 are bent with a tool. In addition, by relatively displacing the first frame 31 and the second frame 41 in the X direction, the fitting states of the four snap-fit mechanisms 50 can be released almost simultaneously, so that workability is excellent compared with the case where the plurality of snap-fit mechanisms are released with a tool.

The electromagnetic contactor 1A according to this second embodiment further includes the positioning mechanism 70 that positions the first frame 31 and the second frame 41 in the X direction. Thus, in the electromagnetic contactor 1A according to this second embodiment, when connecting the first frame 31 to the second frame 41, positioning of the first frame 31 and the second frame 41 in the X direction can be quickly performed by the positioning mechanism 70, which can therefore improve workability when connecting the first frame 31 to the second frame 41 by the snap-fit mechanism 50.

Furthermore, the flexible positioning plate portion 71 of the positioning mechanism 70 has the elastic force that urges the inner surface of the outer peripheral side wall of the second frame 41 after connecting the first frame 31 to the second frame 41. Therefore, even though the first frame 31 and the second frame 41 can be relatively displaced in the X direction by the snap-fit mechanism 50, rattling (vibration) of the first and second frames in the X direction can be suppressed by the elastic force of the flexible positioning plate portion 71.

The main body frame 30 of this second embodiment includes the relative displacement suppression mechanism 80 that suppresses a relative displacement between the first frame 31 and the second frame 41. Then, this relative displacement suppression mechanism 80 can suppress and release the relative displacement between the connected first and second frames 31 and 41 without using tools (in a tool-less manner). Thus, according to the relative displacement suppression mechanism 80 of this second embodiment, replacement of components such as the electromagnetic coil 23 (electric component) in the main body frame 30 can be facilitated.

Additionally, this relative displacement suppression mechanism 80 is configured to insert the insertion piece 92 in each of the first piece insertion portions 82 of the first fixing portion 81 and the second piece insertion portions 86 of the second fixing portion 85 by moving the fixed member 90 from the first fixing portion 81 side to the second fixing portion 85 side. Thus, the relative displacement suppression mechanism 80 of this second embodiment can suppress the relative displacement between the connected first and second frames 31 and 41 in each of the X direction and the Y direction.

In addition, this relative displacement suppression mechanism 80 is configured to maintain the state where the insertion piece 92 is inserted in each of the first piece insertion portions 82 of the first fixing portion 81 and the second piece insertion portions 86 of the second fixing portion 85 by moving the fixed member 90 from the first fixing portion 81 side toward the second fixing portion 85 side and hooking the first engaging projection portions 93*a* of the flexible arms 93 onto the first engaged portions 88 of the second fixing portion 85 by the elastic force of the flexible arms 93 to bring them into the engagement state. Thus, the relative displacement suppression mechanism 80 of this second embodiment can suppress the relative displacement between the connected first and second frames 31 and 41 in the Z direction.

Here, in the main body frame 30 of this second embodiment, the first frame 31 and the second frame 41 are connected to each other by the snap-fit mechanism 50. In such a case, the relative displacement suppression by the relative displacement suppression mechanism 80 in the Z direction is auxiliary. However, in main body frames (cases for electric devices) without any connection mechanism such as the snap-fit mechanism 50, relative displacement suppression in the Z direction by the relative displacement suppression mechanism 80 of this second embodiment is effective.

Additionally, the relative displacement suppression mechanism 80 of this second embodiment is configured to maintain the state where the insertion pieces 92 are pulled out from the second piece insertion portions 86 of the second fixing portion 85 by moving the fixed member 90 from the second fixing portion 85 side toward the first fixing portion 81 side and hooking the second engaging projection portions 93*b* of the flexible arms 93 onto the second engaged portions 84 of the first fixing portion 81 by the elastic force of the flexible arms 93 to bring them into the engagement state. Thus, the relative displacement suppression mechanism 80 of this second embodiment can increase a retaining strength of the fixed member 90 attached to the first fixing portion 81.

Furthermore, in the relative displacement suppression mechanism 80 of this second embodiment, the insertion pieces 92 for suppressing relative displacement and the flexible arms 93 for holding the fixed member 90 on the first and second fixing portions 81 and 85 have separate configurations. Thus, the fixed member 90 can be made into a thick-wall structure, thereby enabling increased strength of the fixed member 90 itself.

Additionally, since this relative displacement suppression mechanism 80 can suppress the relative displacement between the connected first and second frames 31 and 41, there can be provided a more reliable electromagnetic contactor 1A.

In addition, the above second embodiment has described the snap-fit mechanism 50 in which the fitting hole portion 52 is provided in the first frame 31 and the fitting projection portion 55 is provided in the second frame 41. However, the present invention is not limited to the snap-fit mechanism 50 of the above second embodiment. For example, the present invention can be applied to a snap-fit mechanism in which the fitting projection portion 55 is provided in the first frame 31 and the fitting hole portion 52 is provided in the second frame 41. In other words, the present invention can be applied to an electromagnetic contactor provided with a snap fit including a hook portion in which a fitted portion is provided on the tip side of the flexible protruding plate portion 51 protruding from the open end side of one of the first and second frames 31 and 41 and a fitting projection portion provided on the other frame thereof and fitting with the fitted portion.

Additionally, the above second embodiment has described the case where the two snap-fit mechanisms 50 are provided on each of the two side walls 31*c* and 31*d* of the first frame 31 located on the opposite sides of each other in the Y direction. However, the number of the snap-fit mechanisms 50 to be provided is not limited to that of the above embodiment. For example, one or three or more snap-fit mechanisms 50 may be provided on each of the two side walls 31*c* and 31*d*.

Furthermore, while the above second embodiment has described the case where the fitting hole portion 52 is used as the fitted portion of the snap-fit mechanism 50, the present invention is not limited to the fitting hole portion 52. For example, a fitting recessed portion may be used as the fitted portion.

Still furthermore, the above second embodiment has described the case where the relative displacement suppression mechanism 80 is provided over the side walls 31*a* and 41*a*, which are one of each of the two side walls 31*a* and 31*b* and 41*a* and 41*b* of the first and second frames 31 and 41 located in the X direction. However, the position of the relative displacement suppression mechanism 80 is not limited to that of the above second embodiment. For example, the relative displacement suppression mechanism 80 may be provided over the side walls 31*c* and 41*c*, which are one of each of the two side walls of the first and second frames 31 and 41 located in the Y direction. Even in this case, relative displacements (positional misalignments) between the connected first and second frames 31 and 41 in the X, Y, and Z directions can be suppressed.

Additionally, the above second embodiment has described the case of the relative displacement suppression mechanism 80 in which the second state where the fixed member 90 is fixed to the first fixing portion 81 is maintained by inserting the insertion pieces 92 into the first piece insertion portions 82 and hooking the second engaging projection portions 93*b* onto the second engaged portions 84 by the elastic force of the flexible arms 93 to bring them into the engagement state. However, the present invention is not limited to the second state of this second embodiment, and can also be applied to a case where a second state where the fixed member 90 is fixed to the second fixing portion 85 is maintained.

Third Embodiment

An electromagnetic contactor 1B according to a third embodiment of the present invention basically has the same configuration as that of the electromagnetic contactor 1A according to the above second embodiment, but is different in the configuration of the relative displacement suppression mechanism.

Figure 26:
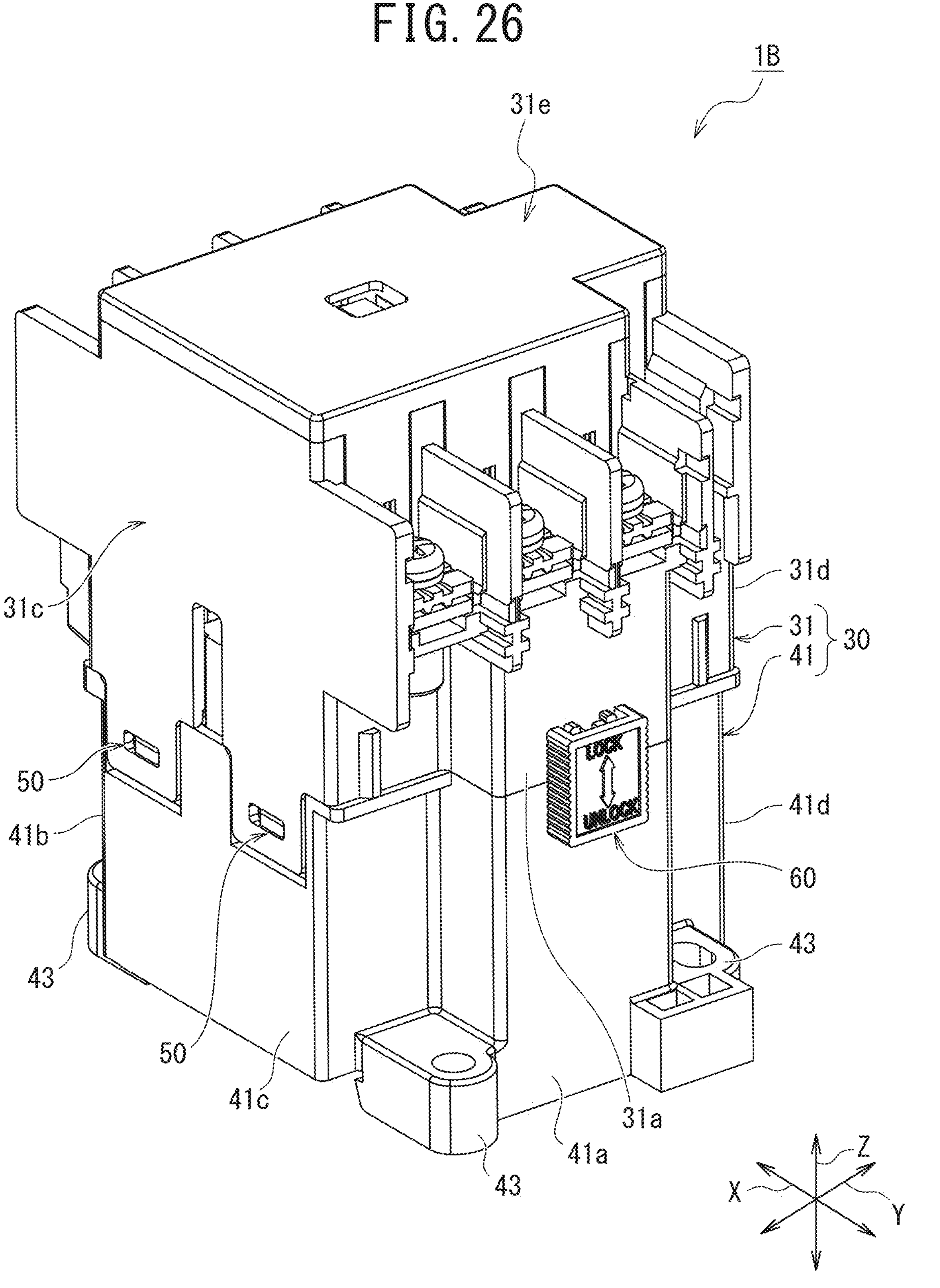
FIG. 26 is a perspective view illustrating an external configuration of an electromagnetic contactor according to a third embodiment of the present embodiment.

Specifically, as illustrated in FIG. 26, the electromagnetic contactor 1B according to this third embodiment includes a relative displacement suppression mechanism 60 instead of the relative displacement suppression mechanism 80 of the electromagnetic contactor 1A illustrated in FIG. 12. Other configurations are the same as those in the above second embodiment.

Figure 27A:
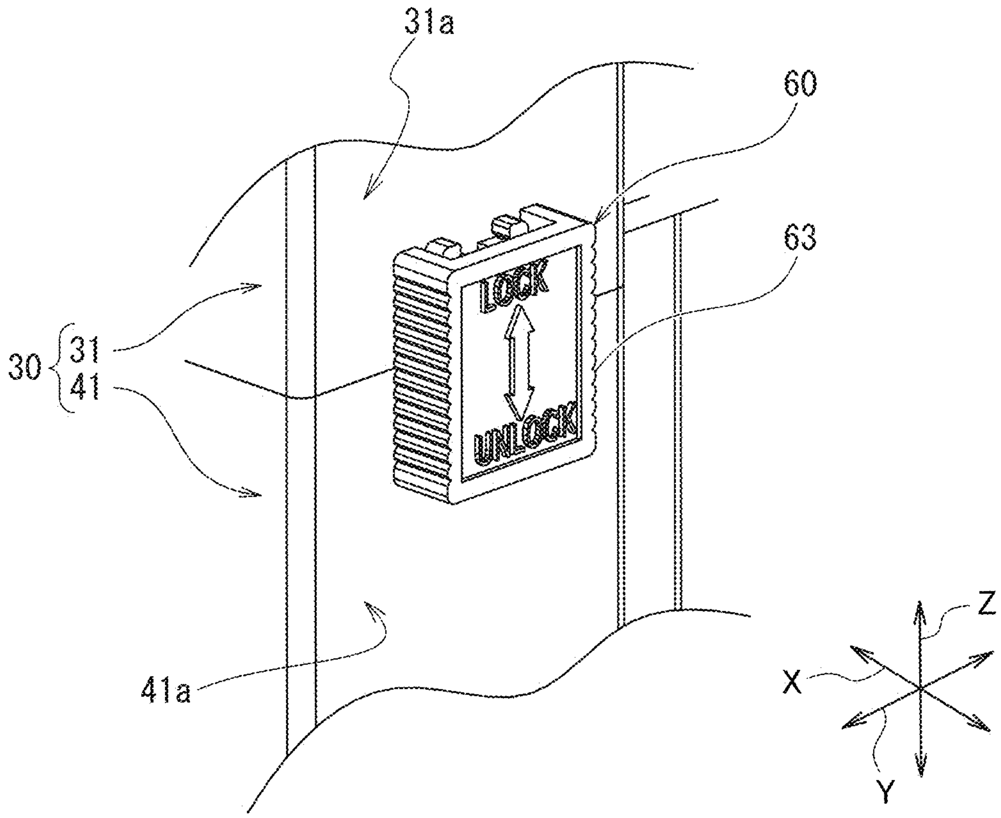
FIG. 27A is a perspective view illustrating a state where relative displacement is suppressed by a relative displacement suppression mechanism.

As illustrated in FIGS. 26 and 27A, the main body frame 30 includes the relative displacement suppression mechanism 60 that suppresses a relative displacement between the connected first and second frames 31 and 41. The relative displacement suppression mechanism 60 of this third embodiment can suppress, as the relative displacement, a relative displacement between the first and second frames 31 and 41 in each of the X direction and the Y direction (horizontal misalignment) in the two-dimensional plane orthogonal to the direction (Z direction) in which the first and second frames 31 and 41 are connected to each other. Additionally, relative displacement in the Z direction (vertical misalignment) can also be suppressed.

Figure 27B:
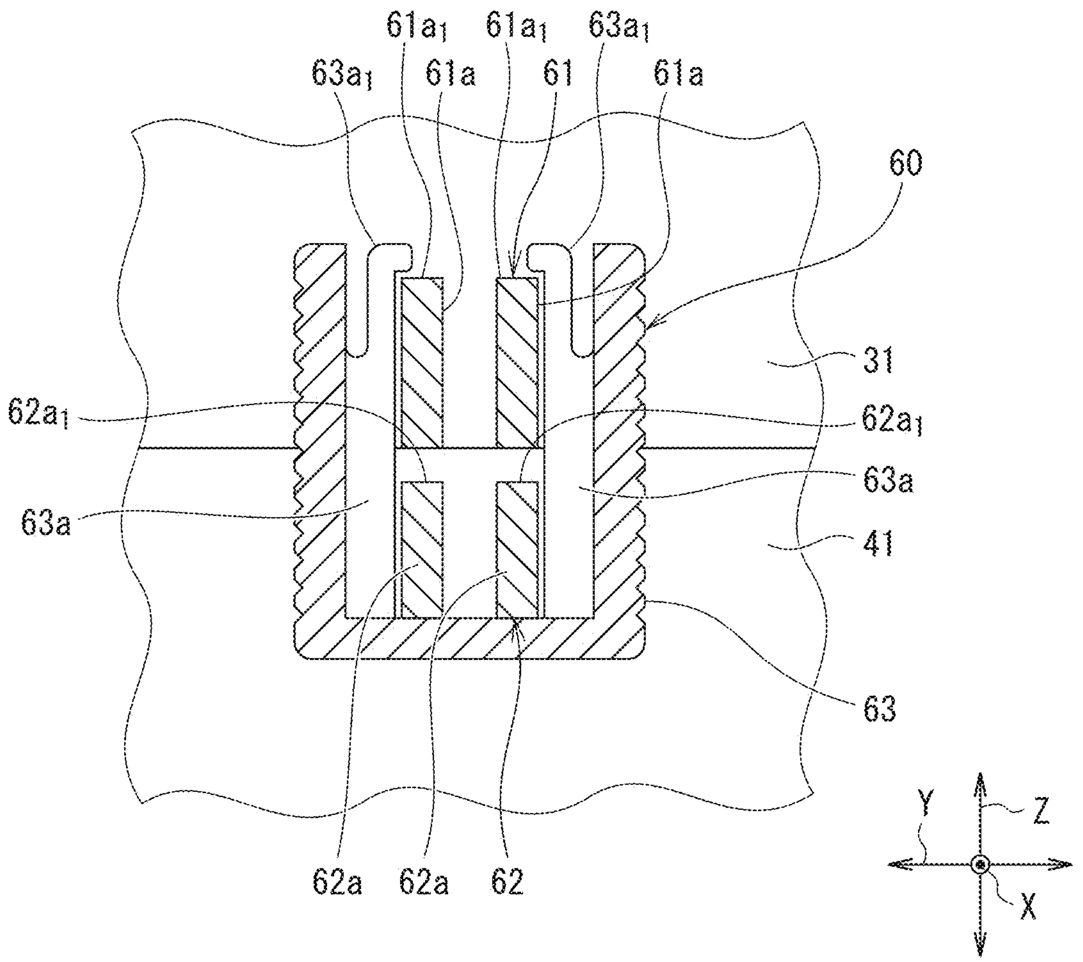
FIG. 27B is a sectional view illustrating the state where the relative displacement is suppressed by the relative displacement suppression mechanism.
Figure 28A:
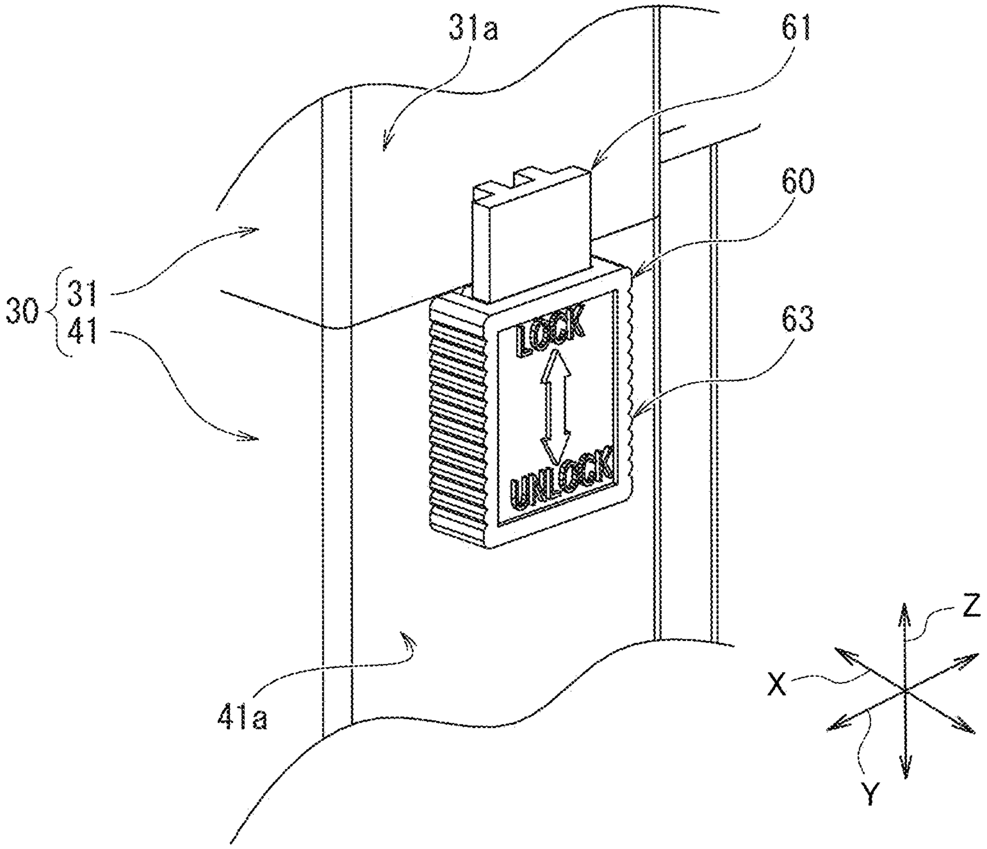
FIG. 28A is a perspective view illustrating a state where the relative displacement suppression of the relative displacement suppression mechanism is released.

As illustrated in FIGS. 27A and 27B, the relative displacement suppression mechanism 60 includes a first fixing portion 61 provided on the first frame 31, a second fixing portion 62 provided on the second frame 41, and a fixed member 63 that can be detachably attached to the first and second fixing portions 61 and 62. Additionally, the relative displacement suppression mechanism 60 has a first state where the fixed member 63 is fixed to both the first fixing portion 61 and the second fixing portion 62, as illustrated in FIGS. 27A and 27B, and, as a second state where the fixed member 63 is fixed to either the first fixing portion 61 or the second fixing portion 62, for example, a second state where the fixed member 63 is fixed to the second fixing portion 62, as illustrated in FIGS. 28A and 28B.

The first fixing portion 61 and the second fixing portion 62 include guide rails 61*a* and 62*a* extending in the Z direction. Each of the guide rails 61*a* and 62*a* is arranged in a straight line by connecting the first frame 31 to the second frame 41. The fixed member 63 includes a sliding piece 63*a* that slides on the respective guide rails 61*a* and 62*a* of the first and second fixing portions 61 and 62. The fixed member 63 moves over the first and second fixing portions 61 and 62 as the sliding piece 63*a* slides on the guide rails 61*a* and 62*a*. The fixed member 63 is slidably held by the second fixing portion 62 by inserting the sliding piece 63*a* into the guide rail 62*a* from an end portion of either one of the first fixing portion 61 or the second fixing portion 62. In this third embodiment, as illustrated in FIGS. 28A and 28B, the sliding piece 63*a* of the fixed member 63 is inserted into the guide rail 62*a* of the second fixing portion 62 from an end portion of the second fixing portion 62 opposite to the first fixing portion 61 side to hold the fixed member 63 by the second fixing portion 62. The fixed member 63 is further moved upward from the above state, and the sliding piece 63*a* of the fixed member 63 is inserted into the guide rail 61*a* of the first fixing portion 61 to hold the fixed member 63 by the first and second fixing portions 61 and 62, as illustrated in FIGS. 27A and 27B.

Figure 28B:
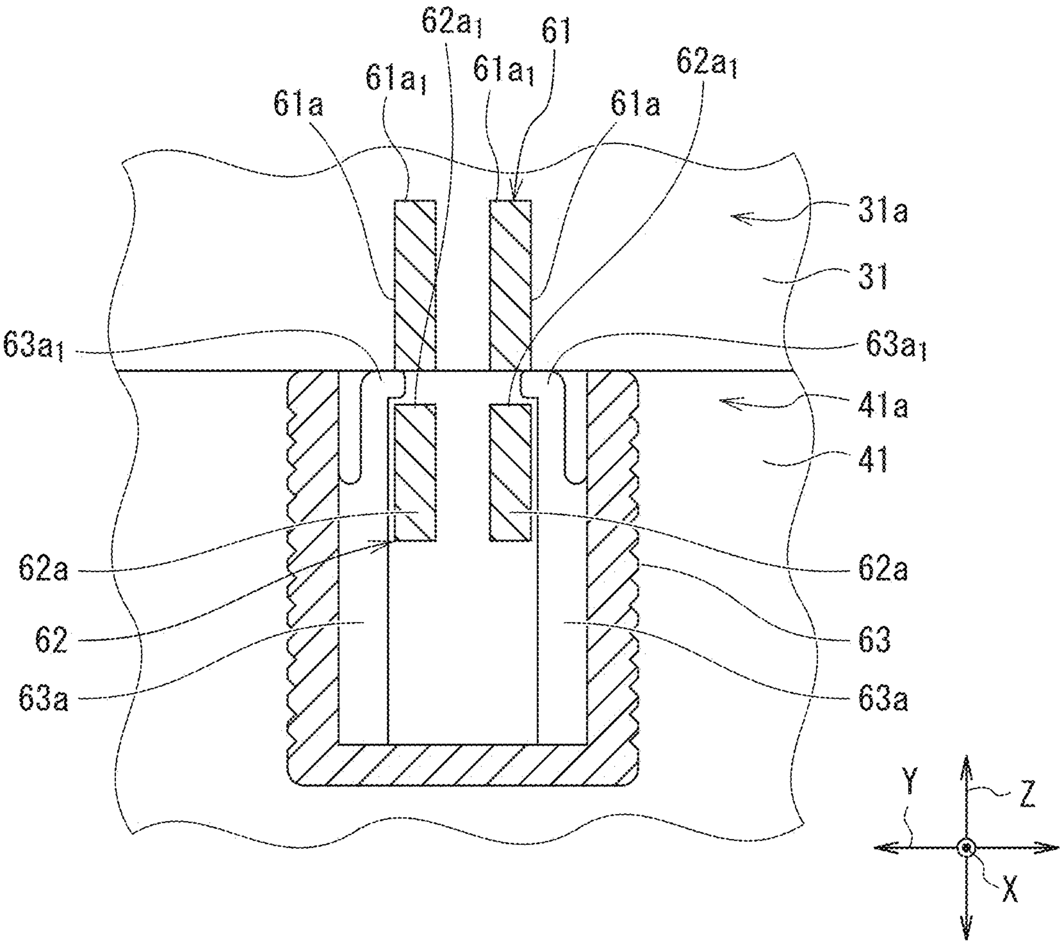
FIG. 28B is a sectional view illustrating the state where the relative displacement suppression of the relative displacement suppression mechanism is released.

As illustrated in FIGS. 27B and 28B, the sliding piece 63*a* includes an engaging projection portion 63$a_1$ that engages end portions 61$a_1$ and 62$a_1$ of the guide rails 61*a* and 62*a*. Then, as illustrated in FIG. 27B, the relative displacement suppression mechanism 60 maintains the first state where the fixed member 63 is fixed to both the first and second fixing portions 61 and 62 when the engaging projection portion 63$a_1$ of the sliding piece 63*a* engages the end portion 61$a_1$ of the guide rail 61*a* of the first fixing portion 61. Additionally, as illustrated in FIG. 28B, the relative displacement suppression mechanism 60 maintains the second state where the fixed member 63 is fixed to the second fixing portion 62 when the engaging projection portion 63$a_1$ of the sliding piece 63*a* engages the end portion 62$a_1$ of the guide rail 62*a* of the second fixing portion 62.

Note that, contrary to this third embodiment, when the sliding piece 63*a* of the fixed member 63 is inserted into the guide rail 61*a* of the first fixing portion 61 from an end portion of the first fixing portion 61 opposite to the second fixing portion 62 side to hold the fixed member 63 by the first fixing portion 61, the engaging projection portion 63$a_1$ of the sliding piece 63*a* is caused to engage the end portion of the guide rail 61*a* of the first fixing portion 61 to maintain the second state where the fixed member 63 is fixed to the first fixing portion 61.

As illustrated in FIGS. 27A and 27B, the relative displacement suppression mechanism 60 can suppress the relative displacement between the first and second frames 31 and 41 in the X direction by bringing the fixed member 63 into a state (first state) where it is held on the first and second fixing portions 61 and 62. Then, as illustrated in FIGS. 28A and 28B, the relative displacement suppression mechanism 60 can release the suppression of the relative displacement between the first and second frames 31 and 41 in the X direction by bringing the fixed member 63 into a state (second state) where it is held only by the second fixing portion 62. In other words, the relative displacement suppression mechanism 60 can suppress and release the relative displacement between the connected first and second frames 31 and 41 without using tools (in a tool-less manner). Thus, even in the relative displacement suppression mechanism 60 of this third embodiment, replacement of components such as the electric coil 23 (electric component) in the main body frame 30 can be facilitated, as in the above first embodiment.

In addition, this relative displacement suppression mechanism 60 is configured so that the fixed member 63 is fixed to each of the first and second fixing portions 61 and 62 by moving the fixed member 63 from the second fixing portion 62 side to the first fixing portion 61 side. Accordingly, even in the relative displacement suppression mechanism 60 of this third embodiment, the relative displacement between the connected first and second frames 31 and 41 in each of the X, Y, and Z directions can be suppressed.

Additionally, since this relative displacement suppression mechanism 60 can suppress the relative displacement between the connected first and second frames 31 and 41, there can be provided a more reliable electromagnetic contactor 1B.

While the present invention has been described in detail based on the above embodiments, the present invention is not limited to the above embodiments, and it is obvious that various modifications can be made without departing from the gist thereof.

REFERENCE SIGNS LIST

1: Electromagnetic contactor
10: Contact unit
11, 12: Fixed contact element
13: Movable contact element
14: Movable contact support
20: Electromagnet unit
21: Fixed iron core
22: Movable iron core
23: Electromagnetic coil
24: Winding
25: Bobbin
26: Return spring
30: Main body frame
30*a*: Housing section
31: First frame
31*a*, 31*b*, 31*c*, 31*d*: Side wall
31*e*: Bottom wall
41: Second frame
41*a*, 41*b*, 41*c*, 41*d*: Side wall
43: Mounting plate portion
50: Snap-fit mechanism
51: Flexible protruding plate portion
51*a*: First inclined surface
52: Fitting hole portion
53: Hook portion
55: Fitting projection portion
55*a*: Second inclined surface
56: Third inclined surface
60: Relative displacement suppression mechanism
61: First fixing portion
61*a*: Guide rail
61$a_1$: End portion
62: Second fixing portion
62*a*: Guide rail
62$a_1$: End portion
63: Fixed member
63*a*: Sliding piece
63$a_1$: Engaging projection portion
70: Positioning mechanism
71: Flexible positioning plate portion
80: Relative displacement suppression mechanism
81: First fixing portion
82: First piece insertion portion
83: First arm insertion portion
84: Second engaged portion
85: Second fixing portion
86: Second piece insertion portion
87: Second arm insertion portion
88: First engaged portion
90: Fixed member (fixed piece)
91: Member main body
91*a*: Upper wall (top plate portion)
91*b*: Back wall
91*c*: Side wall
92: Insertion piece
93: Flexible arm
93*a*: First engaging projection portion
93*b*: Second engaging projection portion
95: Positioning projection portion
96: Stopper portion
97: Guide recessed portion

The invention claimed is:

1. An electric device comprising:
a contact unit,
an electromagnet unit configured to drive the contact unit, and
a main body frame configured to house the contact unit and the electromagnet unit in a housing section,
wherein the main body frame includes a first frame including a flexible protruding plate portion protruding from an open end side,
wherein a first direction and a second direction and a third direction are orthogonal to each other, wherein the flexible protruding plate portion is arranged on each of two side walls of the first frame, the two side walls being located on opposite sides of each other in the third direction,
a second frame facing the first frame in the first direction to form the housing section, and
a snap-fit mechanism configured to connect the first frame to the second frame, the snap-fit mechanism including
a fitted portion provided on the flexible protruding plate portion and
a fitting projection portion provided on a side wall of the second frame and fitting with the fitted portion,
in which the fitted portion and the fitting projection portion are fitted by bringing the first frame and the second frame into relative proximity in the first direction, and the fitting is released by relatively displacing the first frame and the second frame in the second direction orthogonal to the first direction and to the third direction.

2. The electric device according to claim 1, wherein the flexible protruding plate portion includes a first inclined surface in the first direction in which the fitted portion and the fitting projection portion are fitted.

3. The electric device according to claim 1, wherein the fitting projection portion includes a second inclined surface in the second direction in which the fitting between the fitted portion and the fitting projection portion is released.

4. The electric device according to claim 3, wherein the second frame includes a third inclined surface in the second direction in which the fitting between the fitted portion and the fitting projection portion is released.

5. The electric device according to claim 1, wherein the fitted portion is formed by a fitting hole in which the fitting projection portion is fitted.

6. The electric device according to claim 1, wherein the main body frame further includes a relative displacement suppression mechanism configured to suppress the relative displacement between the connected first and second frames in the second direction.

7. The electric device according to claim 6, wherein the relative displacement suppression mechanism includes a first fixing portion provided on the first frame, a second fixing portion provided on the second frame, and a fixed member capable of being detachably attached and fixed to each of the first fixing portion and the second fixing portion.

8. The electric device according to claim 1, wherein the main body frame further includes a positioning mechanism configured to position the first frame and the second frame in the second direction.

9. The electric device according to claim 8, wherein the positioning mechanism includes a flexible positioning plate portion configured to, when connecting the first frame to the second frame, protrude from an open end of either one of the first frame or the second frame, enter from an open end of an other frame of the first or second frame, and face an inner surface of a side wall of the other frame.

10. The electric device according to claim 9, comprises a plurality of flexible positioning plate portions spaced apart from each other, each of which serves as the flexible positioning plate portion.

11. The electric device according to claim 9, wherein the flexible positioning plate portion has an elastic force for urging the side wall of the other frame of the first and second frames.

12. An electric device comprising:

a first frame and a second frame configured to house an electric component by connecting respective open end sides of the first and second frames facing each other in one direction, the first frame including a flexible protruding plate portion protruding from the open end side, wherein a first direction and a second direction and a third direction are orthogonal to each other, wherein the flexible protruding plate portion is arranged on each of two side walls of the first frame, the two side walls being located on opposite sides of each other in the third direction;

a second frame facing the first frame in the first direction;

a snap-fit mechanism configured to connect the first frame to the second frame, the snap-fit mechanism including a fitted portion provided on the flexible protruding plate portion and a fitting projection portion provided on a side wall of the second frame and fitting with the fitted portion, in which the fitted portion and the fitting projection portion are fitted by bringing the first frame and the second frame into relative proximity in the first direction, and the fitting is released by relatively displacing the first frame and the second frame in the second direction orthogonal to the first direction and to the third direction; and a relative displacement suppression mechanism configured to suppress relative displacement between the connected first and second frames, wherein the relative displacement suppression mechanism includes a first fixing portion provided on a side wall of the first frame, a second fixing portion provided on a side wall of the second frame to overlap with the first fixing portion in the one direction, and a fixed member movable over the first fixing portion and the second fixing portion, the fixed member sliding in a direction in which the first fixing portion and the second fixing portion are arranged.

13. The electric device according to claim 12, including a first state where the fixed member is fixed to both the first fixing portion and the second fixing portion and a second state where the fixed member is fixed to either the first fixing portion or the second fixing portion.

14. The electric device according to claim 12, wherein, in the first state, the relative displacement suppression mechanism suppresses a relative displacement between the first and second frames in a direction orthogonal to the one direction, and, in the second state, releases the relative displacement.

15. The electric device according to claim 12, wherein the first fixing portion includes a first piece insertion portion, the second fixing portion includes a second piece insertion portion, and the fixed member includes an insertion piece, the relative displacement suppression mechanism moving the fixed member from the first fixing portion side toward the second fixing portion side to insert the insertion piece into each of the first piece insertion portion and the second piece insertion portion.

16. The electric device according to claim 15, wherein the relative displacement suppression mechanism includes a plurality of sets each including the first piece insertion portion, the second piece insertion portion, and the insertion piece.

17. The electric device according to claim 15, wherein the second fixing portion includes a first engaged portion, and the fixed member includes a flexible arm including a first engaging projection portion provided on a tip side of the arm, the relative displacement suppression mechanism maintaining the first state by inserting the insertion piece into each of the first and second piece insertion portions and hooking the first engaging projection portion onto the first engaged portion to maintain an engagement state.

18. The electric device according to claim 17, wherein the first engaging projection portion is urged against the first engaged portion by an elastic force of the flexible arm.

19. The electric device according to claim 17, wherein the relative displacement suppression mechanism includes a plurality of sets each including the flexible arm including the first engaging projection portion and the first engaged portion.

20. The electric device according to claim 17, wherein the first fixing portion includes the second engaged portion, and the flexible arm includes a second engaging projection portion spaced apart from the first engaging projection portion in a direction of extension of the flexible arm, the relative displacement suppression mechanism maintaining the second state by inserting the insertion piece into the first piece insertion portion and hooking the second engaging projection portion onto the second engaged portion by the elastic force of the flexible arm to bring the second engaging projection portion into an engagement state.

21. The electric device according to claim 20, wherein the relative displacement suppression mechanism includes a plurality of sets each including the second engaged portion and the second engaging projection portion.

22. The electric device according to claim 17, wherein the relative displacement suppression mechanism maintains the second state by using the elastic force of the flexible arm to hook the first engaging projection portion onto the second engaged portion to bring the first engaging portion into an engagement state.

23. The electric device according to claim 15, wherein the relative displacement suppression mechanism further includes a positioning projection portion provided on a side wall of the fixed member and a stopper portion provided on the side wall of the first frame and configured to, when the fixed member moves from the second fixing portion side toward the first fixing portion side, stop the movement of the fixed member by coming into contact with the positioning projection portion in the second state.

24. The electric device according to claim 23, wherein the relative displacement suppression mechanism further includes a guide portion provided on the side wall of the second frame to extend in the one direction and configured to move the positioning projection portion along the one direction, the stopper portion being provided at an end of the guide portion.

25. The electric device according to claim 12, wherein each of the first fixing portion and the second fixing portion includes a guide rail extending in the one direction and arranged in a straight line by connecting the first frame to the second frame; and wherein the fixed member includes a sliding piece sliding on the guide rail of each of the first fixing portion and the second fixing portion, the fixed member moving over each of the first fixing portion and the second fixing portion as the sliding piece slides on each of the guide rails.

26. The electric device according to claim 25, wherein the sliding piece includes an engaging projection portion engaging at end portions of the guide rails, the first state being maintained when the engaging projection portion of the sliding piece engages the end portion of the guide rail of the first fixing portion, and the second state being maintained when the engaging projection portion engages the end portion of the guide rail of the second fixing portion.

* * * * *